(12) United States Patent
Ishii et al.

(10) Patent No.: US 7,760,415 B2
(45) Date of Patent: Jul. 20, 2010

(54) MICRO MIRROR DEVICE

(75) Inventors: Fusao Ishii, Pittsburgh, PA (US); Naoya Sugimoto, Tokoy (JP); Hirotoshi Ichikawa, Tokyo (JP); Yoshihiro Maeda, Tokyo (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 12/378,658

(22) Filed: Feb. 18, 2009

(65) Prior Publication Data
US 2009/0207474 A1    Aug. 20, 2009

Related U.S. Application Data

(63) Continuation-in-part of application No. 11/894,248, filed on Aug. 18, 2007, and a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/841,173, filed on Aug. 30, 2006.

(51) Int. Cl.
G02B 26/00 (2006.01)
G02B 26/08 (2006.01)

(52) U.S. Cl. .................................. 359/290; 359/224.1
(58) Field of Classification Search ............. 359/198.1, 359/199.2, 199.3, 199.4, 200.6, 200.7, 200.8, 359/212.1, 224.1, 290, 291, 295, 298
See application file for complete search history.

(56) References Cited

U.S. PATENT DOCUMENTS

| 5,096,279 | A | 3/1992 | Hornbeck et al. |
| 5,447,600 | A | 9/1995 | Webb |
| 5,497,262 | A | 3/1996 | Kaeriyama |
| 5,673,139 | A | 9/1997 | Johnson |
| 6,128,121 | A | 10/2000 | Choi et al. |
| 6,438,282 | B1 * | 8/2002 | Takeda et al. ............... 385/16 |
| 6,719,427 | B2 | 4/2004 | Sakashita et al. |
| 6,735,008 | B2 | 5/2004 | Brophy et al. |
| 7,019,884 | B2 | 3/2006 | Kirch et al. |
| 7,022,249 | B2 | 4/2006 | Valette |
| 7,068,417 | B2 | 6/2006 | Yang |
| 7,183,618 | B2 | 2/2007 | Ishii |
| 7,273,693 | B2 | 9/2007 | Nikkel et al. |

* cited by examiner

*Primary Examiner*—William C Choi
(74) *Attorney, Agent, or Firm*—Bo-In Lin

(57) ABSTRACT

The present invention provides a mirror device, comprising: a mirror; an elastic hinge for supporting the mirror and the elastic hinge has a specific electric resistance. The mirror device further includes an electrode for controlling the mirror, wherein a voltage is applied to the elastic hinge for a predetermined period in synchronous with a change of an electric voltage applied to the electrode.

10 Claims, 31 Drawing Sheets

Fig. 1A (Prior Art)
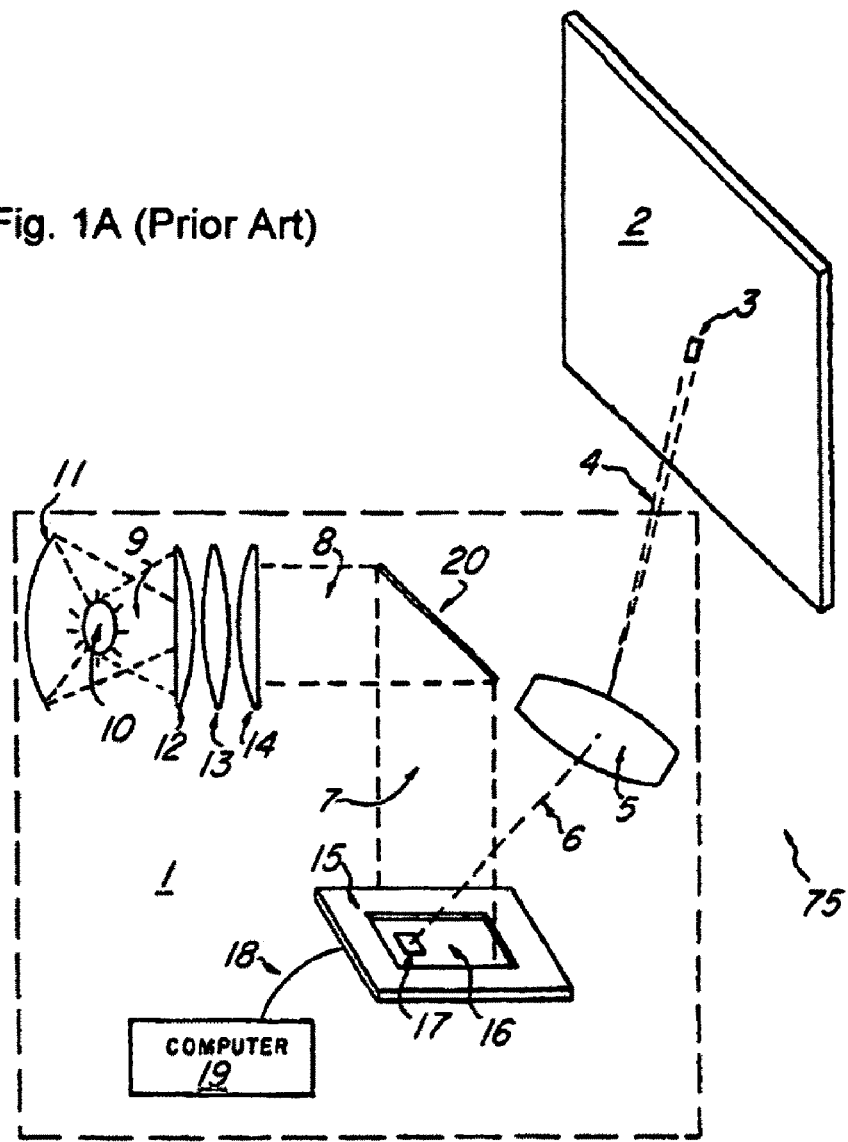
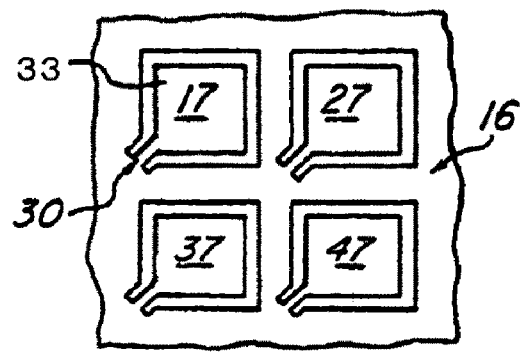
Fig. 1B (Prior Art)

MICRO MIRROR DEVICE

CROSS REFERENCE TO RELATED APPLICATIONS

This application is a Continuation in Part (CIP) Application of a Co-Pending patent application Ser. No. 11/894,248 filed on Aug. 18, 2007 by one of common Inventors of this patent application. Application Ser. No. 11/894,248 is a Non-provisional Application of a Provisional Application 60/841,173 filed on Aug. 30, 2006. The Non-provisional application Ser. No. 11/894,248 is a Continuation in Part (CIP) Application of U.S. patent application Ser. No. 11/121,543 filed on May 4, 2005, now issued into U.S. Pat. No. 7,268,932. The application Ser. No. 11/121,543 is a Continuation in part (CIP) application of three previously filed applications. These three applications are Ser. No. 10/698,620 now abandoned; Ser. No. 10/699,140, now issued into U.S. Pat. No. 6,862,127; and Ser. No. 10/699,143, now issued into U.S. Pat. No. 6,903,860. All three patents were filed on Nov. 1, 2003 by one of the Applicants of this patent application. The disclosures made in these patent applications are hereby incorporated by reference in this patent application.

BACKGROUND OF THE INVENTION

1. Field of the Invention

The present invention relates to an image display apparatus implemented with a mirror device for modulating light. More particularly, this invention relates to an image display apparatus implemented with a mirror device comprises mirror elements each includes an elastic hinge manufactured with special structure for supporting the mirror.

2. Description of the Related Art

Even though there are significant advances of the technologies for implementing an electromechanical mirror device as a spatial light modulator (SLM) in recent years, there are still limitations and difficulties when current technologies according to the state of the art are applied to provide a high quality image. Specifically, when the images are digitally controlled, the image quality is adversely affected due to the limitation that the images are not displayed with sufficient number of gray scales.

An electromechanical mirror device is drawing a considerable interest and commonly employed as a spatial light modulator (SLM) in the image project apparatuses. The electromechanical mirror device is typically implemented with a "mirror array" comprising a large number of mirror elements. In general, the number of mirror elements may range from 60,000 to several millions of micromirror pieces are manufactured as two-dimensional array on a surface of a substrate in an electromechanical mirror device.

Referring to FIG. 1A for an image display system 1 disclosed in U.S. Pat. No. 5,214,420 that comprises a screen 2. The display system 1 further includes a light source 10 to project an illumination light for displaying images on the screen 2. The illumination light 9 from the light source is further focused and directed toward a lens 12 by a mirror 11. Lenses 12, 13, and 14 function together as a beam culminator to culminate light 9 into a culminated light 8. A spatial light modulator (SLM) 15 is controlled on the basis of data input by a computer 19 via a bus 18 to selectively redirect portions of light from a path 7 toward an enlarger lens 5 and onto screen 2. The SLM 15 is implemented with a mirror array comprising large number of mirror 33 each includes a deflectable reflective element shown as elements 17, 27, 37, and 47 depicted in FIG. 1B. Each mirror 33 is connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 to display an illuminated pixel 3. When the element 17 is in another position, the light is redirected away from screen 2 and hence the pixel 3 is displayed as a dark pixel on the display screen 2.

The mirror device comprises a plurality of mirror elements to function as spatial light modulator (SLM) wherein each mirror element comprises a mirror and electrodes. A voltage applied to the electrode(s) generates a coulomb force between the mirror and the electrode(s) to control the mirror to tilt to an inclined angle. According to a common term used in this specification, the mirror is "deflected" to an angular position for describing the operational condition of a mirror element.

When a voltage applied to the electrode(s) controls the mirror to deflect to a controlled angular position, the deflected mirror also reflects an incident light to a controlled direction. The direction of the reflected light is therefore controlled in accordance with the deflection angle of the mirror and that in turn is controlled by a voltage applied to the electrode. The present specification refers to a state of the mirror as an ON state when the mirror reflects substantially the entirety of an incident light a projection path designated for image display and as an OFF state when the mirror reflects the incident light to a direction away from the designated projection path for image display.

Furthermore, there is a specific ratio of an amount of light reflected to the display screen by the mirror operated in an ON state relative to an amount of light reflected by the mirror operated at an OFF state. Furthermore, an "Intermediate state" is referred to a condition when the mirror reflects an amount of light to the projection path that is smaller than the amount of light of the ON state but greater than the amount of light of the OFF state.

The terminology of present specification defines an angle of rotation along a clockwise (CW) direction as a positive (+) angle and that of counterclockwise (CCW) direction as negative (−) angle. A deflection angle is defined as zero degree (0°) when the mirror is in the initial state with no voltage applied to the electrode to function as a reference of mirror deflection angle.

Most of the conventional image display devices such as the devices disclosed in U.S. Pat. No. 5,214,420 implements a dual-state mirror control technique that controls the mirrors in a state of either ON or OFF. The quality of an image display is limited due to the limited number of gray scales when the mirrors are controlled to operate only at an ON or OFF states. Specifically, in a conventional control circuit that applies a PWM (Pulse Width Modulation), the quality of the image is limited by the LSB (least significant bit) or the least pulse width as a minimum length of time that a mirror can be controlled to operate in an ON or OFF state. Since the mirror is controlled to operate in either the ON or OFF state, the conventional image display apparatus is limited by the LSB and not able to operate the mirror with a pulse width shorter than the control duration allowable based on the LSB. The least amount of controllable light defines the resolution of the gray scale is determined by the light reflected during the time duration based on the least pulse width. The limited number of gray scales thus leads to a degradation of the quality of the displayed image.

Specifically, FIG. 1C exemplifies a control circuit for controlling a mirror element according to the disclosure in the U.S. Pat. No. 5,285,407. The control circuit includes a memory cell 32. Various transistors are referred to as "M*"

where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a typical Static Random Access switch Memory (SRAM) design. The transistor M9 connected to a Row-line receives a data signal via a Bit-line. The memory cell 32 written data is accessed when the transistor M9 which has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The mirror is driven by a voltage applied to the address electrode connected to an address electrode and is held at a predetermined deflection angle on the address electrode. An elastic "landing chip" is formed at a portion on the address electrode, which makes the address electrode contact with mirror, and assists the operation for deflecting the mirror toward the opposite direction when a deflection of the mirror is switched. The landing chip is designed as having the same potential with the address electrode, so that an electric short circuit is prevented when the address electrode is in contact with the mirror.

Each mirror formed on a device substrate has a square or rectangular shape and each side has a length of 4 to 15 µm. In this configuration, a reflected light that is not controlled for purposefully applied for image display may however inadvertently generated by reflections through the gap between adjacent mirrors. The contrast of an image display generated by adjacent mirrors is degraded due to the reflections generated not by the mirrors but by the gaps between the mirrors. As a result, a quality of the image display is adversely affected due to a reduced contrast. In order to overcome such problems, the mirrors are arranged on a semiconductor wafer substrate with a layout to minimize the gaps between the mirrors. One mirror device is generally designed to include an appropriate number of mirror elements wherein each mirror element is manufactured as a deflectable mirror on the substrate for displaying a pixel of an image. The appropriate number of elements for displaying image is in compliance with the display resolution standard according to a VESA Standard defined by Video Electronics Standards Association or television broadcast standards. In the case in which the mirror device has a plurality of mirror elements corresponding to Wide eXtended Graphics Array (WXGA), whose resolution is 1280 by 768, defined by VESA, the pitch between the mirrors of the mirror device is 10 µm and the diagonal length of the mirror array is about 0.6 inches.

The control circuit, as illustrated in FIG. 1C, controls the micromirrors to switch between two states, and the control circuit drives the mirror to oscillate to either an ON or OFF deflection angle (or position) as shown in FIG. 1A.

The minimum intensity of light controllable to reflect from each mirror element for image display, i.e., the resolution of gray scale of image display for a digitally controlled image display apparatus, is determined by the least length of time that the mirror is controllable to be held in the ON position. The length of time that each mirror is controlled to be held in an ON position is in turn controlled by multiple bit words.

FIG. 1D shows the "binary time periods" in the case of controlling the SLM by four-bit words. As shown in FIG. 1D, the time periods have relative values of 1, 2, 4, and 8 that in turn determine the relative intensity of light of each of the four bits, where "1" is the least significant bit (LSB) and "8" is the most significant bit. According to the PWM control mechanism, the minimum intensity of light that determines the resolution of the gray scale is a brightness controlled by using the "least significant bit" which holds the mirror at an ON position for the shortest controllable length of time.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

When adjacent image pixels are displayed with a very coarse gray scale caused by great differences in the intensity of light, thus, artifacts are shown between these adjacent image pixels. That leads to the degradations of image quality. The image degradations are especially pronounced in the bright areas of image where there are "bigger gaps" between of the gray scales of adjacent image pixels. The artifacts are generated by technical limitations in that the digitally controlled image does not provide a sufficient number of the gray scale.

As the mirrors are controlled to operate in a state of either ON or OFF, the intensity of light of a displayed image is determined by the length of time each mirror is in the ON position. In order to increase the number of gray scales of a display, the switching speed of the ON and OFF positions for the mirror must be increased. Therefore the digital control signals need be increased to a higher number of bits. However, when the switching speed of the mirror deflection is increased, a stronger hinge for supporting the mirror is necessary to sustain the required number of switches between the ON and OFF positions for the mirror deflection. In order to drive the mirrors with a strengthened hinge, a higher voltage is required. The higher voltage may exceed twenty volts and may even be as high as thirty volts. The mirrors produced by applying the CMOS technologies are probably not appropriate for operating the mirror at such a high range of voltages, and therefore DMOS mirror devices may be required. In order to achieve a higher degree of gray scale control, more complicated production processes and larger device areas are required to produce the DMOS mirror. Conventional mirror controls are therefore faced with a technical problem in that accuracy of gray scales and range of the operable voltage have to be sacrificed for the benefits of a smaller image display apparatus.

There are many patents related to light intensity control. These patents include U.S. Pat. Nos. 5,589,852, 6,232,963, 6,592,227, 6,648,476, and 6,819,064. There are further patents and patent applications related to different light sources. These patents include U.S. Pat. Nos. 5,442,414, 6,036,318 and Application 20030147052. Also, U.S. Pat. No. 6,746,123 has disclosed particular polarized light sources for preventing the loss of light. However, these patents or patent applications do not provide an effective solution to attain a sufficient number of the gray scale in the digitally controlled image display system.

Furthermore, there are many patents related to a spatial light modulation including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties.

In view of the above problems, US Patent Application 20050190429 has disclosed a method for controlling the deflection angle of the mirror to express higher gray scales of an image. In this disclosure, the intensity of light obtained during the oscillation period of the mirror is about 25% to 37% of the intensity of light obtained while the mirror is held in the ON position continuously.

According to this control process, it is not necessary to drive the mirror at a high speed. Also, it is possible to provide a higher number of the gray scale using a hinge with a low elastic constant. Hence, such a control makes it possible to reduce the voltage applied to the address electrode.

An image display apparatus using the mirror device described above is broadly categorized into two types: a single-plate image display apparatus implemented with only one spatial light modulator and a multi-plate image display apparatus implemented with a plurality of spatial light modulators. In the single-plate image display apparatus, a color image is displayed by changing, in turn, the color (i.e. frequency or wavelength) of projected light over time. In a multi-plate the image display apparatus, a color image is displayed controlling the multiple spatial light modulators, corresponding to beams of light having different colors (i.e. frequencies or wavelengths), to modulate and combine the beams of light continuously.

For projection apparatuses there has been an increasing demand for high-resolution definitions, such as a full high definition (Full-HD; 1920×1080 pixels) television these days, prompting the development of higher resolution display techniques.

A mirror device is usually the spatial light modulator used for such a projection apparatus. The mirror device is comprised of a mirror array of two to eight million mirror-elements in two dimensions on a device substrate.

The size of a mirror of the mirror element of a common mirror device is 11 μm square. A memory cell for driving the mirror is comprised within the substrate. Further, the mirror is controlled by setting the operating voltage of the memory cell, or the drive voltage for deflecting the mirror, to "5" volts or higher. Further, such a mirror is generally supported by an elastic hinge.

A common mirror device used for high definition (Full-HD) has the diagonal size of 24.13 mm (0.95 inches), with a mirror pitch of 11 μm. An XGA-size mirror device has the diagonal size of 17.78 mm (0.7 inches) of the mirror array, with the mirror pitch of 14 μm.

FIG. 2 is a diagonal view of a mirror device arraying, in two-dimension on a device substrate, mirror elements controlling a reflection direction of incident light by deflecting the mirror.

The mirror device 200 shown in FIG. 2 is constituted by arraying a plurality of mirror elements 300, each of which is constituted by an address electrode (not shown in the drawing herein), elastic hinge (not shown) and a mirror supported by the elastic hinge, lengthwise and crosswise (i.e., in two-dimension) on a device substrate 303.

FIG. 2 illustrates the case of arraying a plurality of mirror elements 300 comprising square mirrors 302 lengthwise and crosswise at equal gaps on the device substrate 303.

The mirror 302 can be controlled by applying a voltage to the address electrode provided on the device substrate 303. In FIG. 2, a deflection axis 201 for deflecting the mirror 302 is indicated by the dotted line. The light emitted from a light source 301 is incident to the mirror 302 so as to be orthogonal or diagonal relative to the deflection axis 201.

Specifically, in the present specification document, the distance between the deflection axes 201 of mutually adjacent mirrors 302 is termed as "pitch" and the distance between the mutually adjacent mirrors 302 is termed as "gap".

The following is a description of an operation of the mirror element 300 by referring to the cross-sectional line II-II of the mirror element 300 of the mirror device 200 shown in FIG. 2.

FIGS. 3A and 3B are cross-sectional diagrams of the line II-II indicated in FIG. 2.

The mirror element 300 comprises a mirror 302, an elastic hinge 304 for supporting mirror 302, two address electrodes 307a and 307b, which placed opposite mirror 302, and a first and second memory cell, both for applying a voltage to the address electrodes 307a and 307b in order to operate the mirror 302 under a controllable deflection state.

The drive circuits for each of the memory cells are commonly placed inside the device substrate 303 to control each memory cell by the signal according to the image data thus controlling the deflection angle of mirror 302 for reflecting and modulating the incident light.

FIG. 3A is a cross-sectional diagram for illustrating an ON state of a mirror element 300 when the deflectable mirror 302 reflects the incident light to a projection optical system.

A signal [0, 1] applied to a memory cell represents a voltage "V=0" applied to the address electrode 307a on one side and another voltage V=Va applied to the address electrode 307b on the other side. As a result, a Coulomb force is generated by the voltage Va applied to the electrode 307b to draw the mirror 302 to deflect from a horizontal state to incline to the direction of the address electrode 307b. The mirror 302 is controlled to operate in an ON state to reflect the incident light emitted from a light source 301 to the projection optical system. Specifically an insulation layer 306 is formed to cover over the device electrode, i.e., the address electrodes 307a and 307b, and a hinge electrode 305 connected to the elastic hinge 304 is grounded through a Via connector not shown in a drawing formed in insulation layer 306.

FIG. 3B is a cross-sectional diagram for illustrating an OFF state of a mirror element 300 when the deflectable mirror 302 reflects the incident light away from the projection optical system.

A signal [1, 0] applied to a memory cell represents a voltage V=Va applied to the address electrode 307a on one side and another voltage "V=0" applied to the address electrode 307b on the other side. As a result, a Coulomb force is generated by the voltage Va applied to the electrode 307a to draw the mirror 302 to deflect from a horizontal state to incline to the direction of the address electrode 307a. The mirror 302 is controlled to operate in an OFF state to reflect the incident light outside of the light path projecting to the projection optical system.

Specifically, the Coulomb force generated between the mirror 302 and address electrode 307a, or 307b, may be represented by the following expression:

$$F = k' \frac{eS^2 V^2}{2h^2};\qquad(1)$$

where "S" is the area of the address electrode 307a or 307b, "h" is the distance between the mirror 302 and address electrode 307a or 307b, "e" is the permittivity between the mirror 302 and address electrode 307a or 307b, "V" is the voltage applied to the address electrode 307a or 307b, and "k'" is a correction coefficient.

FIG. 4 is a cross-sectional diagram illustrating the reflection of incident light onto a mirror device 200.

Each of the mirror elements 300 in the mirror device 200 shown in FIG. 4 comprises a mirror 302 and hinge 304 juxtaposed on the device substrate 303 enclosed in a package 308. The package 308 is formed with a shape of a hollow rectangle with an open top, and the top is covered with a cover glass 309, which allows the transmission of light.

The mirror device as described above can be produced through the same processes as commonly applied in the production process of a semiconductor device. The production processes mainly includes processing steps of chemical vapor deposition (CVP), photolithography, etching, doping, and chemical mechanical polishing (CMP).

Practically, in order to respond to a higher resolution of the image projected in a projection apparatus, the number of mirror elements must be increased, requiring a reduction in size of the mirror of the mirror element.

A reduction in mirror size necessitates an elastic hinge that is extremely thin and small, having a thickness ranging from 100- to 1000 angstrom and having a width ranging from 1.2- to 0.3 μm. This requires that the area for fixing the elastic hinge onto the address electrode becomes very small, making it very difficult to fix the elastic hinge securely so as to prevent the hinge from being detached by an elastic force applied to its base. Furthermore, in the case of a perpendicular elastic hinge, it functions as a cantilevered spring, which is fixed only at the base, which endures a large force.

Additionally, in the processes of forming an elastic hinge, the etching is repeated, and therefore precautions must be taken to prevent the base of the hinges or regions near the bottom portions of the elastic hinge from being cut or corroded. Specifically, there are additional difficulties due to the facts that when the sacrifice layer is made of silicon dioxide ($SiO_2$), hydrogen fluoride (HF) is used as etchant, the base and the lower portions as fixed part of an elastic hinge may easily be exposed and damaged and/or corroded. Therefore, the current technologies of manufacturing the mirror devices implemented as the spatial light modulator is confronted with difficulties and limitations. Such limitations and difficulties are still not resolved by the above-discussed patents and disclosures and further in view of the additional patents as listed below.

The following patents are related to the structures of the conventional mirror devices and the techniques for producing the mirror devices. U.S. Pat. No. 7,183,618 discloses a hinge formed in the opening part of a pedestal. U.S. Pat. No. 7,273,693 discloses a mirror device comprising a mirror support. U.S. Pat. Nos. 5,673,139; 6,128,121; and 7,068,417 disclose a vertical hinge. U.S. Pat. No. 7,022,249 discloses a method for forming the base of a hinge and U.S. Pat. No. 5,497,262 discloses a horizontal hinge structure. However these disclosures have not disclosed configurations or manufacturing methods to overcome the above-discussed difficulties or limitations.

SUMMARY OF THE INVENTION

In consideration of the situation surrounding the conventional technique, the present invention aims at providing a mirror device in which hinges are robustly fixed.

The present invention also aims at providing a mirror device capable of attaining a higher level of definition of an image.

A first exemplary embodiment of the present invention provides a mirror device, comprising: a mirror; an elastic hinge for supporting the mirror and the hinge having a specific electric resistance; and an electrode disposed near the mirror for controlling the mirror, wherein a voltage is applied to the elastic hinge for a predetermined period in synchronous with a change of an electric voltage applied to the electrode.

A second exemplary embodiment of the present invention provides the mirror device according to the first aspect, further comprising a controller to control a voltage applied to the electrode to retain the mirror at a fixed position and another voltage applied to the hinge ; and the controller applies a positive voltage change to the elastic hinge when the controller applies a negative potential change to the electrode and the controller applies a negative voltage change to the elastic hinge when the controller applies a positive potential change to the electrode.

A third exemplary embodiment of the present invention provides the mirror device according to the first aspect, further comprising a controller for controlling the mirror to have a smaller absolute value of an electric potential than the absolute value of the electric potential of the electrode before a voltage is applied to the elastic hinge for a predetermined time period causing a potential change in the elastic hinge A fourth exemplary embodiment of the present invention provides the mirror device according to the first aspect, further comprising a controller for controlling a time sequence for applying a voltage to the elastic hinge for generating a plurality of peaks of electric potentials of the mirror.

A fifth exemplary embodiment of the present invention provides the mirror device according to the first aspect, further comprising a controller for controlling a time sequence for applying a voltage to the mirror for a predetermined period for generating a smaller electric potential in the mirror than a retained electric potential of the mirror.

A sixth exemplary embodiment of the present invention provides the mirror device according to the first aspect, further comprising a controller for controlling a voltage applying to the elastic hinge to generate a smaller Coulomb force between the mirror and the electrode. A seventh exemplary embodiment of the present invention provides the mirror device according to the first aspect, further comprising a controller for applying a voltage to the elastic hinge for a predetermined period for stopping a free oscillation of the mirror within a time period equal to or smaller than a time period of one mirror oscillation cycle.

An eighth exemplary embodiment of the present invention provides the mirror device according to the first aspect, further comprising a controller for applying a voltage to the elastic hinge for a predetermined period for generating a Coulomb force between the mirror and the electrode for moving the mirror in a direction away from the electrode when the Coulomb force is decreasing and for obstructing the mirror from shifting when the Coulomb force is increasing.

A ninth exemplary embodiment of the present invention provides the mirror device according to the eighth aspect, further comprising a controller for terminating a voltage applied to said electrode for withdrawing the Coulomb force to operate the mirror with a free oscillation.

A tenth exemplary embodiment of the present invention provides the mirror device according to the first aspect, further comprising: a controller for terminating a voltage applied to said electrode for withdrawing the Coulomb force to position the mirror at an angular position away from the electrode.

An eleventh exemplary embodiment of the present invention provides a mirror device, comprising: a mirror; an elastic hinge for supporting the mirror and the hinge having a specific electric resistance; an electrode for controlling the mirror; and a signal generator for generating a signal for reducing an electric potential of the mirror by changing an electric potential of the electrode.

A twelfth exemplary embodiment of the present invention provides the mirror device according to the eleventh aspect, wherein the electrode further comprising an address electrode and a plate electrode.

A thirteenth exemplary embodiment of the present invention provides the mirror device according to the eleventh aspect, wherein the signal generator further generating signals for controlling an electric potential of the mirror to operate with a plurality of peaks.

A fourteenth exemplary embodiment of the present invention provides a mirror device, comprising: a stationary electrode disposed on a substrate, a movable electrode disposed on said substrate opposite to the stationary electrode, an elastic hinge for supporting the movable electrode, and a drive circuit for applying a voltage to the stationary electrode or movable electrode for controlling a movement of the movable electrode, wherein the drive circuit controls the movable electrode to start a movement at a third clock time between a first clock time when an electric potential of the stationary electrode is changed and a third clock time when the electric potential of the stationary electrode is changed again.

A fifteenth exemplary embodiment of the present invention provides the mirror device according to the fourteenth aspect, wherein the elastic hinge is composed of a silicon (Si) material doped with dopants selected from a material from either one of the group-III and group-V atom.

A sixteenth exemplary embodiment of the present invention provides the mirror device according to the fourteenth aspect, wherein the stationary electrode further comprising at least two stationary electrodes for applying two different voltages thereon.

A seventeenth exemplary embodiment of the present invention provides the mirror device according to the fourteenth aspect, further comprising a contact part provided for contacting the movable electrode, wherein an electric resistance between the contact part and the movable electrode is smaller than an resistance of the elastic hinge.

An eighteenth exemplary embodiment of the present invention provides the mirror device according to the fourteenth aspect, wherein the movable electrode further attaching to a predetermined part on a periphery of the stationary electrode wherein the predetermined part is substantially insulated from the movable electrode.

BRIEF DESCRIPTION OF THE DRAWINGS

The present invention is described in detail below with reference to the following Figures.

FIG. 1A is a functional block diagram for showing shows a projection display system using a micromirror device.

FIG. 1B is a top view for showing a micromirror device implemented in a projection display system of FIG. 1A.

DESCRIPTION OF THE PREFERRED EMBODIMENTS

The following is a description of a mirror device and projection apparatus according to a preferred embodiment of the present invention by referring to the accompanying drawings.

FIGS. 5A through 5F are cross-sectional diagrams illustrating the method for manufacturing a mirror device according to a preferred embodiment of the present invention.

Figure 1C:
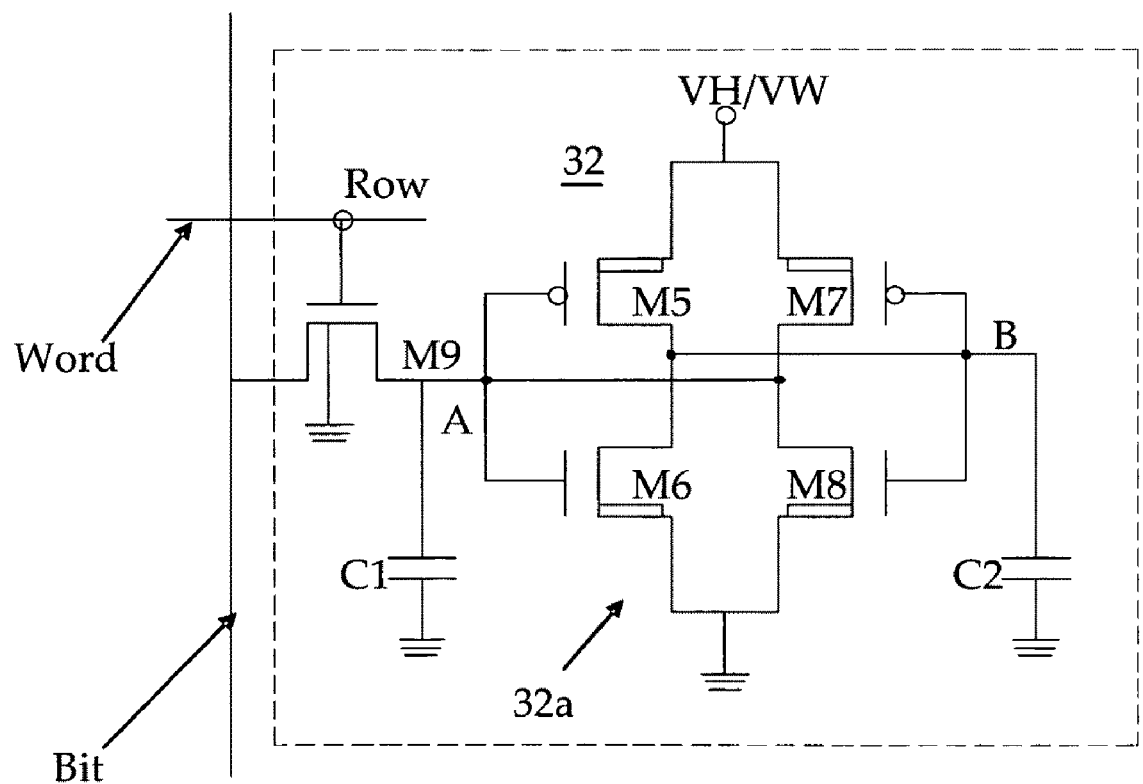
FIG. 1C is a circuit diagram for showing an exemplary driving circuit of related arts.
Figure 1D:
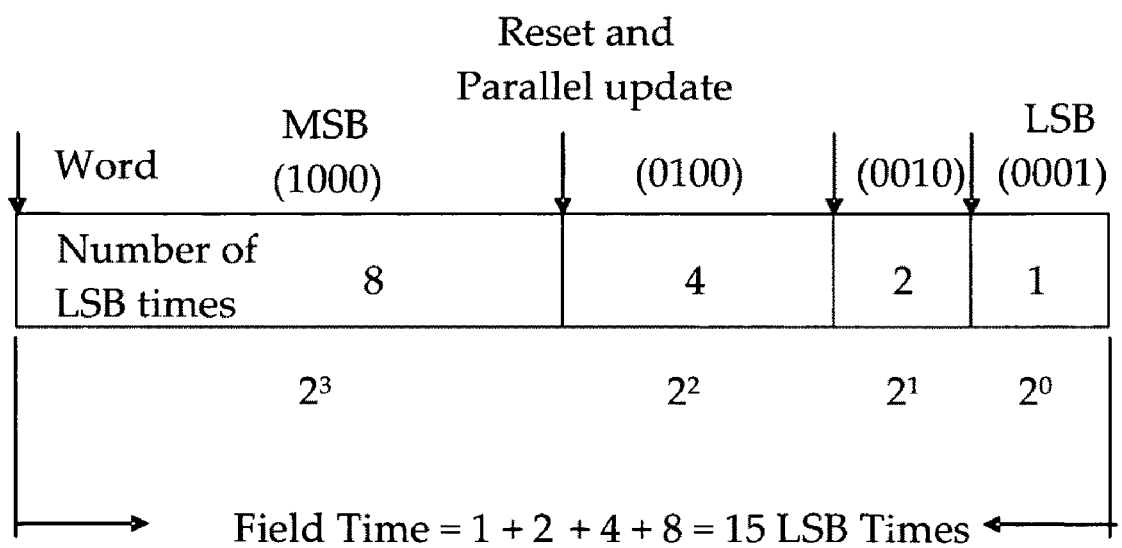
FIG. 1D is a diagram for showing the scheme of Binary Pulse Width Modulation (Binary PWM) of a conventional digital micromirror to generate grayscale.
Figure 2:
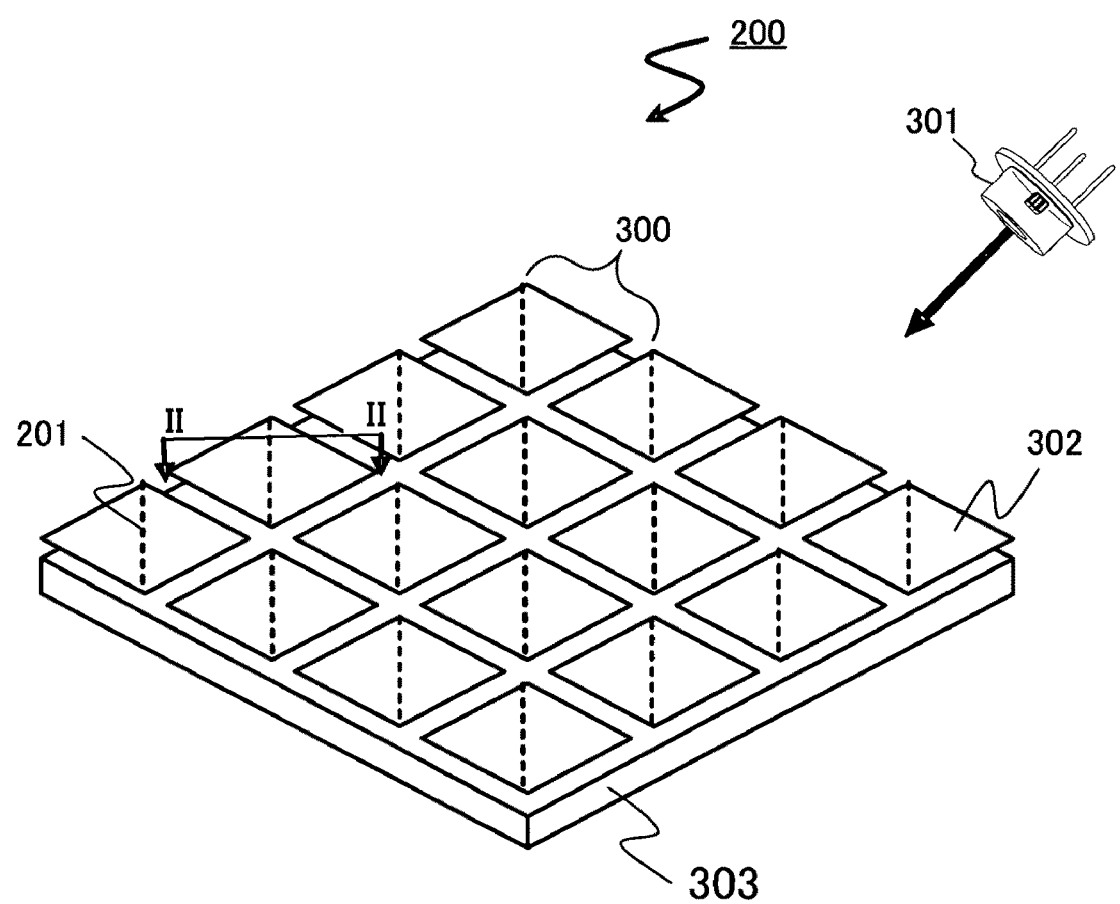
FIG. 2 is a diagonal view of a mirror device comprising two-dimension array of mirror elements on a device substrate for controlling the reflection direction of incident light by deflecting the mirror.
Figure 3A:
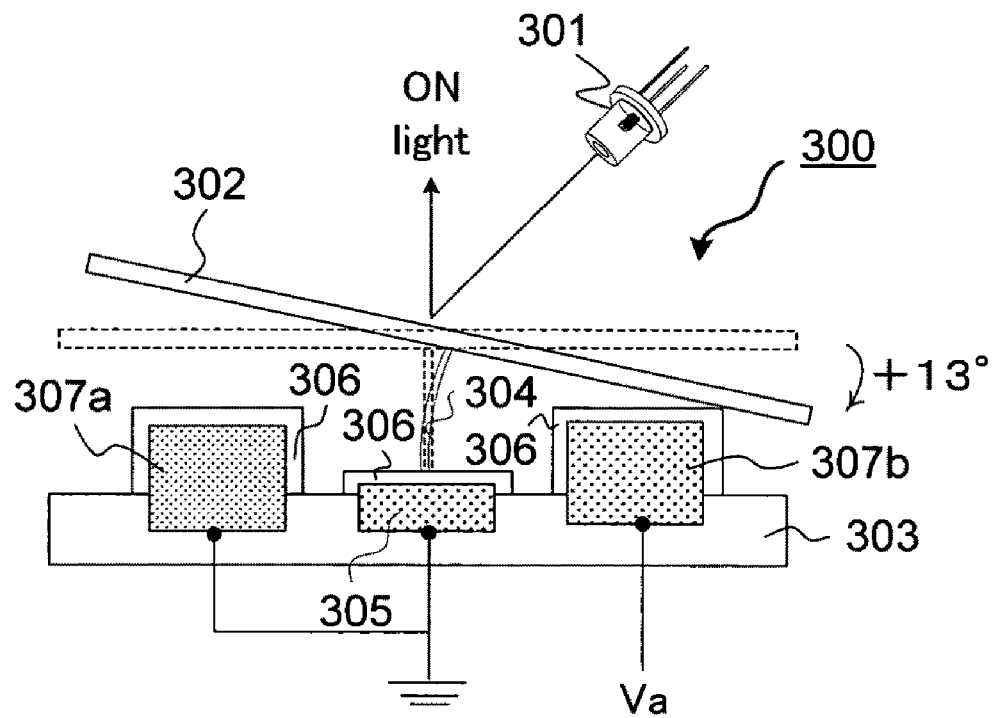
FIG. 3A is a cross-sectional diagram of a mirror element reflecting incident light to a projection optical system (i.e., an ON light state) by deflecting the mirror.
Figure 3B:
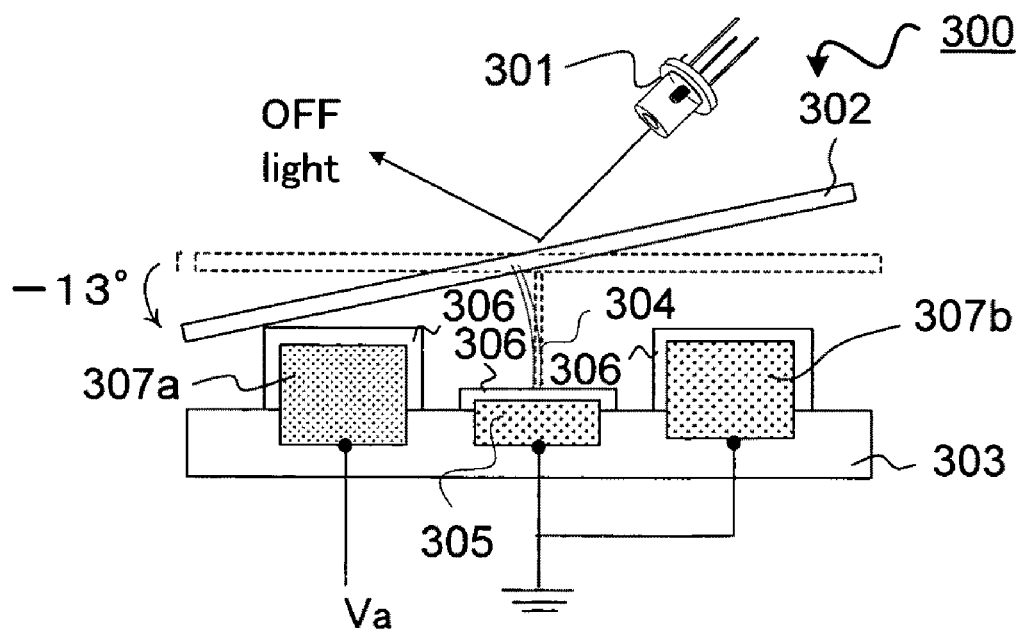
FIG. 3B is a cross-sectional diagram of a mirror element reflecting the incident light away from the projection optical system (i.e., an OFF light state) by deflecting the mirror.
Figure 4:
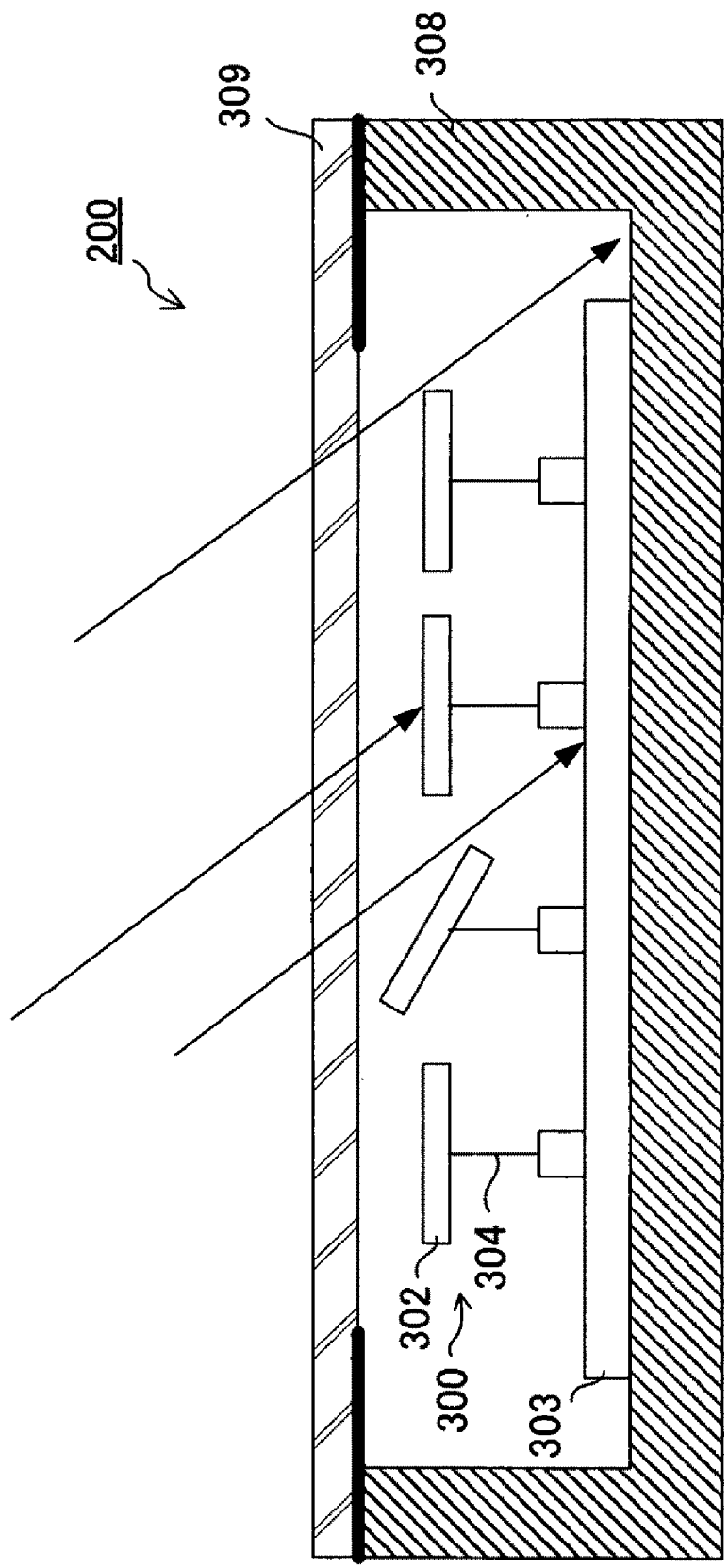
FIG. 4 is a cross-sectional diagram illustrating the incident light to a mirror device.
Figure 5A:
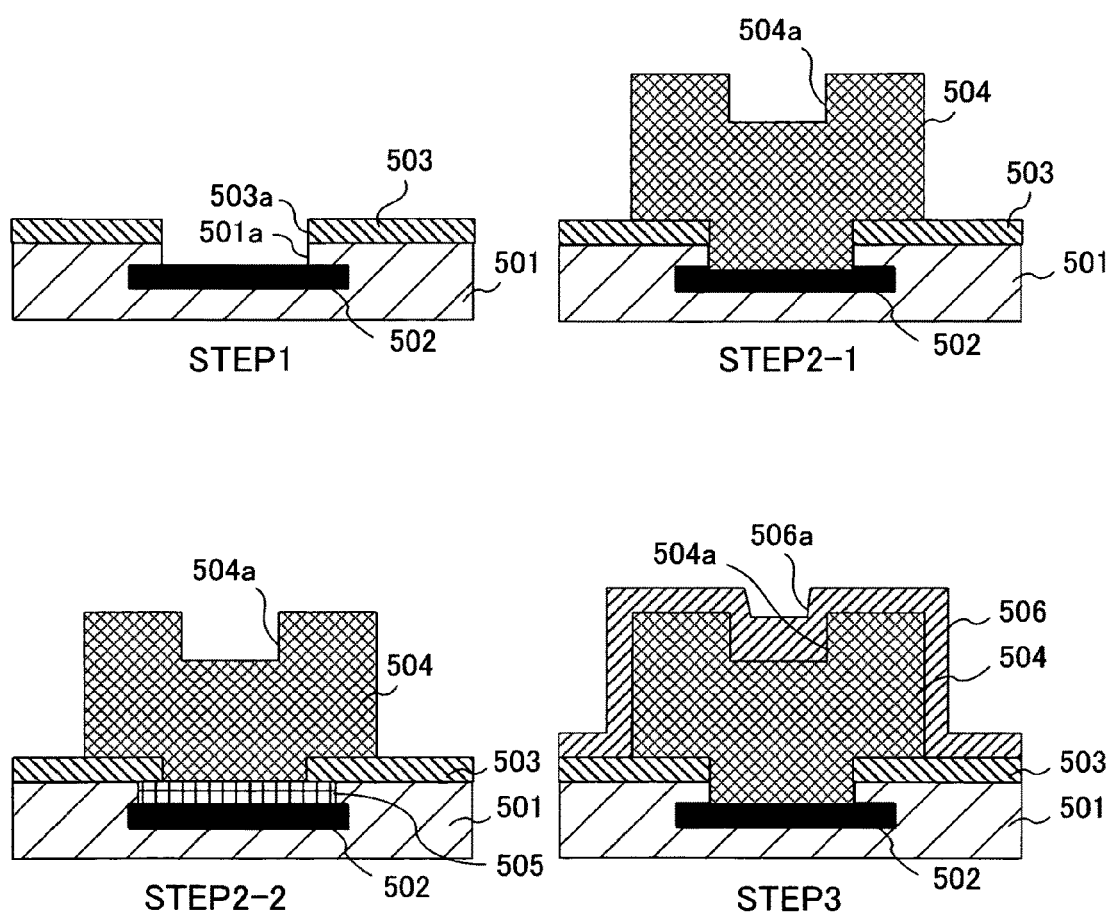
FIG. 5A is a cross-sectional diagram illustrating the method for manufacturing a mirror device according to a preferred embodiment of the present invention (part 1).

As shown in FIG. 5A, the wiring 502 of a drive circuit for driving and controlling a mirror (which is described later) is placed inside a semiconductor wafer substrate (simply noted as "substrate" hereafter) 501 shown in step 1.

Specifically, an opening (i.e., a cavity or concave part) 501a contacts the upper surface of wiring 502 is formed on the upper surface of the substrate 501, and the periphery (excluding opening 501a of the upper surface), side and bottom surfaces of wiring 502 are covered with a substrate (i.e., an insulation layer on the substrate) 501. Specifically wiring 502 is preferably made of aluminum.

Furthermore, a first protective layer (i.e., a protective film) 503 is deposited on the parts of the substrate 501 (shown in step 1) except for the opening 501a. The first protective layer 503 is deposited before the opening 501a of the substrate 501 is formed, and therefore an opening 503a of the same area as opening 501a is also formed on the first protective layer 503. The first protective layer 503 is a layer for preventing wiring 502 from being corroded with hydrogen fluoride (HF) when the sacrifice layer (which is described later) is removed by an etchant HF.

Specifically, the substrate 501 shown in FIGS. 5A through 5F includes only an insulation layer deposited on the upper part of the silicon substrate. The insulation layer and first protective layer 503 each is preferably a layer which has structure that may comprise amorphous silicon, a double-layer structure consisting of amorphous silicon and silicon carbide (SiC), and which includes silicon such as silicon carbide (SiC) and silicon dioxide ($SiO_2$).

In step 2-1, an electrode 504 is formed on the first protective layer 503 with the openings 501a and 503a at the center. In this process, the electrode 504 is deposited also on the openings 501a and 503a, and therefore a concave opening (i.e., a cavity or an opening from the top of the substrate) 504a is formed on the upper surface and at the center of the electrode 504. Specifically, the electrode 504 is preferably connected to a micro-electrical mechanical system (MEMS) structure that corresponds three-dimensionally (that is, corresponding in different plural surfaces in the case of a face to face connection). The present embodiment is configured such that an elastic hinge (which is described later) formed by applying a micro electromechanical system) MES) technology as a MEMS structure. Furthermore, the electrode 504 is connected to one end of the elastic hinge (i.e., a part of the side surface of the elastic hinge and the bottom surface thereof according to the present embodiment) as a MEMS structure.

In an exemplary embodiment the electrode 504 is fabricated with aluminum containing silicon (Si) to prevent an occurrence of migration between the electrode 504 and the elastic hinge. Specifically, the electrode 504 functions as base for fixing the elastic hinge, which is described in detail below.

Particularly, when aluminum is used for the electrode 504, and amorphous silicon is used for the insulation layer and the first protective layer 503, the aluminum-made electrode 504 is corroded if the aluminum-made electrode 504 comes into contact these layers. Therefore, a silicon carbide (SiC) layer should be provided between the amorphous silicon layer and the aluminum-made electrode 504. Alternatively, a mixing of the aluminum-made electrode 504 with an impurity such as silicon (Si) or a provision of one or two barrier layers using a material other than a silicon carbide (SiC) layer can prevent the corrosion of electrode 504.

A plurality of electrodes may be manufactured in the same production process in a device configuration wherein the electrode 504 has the same height as that of one or more electrodes disposed under the end of a mirror (not shown in a drawing herein).

As the electrode 504 is deposited in step 2-1, it is preferable to confirm an absence of abnormality in the operation of a drive circuit and/or the electrical continuity of the electrode 504 by testing the drive circuit formed on the substrate 501.

Particularly with the electrode 504 formed on the wiring 502 in step 201; to the manufacturing process may also form a Via (i.e., an intermediate layer or a connection part) 505 between the wiring 502 and electrode 504 as shown in step 2-2. The Via 505 is preferably made of an electrically conductive material such as metals containing tungsten, copper, or aluminum, and to have a horizontal cross-sectional area smaller than the cross sectional area of electrode 504.

A second protective layer 506 is formed in step 3. The second protective layer 506 is deposited on the upper part of the electrode 504 and first protective layer 503, also forming a concave opening 506a in a part where the material has flowed into the concave opening 504a of the electrode 504. Specifically, the thickness of the second protective layer 506 is preferably 500- to 3000 angstroms. Practically, if the protective film has a thickness of 1000 angstroms or more, the light is absorbed before reaching inside of the substrate, and thereby the protective film can reduce the effect of a photoelectric effect on the circuit inside of the substrate. Blue light is attenuated to about 5% at 500 angstroms, while green light is attenuated to about 5% at 1000 angstroms. Red light is attenuated to 10% or less at 2000 angstrom. Furthermore, the smaller the gap between mirrors, the more the photoelectric effect is attenuated because of the illumination light emitted to the substrate through the gap is reduced.

Furthermore, the amount of reflection light is increased by an increase in the area of the reflection surface of a mirror and thereby a bright image is produced. The reflection surface of mirrors preferably occupies 80% or more (preferably 90% or more) of the area of the mirror array. Moreover, if a mirror comprises a single layer of aluminum, the thickness of aluminum is preferably at least 600 angstrom because the illumination light transmits through an aluminum layer with a thickness of about 300 angstrom. a. In consideration of a variation in production and the flatness of the mirror, the thickness of aluminum is preferably no less than 1500 angstroms, and about 3000 angstroms for a single layered structure of aluminum.

Specifically, the second protective layer 506 is accumulated at 380- to 400° C. by using silane and argon (SiH4+Ar) in a plasma-enhanced CVD (PECVD) process to form a layer of amorphous silicon as a semiconductor material. Note that depositing this layer via a chemical vapor deposition (CVD) process involves deposition of a film utilizing a chemical catalytic reaction by supplying a gaseous material in accordance with the type of the sacrifice layer. The second protective layer 506 may be formed as a plurality of layers combined with a protective layer composed of a material such as silicon carbide (SiC).

Figure 5B:
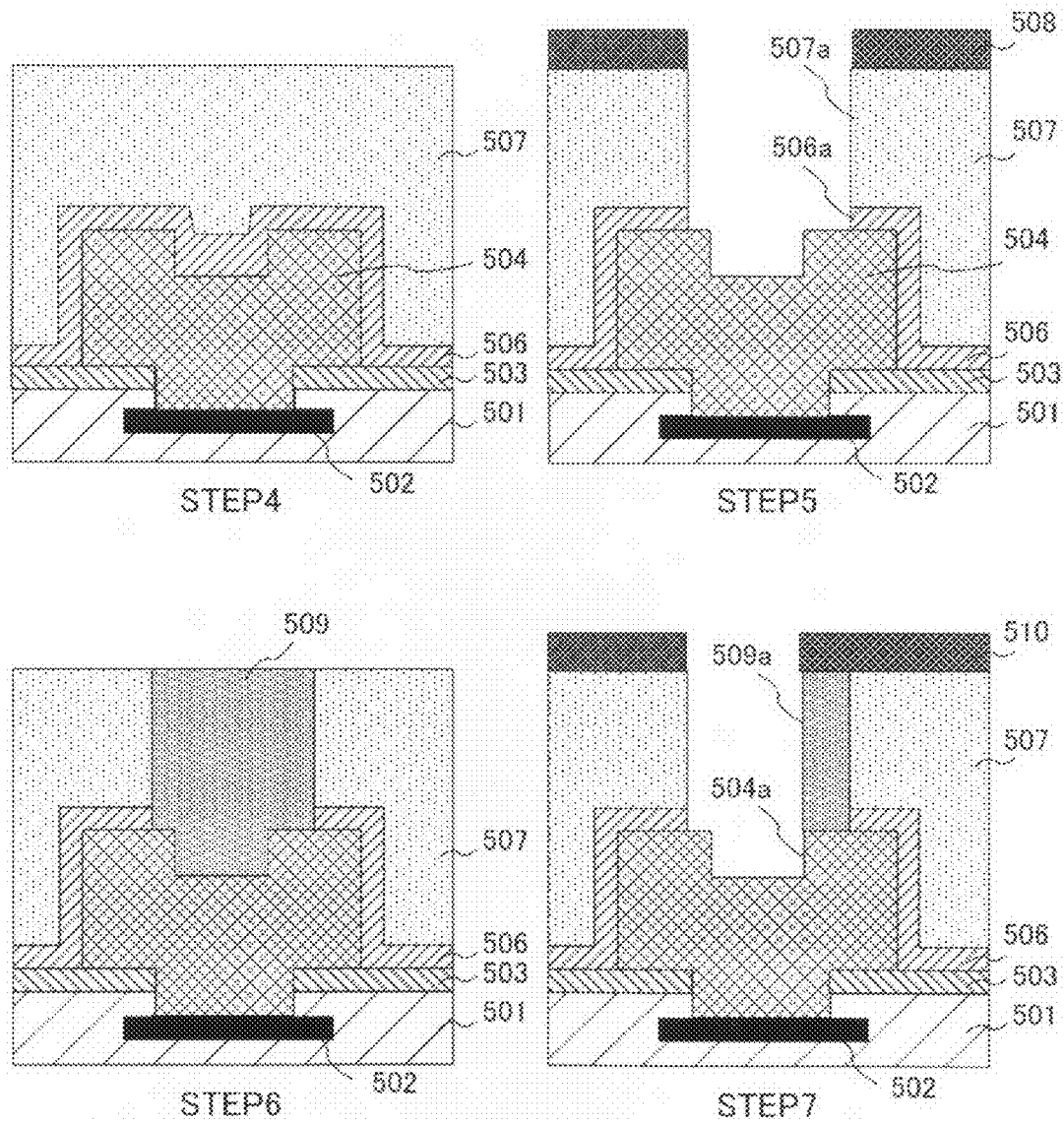
FIG. 5B is a cross-sectional diagram illustrating the method for manufacturing a mirror device according to a preferred embodiment of the present invention (part 2).

In step 4 shown in FIG. 5B, a first sacrifice layer 507 is formed. The first sacrifice layer 507 is deposited at 400° C. by using silane, oxygen, and argon (SiH4+O2+Ar) in high-density plasma (HDP)-PECVD process and is formed as a layer of oxide. Note that the top of an elastic hinge (which is described later) is formed with the first sacrifice layer 507 and therefore the height of the sacrifice layer 507 is determined on the basis of a desired height of the elastic hinge as described later.

In step 5, a first photoresist layer 508 is formed by applying a spin coating on the sacrifice layer 507. Then, the holes 506a and 507a of the first sacrifice layer 507 and second protective layer 506, respectively, are formed in the concave part 504a of the electrode 504 and the upper part surrounding them by applying an etch process to open the hole.

The hole 507a is etched in the first sacrifice layer 507 using the gas of octafluorocyclobutane ($C_4F_8$) and carbon monoxide (CO) by applying a reactive ion etching (RIE) process. Furthermore, if the second protective layer 506 is made of silicon (Si), the etching is applied with hydrogen bromide (HBr) and chlorine (Cl) gas, and, if the second protective layer 506 contains silicon carbide (SiC), an etching process is performed by using tetrafluoromethane, oxygen, and argon ($CF_4+O_2+Ar$) by applying the RIE forms the hole 506a in the second protective layer 506.

In step 6, a second sacrifice layer 509 is deposited in the respective holes 506a and 507a of the second protective layer 506 and first sacrifice layer 507, and in the concave part 504a of the electrode 504. The surface is then planarized by applying a chemical mechanical polishing (CMP) process and thereby the step of the upper surfaces between the first sacrifice layer 507 and second sacrifice layer 509 is removed.

In step 7, the second sacrifice layer 509, other than a part 509a thereof is deposited in the surrounding area of the concave part 504a of the electrode 504, is removed by applying the etching. A second photoresist layer 510 is formed in advance of the etching, and then an opening is obtained by the etching.

Note that an elastic hinge (described later) will be extended perpendicularly upward from the concave part 504a of the electrode 504 along the un-removed part 509a of the second sacrifice layer 509. Therefore, the s sacrificial layer 509a must be formed with a configuration in accordance with the size and shape of the elastic hinge.

Figure 5C:
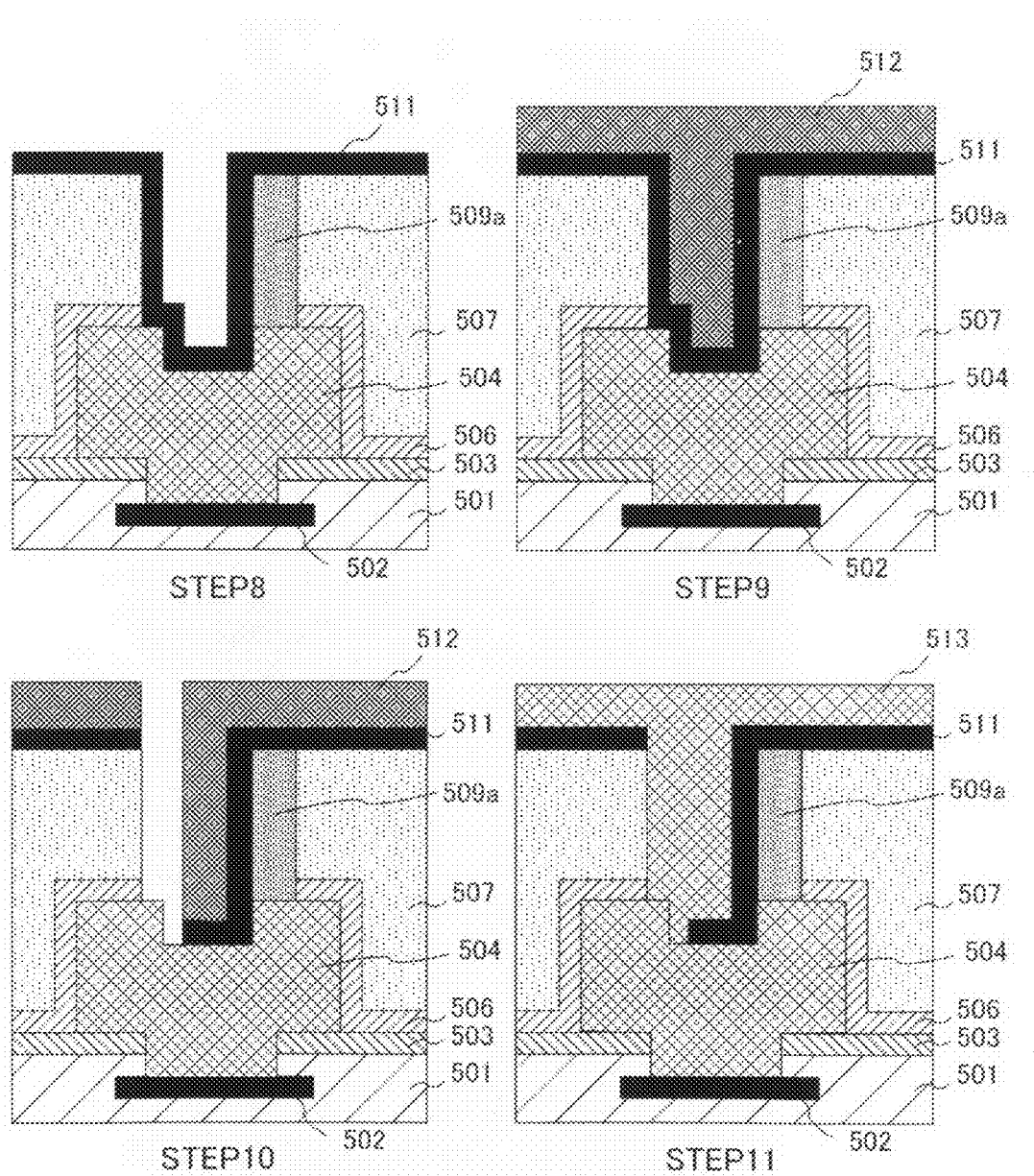
FIG. 5C is a cross-sectional diagram illustrating the method for manufacturing a mirror device according to a preferred embodiment of the present invention (part 3).

In step 8, shown in FIG. 5C, a hinge layer 511, which will constitute an elastic hinge later, is formed at 380- to 400° C. by using SiH4+Ar by applying a plasma enhanced chemical vapor deposition (PECVD) process. The thickness of the hinge layer 511 is preferably between 100- and 1000 angstroms, in consideration of a spring force for deflecting a mirror and the electrical resistance of the hinge. The thickness of the hinge layer 511 is no more than 500 angstroms and preferably between 150- and 500 angstroms.

Furthermore, a part of the hinge layer 511 includes the surface parallel to a mirror as described below and on which a joinder part 516a (FIG. 5C) is formed is deposited on the upper surface of the first sacrifice layer 507, has a different film thickness in the part perpendicularly deposited inside the first sacrifice layer 507, with a thicker film accumulated toward the upper surface of the first sacrifice layer 507, that is deposited with a thickness two to four times that of the part that is formed perpendicularly.

The upper part of the first sacrifice layer 507 is preferably thicker since it is a region with little elastic deformation. It also makes it more convenient to form a joinder part 511b as will be further described below.

The hinge layer 511 may be made from any one or combinations of the following material that includes single crystal silicon, poly-silicon, and amorphous silicon, which is doped with boron (B), arsenic (As), or phosphorous (P) as additive.

Alternatively, the hinge layer 511 may be fabricated with electrical conductivity by applying an in-situ doping with arsenic, phosphorous, and the like, by applying an ion implant or by diffusing a metallic silicide such as nickel silicide (NiSi) and titanium silicide (TiSi). Furthermore, the hinge layer 511 may be formed with aluminum containing silicon (Si). Moreover, the hinge layer 511 may be formed with a material containing the same material contained in the material constituting the first protective layer 503.

Practically, there may be alternative configurations such that the electrode 504 and hinge layer 511 are fabricated with materials which contain the same component material, such that the aforementioned two components are made of the same material, such that the electrode 504 has a higher thermal conductivity than that of the hinge layer 511 to conduct heat effectively from the lower part of an elastic hinge as described below. This layer composed of a material different from the materials of electrode 504 and hinge layer 511 is therefore formed between the aforementioned two components.

In step 9, a third photoresist layer 512 is formed on the hinge layer 511.

In step 10, the third photoresist layer 512 that covers throughout the upper part of a part of the concave part 504a of the electrode 504 and the upper part surrounding the aforementioned part, is removed by applying etching. The process prepares a space to form a head of an elastic hinge as described below on the lower side. It is followed by etching the hinge layer 511 to form the feature of an elastic hinge. The etching may use $SF_4+O_2+Ar$ by applying an RIE and isotopic. Furthermore, in step 10, etching is applied such that the width of the elastic hinge (the width is indicated by the width as delineated in the cross-section shown in step 10) measures between 0.5- and 1.5 μm on a surface in the depth direction of the cross-sectional diagram shown in step 10.

In step 11, the third photoresist layer 512 is removed by using $O_2$, and a third sacrifice layer 513 is formed thereon. Then, the surface is smoothed by applying a CMP planarization process. More specifically, in an exemplary embodiment, the third sacrifice layer 513 may be formed as tetraethoxysilane (TEOS) or as a similar layer.

Figure 5D:
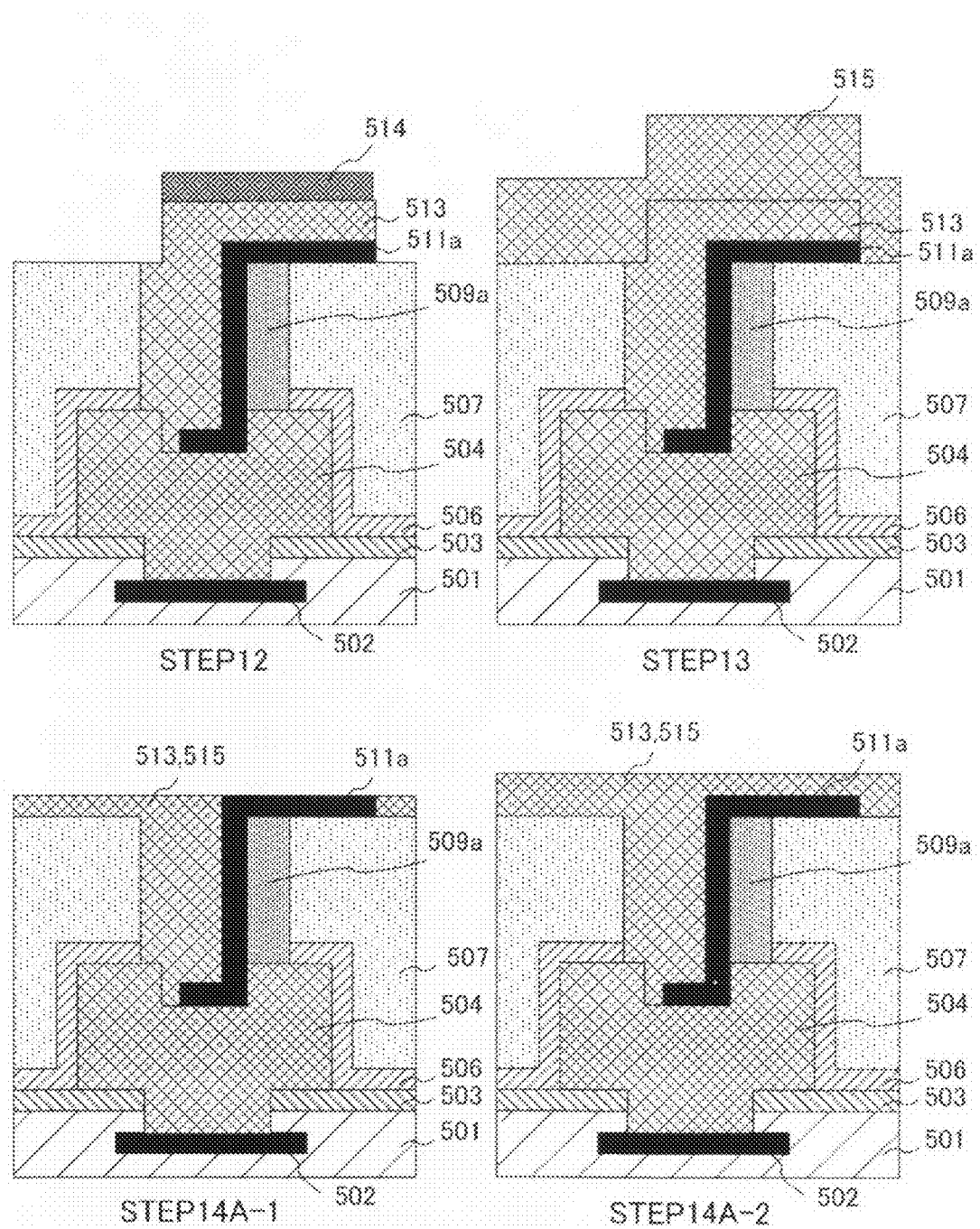
FIG. 5D is a cross-sectional diagram illustrating the method for manufacturing a mirror device according to a preferred embodiment of the present invention (part 4).
Figure 5E:
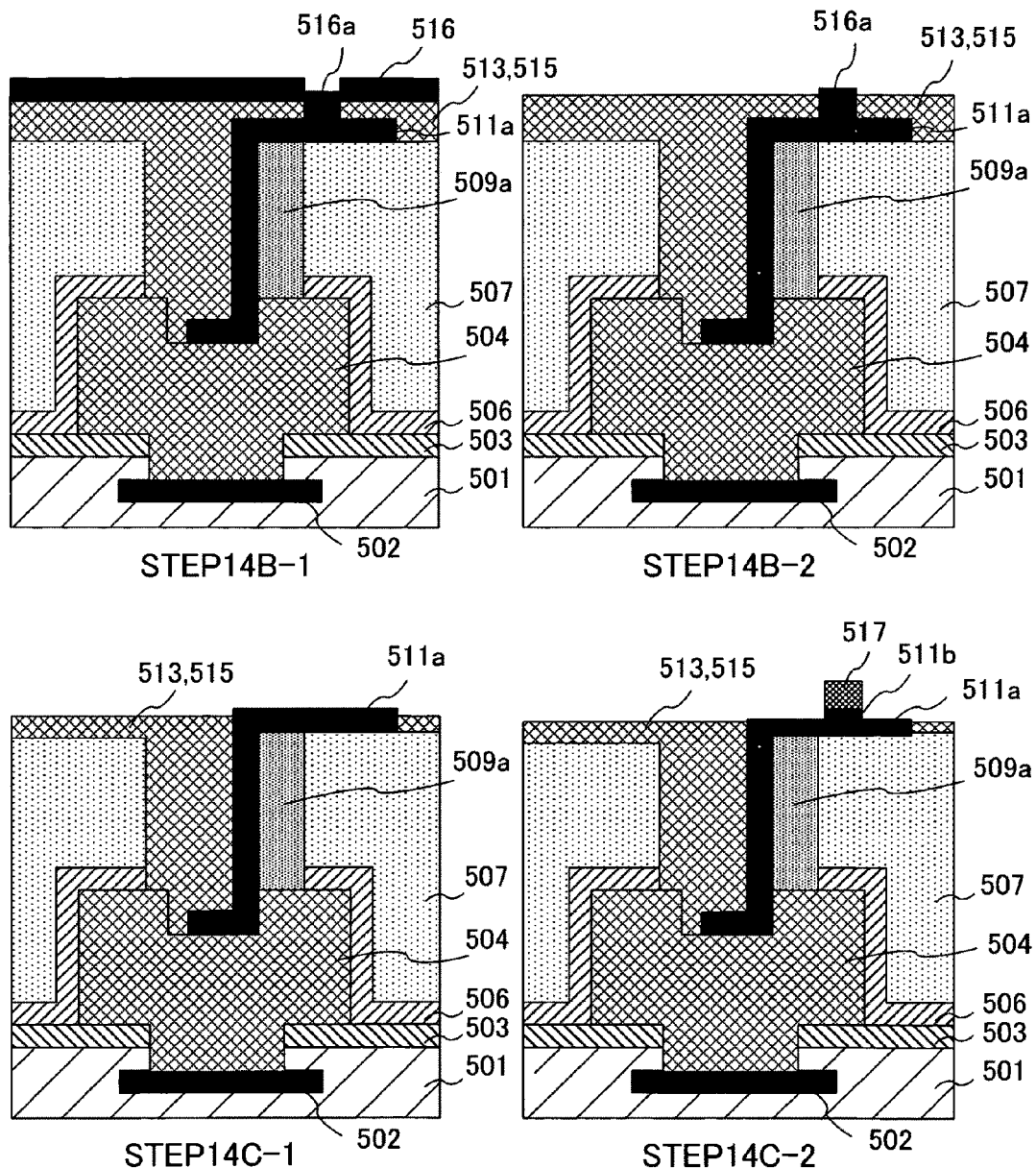
FIG. 5E is a cross-sectional diagram illustrating the method for manufacturing a mirror device according to a preferred embodiment of the present invention (part 5).

In step 12, shown in FIG. 5D, a fourth photoresist layer 514 is formed on the upper part of an elastic hinge 511a in order to prepare a space to form the head position on the upper side of the elastic hinge 511a. Then an etching process is applied to remove parts other than the elastic hinge 511a and the elastic hinge 511a is formed with the predetermined height of the third sacrifice layer 513 and hinge layer 511. With this process, the elastic hinge 511a is formed.

The bottom surface of elastic hinge 511a is attached to the bottom surface of the concave part 504a of the electrode 504 and also to the vertical part of the elastic hinge 511a that extends approximately perpendicular to the substrate 501. The elastic hinge is further attached to the side surface of the concave part 504a. Therefore, the elastic hinge 511a is connected to the electrode 504 in three-dimensions and fixed securely onto the electrode 504.

Specifically, the elastic hinge 511a is connected to the electrode 504, which is positioned under the second protective layer 506, so that the elastic hinge 511a penetrates the second protective layer 506 and stays without contact therewith. Furthermore, the elastic hinge 511a and second protective layer 506 are formed not to be electrically conductive with each other even after the processes of steps as will be described below. Specifically, an insulation layer may be placed between the elastic hinge 511a and second protective layer 506 so that these two components are not electrically conductive with each other. If the second protective layer 506 is made of a high-resistance insulator, the elastic hinge 511a may be in contact with the second protective layer 506.

In step 13, the fourth photoresist layer 514 is removed, and then a fourth sacrifice layer 515 is formed. More specifically, the first through fourth sacrifice layers may be formed by using the same material. Then, the surface of the fourth sacrifice layer 515 is polished by applying the CMP planarization process.

In step 14A-1 shows the elastic hinge 511a supported on the substrate 501, which is placed near the center of a wafer Step 14A-2 shows the elastic hinge 511a at the end of the substrate 501 that is placed at the end of the wafer. With such configurations, the amounts of polishing are different between the center and surrounding depending on the CMP condition for the respective wafers. In the step 14A-1, the fourth sacrifice layer 515 can be polished by applying the CMP to the upper surface of the elastic hinge 511a. Therefore, a mirror can be formed on the elastic hinge 511a. In the step 14A-2, however, the fourth sacrifice layer 515 at the end of the substrate 501 cannot be polished to the upper surface of the elastic hinge 511a, creating the possibility that a mirror (which is described later) cannot be connected to the elastic hinge 511a.

Accordingly, an etching process is applied to remove a part of the fourth sacrifice layer 515 positioned on the upper surface of the elastic hinge 511a. Then a semiconductor material 516 possessing electric conductivity is formed by applying the CVD as step 14B-1 shows in FIG. 5E. The semiconductor material 516 may use a single crystal silicon (Si) or poly-silicon. Either of these materials may be doped with boron (B), arsenic (As), or phosphorous (P). Furthermore, the semiconductor material 516 may comprise a material that includes the same component material as composed in the material for the elastic hinge 511a.

Then, step 14B-2 shows the semiconductor material 516 is removed by applying etching. One or no less than two joinder parts (i.e., convex part, conductive part and conductive layer) 516a are formed in the part from which the fourth sacrifice layer 515 has been removed. Then, the upper surfaces of the third and fourth sacrifice layers 513 and 515, and the upper surface of the joinder part 516a, are processed through polishing by applying the CMP. The joinder part 516a is set at a necessary height (e.g., 0.1 μm) in accordance with the flatness of the third and fourth sacrifice layers 513 and 515. Furthermore, the joinder part 516a is formed having a size smaller than a mirror 518. This configuration can prevent a variation of the height of the mirror (518) from the substrate surface that may occur in each region of a wafer or in each wafer.

Furthermore, as a different production method for a joinder part 516b, a joinder part 511b can be formed by applying a fifth photoresist layer 517 on a part of the upper surface of the elastic hinge 511a and then applying an etching process as shown in step 14C-2, starting from the state shown in step 14C-1.

Figure 5F:
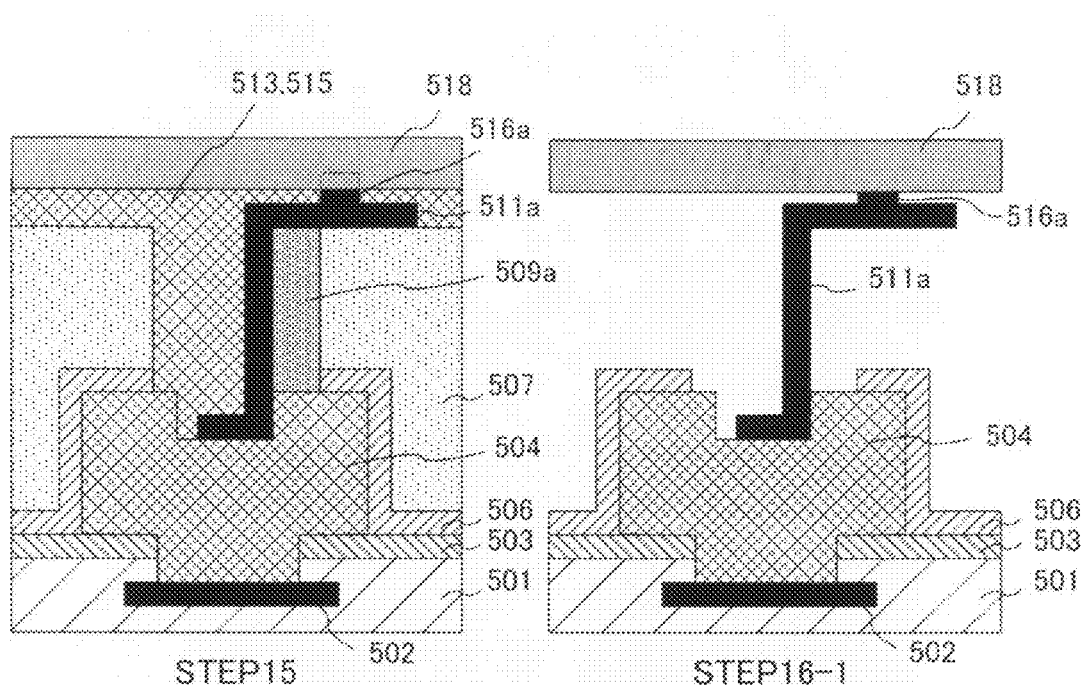
FIG. 5F is a cross-sectional diagram illustrating the method for manufacturing a mirror device according to a preferred embodiment of the present invention (part 6).
Figure 5F:
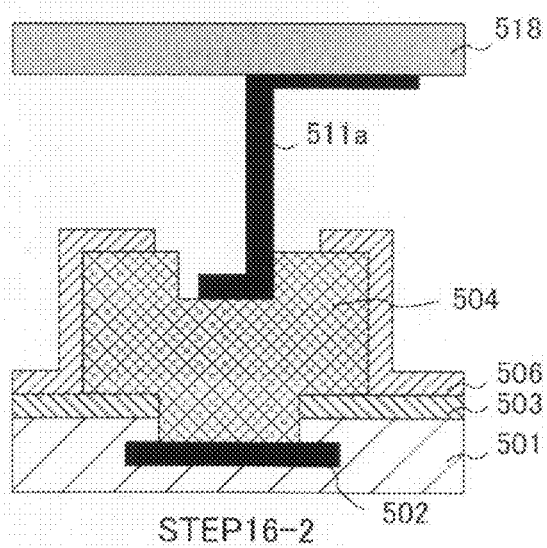

Following the steps 14B-1 and 14B-2 after forming the joinder part 516a, In , an aluminum-made mirror (i.e., a reflector mirror) 518 is formed by applying a sputtering process as shown in step 15 of FIG. 5F. The shape of the mirror 518 may be configured to an approximate square or an approximate parallelogram in an orthogonal view. Specifically, the mirror 518 is formed with the joinder part 516a projected upward beyond the sacrifice layers 513 and 515 to join the joinder part 516a with mirror 518 inside mirror 518.

Then, the first through fourth sacrifice layers 507, 509a, 513, and 515 are removed with a hydrogen fluoride (HF) gas and alcohol as shown in step 16-1 in forming the joinder part 516a, and in step 16-2 forming the hinge without a joinder part.

If the first through fourth sacrifice layers 507, 509a, 513, and 515 are formed by the TEOS, the first through fourth sacrifice layers are removed with an HF gas and alcohol. The remaining foreign material and sacrifice layers can be completely removed by adjusting the densities of the hydrogen fluoride and alcohol and the processing time. As a result, when the mirror 518 comes in contact with the second protective layer 506 on the electrode 504 a stiction between the mirror 518 and the substrate can be prevented. Specifically, the first through fourth sacrifice layers 507, 509a, 513, and 515 may be removed after the substrate 501 is cut from its form of a wafer into individual devices by applying dicing to the wafer. This configuration has the benefits of laminating a protective layer composed of SiO2 or similar type of layer (not specifically shown in the drawing) to cover and protect the entire upper surface of the mirror 518 before the application of a wafer dicing process.

The elastic hinge 511a and mirror 518 formed on the substrate 501 according to above processes is made electrically conductive to a drive circuit (not shown in a drawing herein) and the electrode 504 for applying a voltage thereto to deflect the mirror 518.

Furthermore, a light shield layer for suppressing the reflection light from the surface of the protective layer 506 may be formed on the surface of the protective layer 506. Specifically, the light shield layer is preferably a coating layer which would have insignificant influence the resistance value of the elastic hinge 511a.

Meanwhile, there is an anti-stiction countermeasure process for preventing a moving part (mainly a mirror) from sticking to the stopper that may be implemented as part of an electrode. The problem of stiction often causes an operation failure of the mirror devices. The anti-stiction member may be provided by laminating a monolayer of perfluorooctyl-trichlorosilane ($CF_3(CF_2)_5(CH_2)_2SiCl_3$; PFOTS), perfluorooctyldimethylchlorosilane ($CF_3(CF_2)_5(CH_2)_2Si(CH_3)_2Cl$; PFODCS), or perfluorodecyldimethylchlorosilane ($CF_3(CF_2)_7(CH_2)_2Si(CH_3)_2Cl$; PFDDCS) on the protective layer 506 and mirror 518. When such a monolayer is further deposited on the surface of the protective layer 506, it is preferable to use a high resistance material similar to that of the protective layer 506 to minimize the effects of changing the resistance of the elastic hinge 511a.

In practice, there are processes for dividing a mirror device by dicing the wafer into mirror devices of specific predefined size followed by the packaging processes for enclosing and protecting individual mirror devices as electronic device packages. A description of these processes is not provided herein.

Practically, it may be preferable to produce the mirror device by configuring the elastic hinge 511a with a height of 2 μm or less, or further preferably 0.3 to 1.2 μm, and configuring the mirror 518 of each mirror element as an approximate square with one side being 10 μm or less.

Furthermore, an elastic hinge connected onto an electrode is placed in the vicinity of the rear surface of a mirror so that to reduce the illumination light transmitted onto the hinge.

Figure 6A:
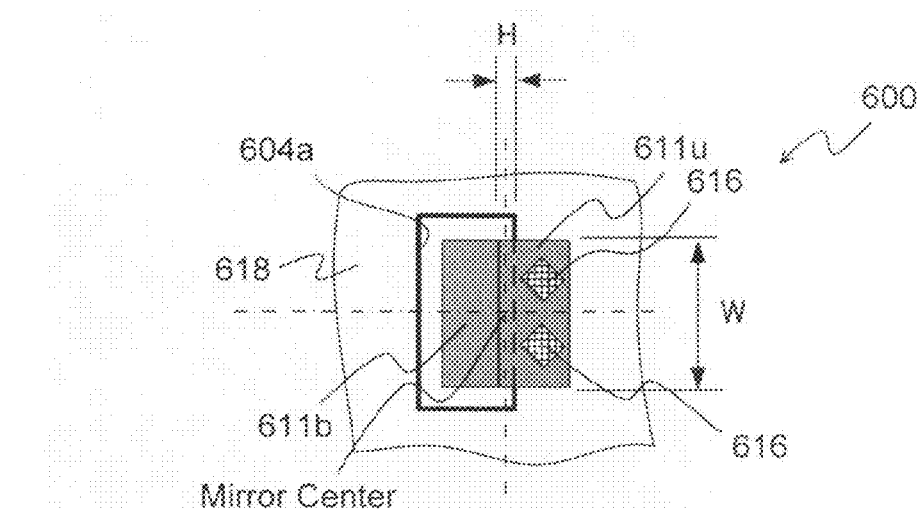
FIG. 6A is a top perspective view diagram showing a mirror element.
Figure 6B:
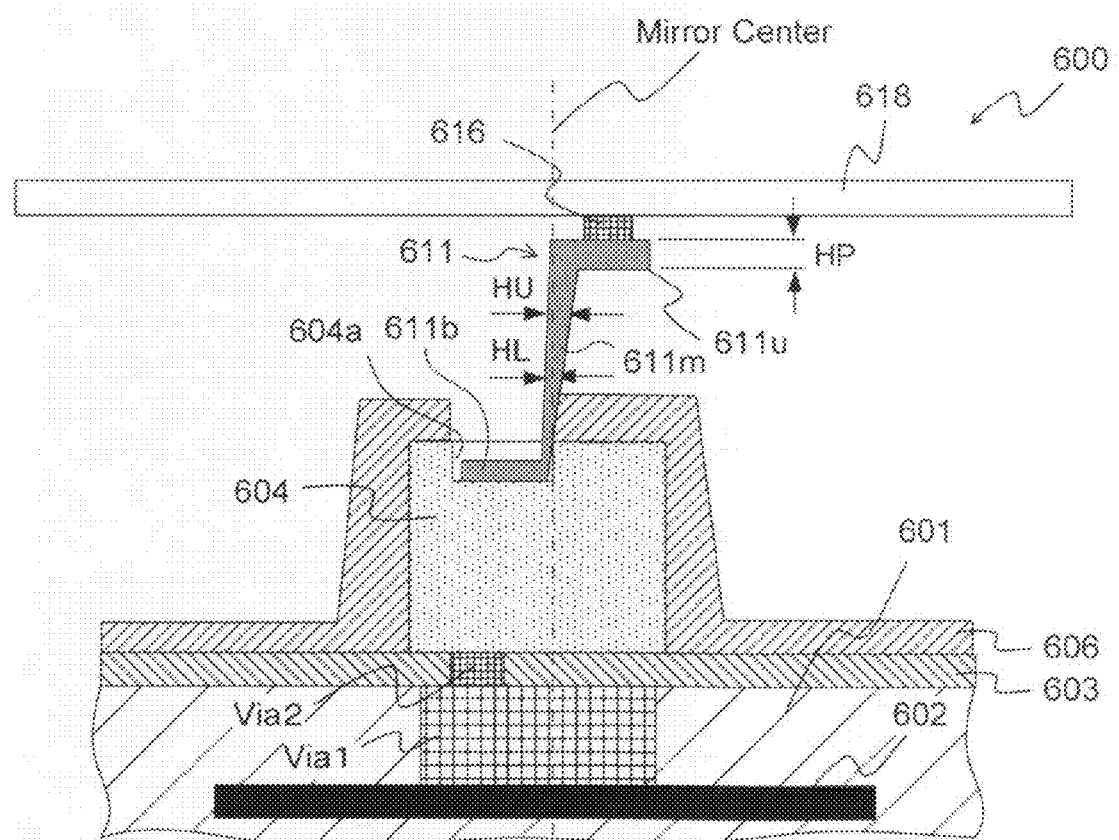
FIG. 6B is a side cross sectional view diagram of a mirror element.

FIG. 6A is a top view diagram showing a mirror element 600; FIG. 6B is a side cross sectional view diagram of the mirror element 600.

The elastic hinge 611 of the mirror element 600 is manufactured by a production method by the above-described production method, has the intermediate part 611m extending in a vertical direction (i.e., approximately perpendicular to a substrate 601). Furthermore, the upper part 611u of the elastic hinge 611 is a flat part extending horizontally, bending from the intermediate part 611m, while the bottom part 611b of the elastic hinge 611 is a flat part extending horizontally, in the direction opposite to the upper part 611u, by bending from the intermediate part 611m.

The upper part 611u of the elastic hinge 611 is connected to a mirror 618 interconnected through a joinder part 616. The elastic hinge 611 is placed at the center of the mirror 618, and the joinder part 616 is placed at a position with an offset distance away from the center of the mirror 618 in the deflection direction thereof. Alternatively, the joinder part 616 may be placed at a position biased in a direction different from the deflection direction of the mirror 618.

Furthermore, the bottom part 611b of the elastic hinge 611 is attached to the bottom surface of the concave part 604a of an electrode 604, while the intermediate part 611m is attached to the side surface of the concave part 604a.

In FIG. 6A, the joinder part 616 has a rectangular form, with all sides of the joinder part 616 in the horizontal orientation having an inclination relative to the deflection direction of the mirror 618. Specifically, each side of the joinder part 616 is placed at a 45 degree angle relative to the deflection direction of the mirror 618. An irregularity of the joinder part 616 when formed on the reflection surface of the top surface of the mirror 618 may cause diffraction light and/or scattered light in addition to the reflection light when reflecting the illumination light by the mirror. Even with such irregularities, the configuration that prevents the irregularity from crossing orthogonally with the deflection direction of the mirror can still minimize the adverse effects caused by diffraction light by minimizing the diffraction light to project together with an ON light. Furthermore, an irregularity on the top surface of the mirror may be minimized by limiting the height of the joinder part 616 to no more than 0.1 cm, preferably no more than 0.05 μm. Furthermore, the outer shape of the joinder part 616 may be formed with a circle or oval shape having an outer profile that has no straight side.

More specifically, the elastic strength of the elastic hinge for each mirror element 600 may be greatly affected if the thickness or height of the elastic hinge 611 fluctuates in the processes of fabricating the elastic hinge 611. Furthermore, due to the residual stress caused at the production, the elastic hinge 611 may be deformed after removing the sacrifice layer surrounding of the elastic hinge 611. Therefore, in order to manufacture reliable mirror device, the elastic hinge is formed to satisfy the condition that the width of an elastic hinge (i.e., the length in the depth direction of the cross-section diagram shown in FIG. 6B) W>the height L of the elastic hinge It is desirable that the elastic hinge 611 be placed approximately vertical between the center electrode 604 and mirror 618, and to satisfy the relationship of:

the width W of the elastic hinge 611≧the height L of the elastic hinge>the thicknesses HP, HU and HL of the elastic hinge Practically, the inventors of the present invention have experimental data to confirm that the mirror 618 deposited on the elastic hinge 611 tends to incline instead of maintaining a horizontal position if the condition of:

the width W of an elastic hinge>the height L of the elastic hinge is not satisfied in an exemplary embodiment with the height L of an elastic hinge is approximately 1 μm and the width W of the elastic hinge is approximately 0.8 μm.

In contrast, the mirror 618 is stable at a horizontal position when the condition of:

the width W of an elastic hinge>the height L of the elastic hinge is satisfied, for an exemplary embodiment with the height L of an elastic hinge 611 is approximately 1 μm and the width W of the elastic hinge 611 is approximately 1.2 μm.

Specifically, the width W of each elastic hinge can be reduced when a mirror 618 is implemented with multiple elastic hinges 611. However, if the elastic hinge has a reduced thickness, it is desirable to satisfy the condition of:

the width W of an elastic hinge>the height L of the elastic hinge

Furthermore, a joinder layer having the same area size and shape as the mirror 618, can be deposited on the bottom surface of the mirror 618. For a joinder layer formed with small area, it has an advantage of avoiding the deformation and/or warping of the mirror 618 due to the difference in the linear expansion coefficient between the mirror 618 and joinder layer.

The intermediate part 611m of the elastic hinge 611 is tapered off from the upper part 611u toward the bottom part 611b, with the thickness gradually decreasing toward the bottom part 611b (i.e., the thicknesses HU>HL). Specifically, the thickness HP of the upper part 611u is the same as that of the uppermost part of the intermediate part 611m, while the thickness of the bottom part 611b is about the same as that of the middle part of the intermediate part 611m.

Furthermore, the elastic hinge 611 preferably satisfies the relationship of:

the area of a cross-section horizontal to the substrate 601 of the upper part 611$u$>the area of a cross-section horizontal to the substrate 601 of the bottom part 611$b$ According to above descriptions, the elastic hinge 611 can be fabricated with convenient manufacturing processes. There are further test data with analytic results to show that the elastic hinges are formed with a high durability, so that the elastic hinge is expected to reliably sustain up to several trillion of deflections with malfunctions.

Meanwhile, the height of the electrode 604 from the substrate 601 is approximately the same as the height of the part of elastic hinge 611 that projects from the concave part 604$a$ of the electrode 604. Alternatively, the height of the projecting part of the elastic hinge can be smaller. This configuration reduces the potential problems such as having mirror 618 inclined relative to the substrate 601 in the process of removing a plurality of sacrifice layers. Furthermore, the smaller the distance between the mirror 618 and electrode 604, it is more convenient to make the mirrors with uniform heights on the wafer.

Furthermore, a configuration that makes the height of the elastic hinge 611 no more than the distance between the mirror 618 and substrate 601 further reduces the potential problems such as having mirror 618 formed with an inherent inclined angle relative to the substrate 601.

Specifically, FIG. 6B shows a second protective layer 606 is deposited on top of the first protective layer 603. The first protective layer 603 is made of a silicon carbide (SiC) material, while the second protective layer 606 is made of an amorphous silicon material. The elastic hinge 611 is also made of an amorphous silicon material and doped with boron (B), phosphorous (P), or arsenic (As). Because of this, when a voltage is applied to the electrode, the voltage is further applied to the mirror 618 through the elastic hinge 611. Alternatively, the mirror 618 can be connected to the ground (GND) by way of the elastic hinge 611. Practically, the resistance of the elastic hinge 611 is preferably a resistance value of 1 GΩ or less, or more preferably 100 MΩ or less. If the elastic hinge 611 is made of amorphous silicon, the resistance is high and would be approximately 1 TΩ or higher. If the amorphous silicon contains a very small amount of impurity, the resistance value will be as high as 1000 times. If the resistance value of the elastic hinge 611 is high, the electrons would not transmit through the elastic hinge 611 smoothly, worsening the response characteristic when the mirror 618 deflects. The voltage to be applied to the address electrode for driving the mirror 618 may be increased. When the mirror is to be turned On/Off at a high-speed, such as 300 nsec or less, or 100 nsec or less, or even 20 nsec or less, the resistance of the elastic hinge is preferably at least 1 GΩ or less, or further preferably 500 MΩ or less. If the mirror needs to be driven at an even higher speed, the resistance value is preferably 200 MΩ or less, 100 MΩ or less, or even 50 MΩ or less.

On the other hand, the second protective layer 606 is not formed without applying a doping process and therefore remains as a high resistance layer. Specifically, the resistance value of the second protective layer 606 is higher than that of the elastic hinge 611. Furthermore, a mirror device is preferably produced with a 0.15- to 0.55 µm gap between the mirrors 618 by forming the elastic hinges 611 at the height of 2 µm or less, or more preferably between 0.3- and 1.2 µm, on the electrodes of approximately the same heights and by configuring the mirror 618 of each mirror element as an approximate square with each side being 8- to 10 µm. This configuration has a further advantage that the elastic hinge 611 is obscurely placed in the vicinity of the rear surface of the mirror 618 to reduce the amount of the illumination light directly illuminated onto the elastic hinge 611. The configuration is advantageous even if the elastic hinge 611 is made of a semiconductor material and has a relatively high resistance value, because the movement of photoelectrons inside the elastic hinge 611 due to the illumination light can be reduced.

Figure 7A:
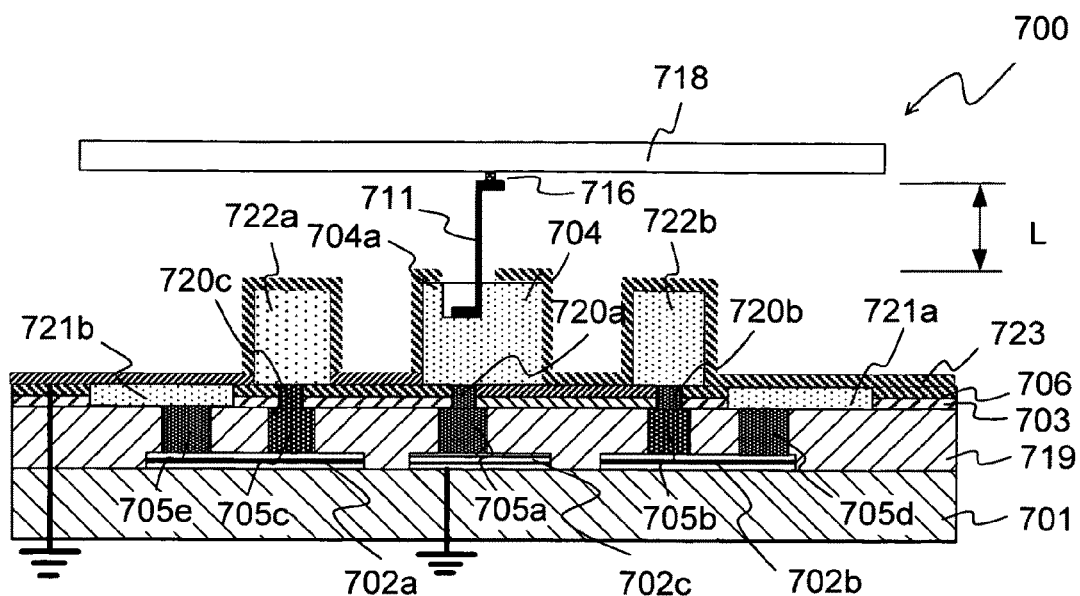
FIG. 7A is a cross-sectional diagram of a mirror element.

FIGS. 7A through 7F are diagrams for describing a mirror element 700. The mirror element 700 shown in FIG. 7A is manufactured by the fabrication processes described above, similar to the fabrication processes for the mirror element 600 shown in FIGS. 6A and 6B. The mirror element 700 formed on the substrate 701 includes the wirings 702$a$, 702$b$ and 702$c$ of a drive circuit for driving and controlling a mirror 718; first Vias 705$a$, 705$b$, 705$c$, 705$d$ and 705$e$, which are connected to the wirings 702$a$, 702$b$ and 702$c$; and a first insulation layer 719. Note that the drive circuit may be implemented with the dynamic random access memory (DRAM).

Specifically, the wiring 702$a$ on the left side of FIG. 7A further comprise two of the first Vias 705$c$ and 705$e$, both across the first insulation layer 719. The wiring 702$b$ on the right side of FIG. 7A also comprises two of the first Vias 705$b$ and 705$d$, both across the first insulation layer 719. Meanwhile, the wiring 702$c$ at the center comprise one of the first Vias 705$a$.

As described above, the first insulation layer 719 is formed with five of the first Vias. Practically, the number of first Vias may be different between the left and right wirings. Furthermore, the number of first Vias may be more, or less, than "5".

Then, second Vias 720$a$, 720$b$ and 720$c$ or surface electrodes 721$a$ and 721$b$ are formed on the first Vias 705$a$, 705$b$, 705$c$, 705$d$ and 705$e$. Specifically, the second Vias 720$a$, 720$b$, and 720$c$ are formed respectively on 1) the first Via 705$a$, which has been formed on the wiring 702$s$ at the center, 2) the first Vias 705$b$ and 705$c$, on one side, of two first Vias, which have been formed on the wirings 702$b$ and 702$a$ on the left and right sides. Meanwhile, surface electrodes 721$a$ and 721$b$ are formed respectively on the remaining first Vias 507$d$ and 705$e$ where none of the second Vias 720$a$, 720$b$, and 720$c$ is formed.

Then, a first protective layer 703 is formed on the first insulation layer 719 and a second protective layer 706 is formed on the first protective layer 703.

Specifically, the semiconductor wafer substrate 701 may preferably be a silicon substrate.

The wirings 702$a$, 702$b$, and 702$c$ of the drive circuit may preferably be aluminum wirings.

The first Vias 705$a$, 705$b$, 705$c$, 705$d$, and 705$e$ and the second Vias 720$a$, 720$b$, and 720$c$ may preferably be made of a material including tungsten and copper.

The surface electrodes 721$a$ and 721$b$ may use the same or similar material as tungsten as the first Vias 705$a$, 705$b$, 705$c$, 705$d$, and 705$e$ and the second Vias 720$a$, 720$b$, and 720$c$. Alternatively, the surface electrodes may use a material with high electrical conductivity, such as aluminum. Furthermore, the shapes of the surface electrodes 721$a$ and 721$b$ may be designed at the producer's discretion. Additionally, the surface electrodes 721$a$ and 721$b$ are formed on the first Vias 705$d$ and 705$e$, respectively, using the configuration shown in FIG. 7A; alternatively, these electrodes may be formed directly on the wirings 702$a$ and 703$b$, respectively.

The first insulation layer 719 and the first and second protective layers 703 and 706 may preferably be layers containing silicon such as silicon carbide (SiC), amorphous silicon, and silicon dioxide (SiO2).

If aluminum is used for the surface electrodes 721$a$ and 721$b$, a direct contact between amorphous silicon and the aluminum-made electrode will cause surface corrosions on the aluminum electrodes 721a and 721b. Therefore, a silicon carbide (SiC) layer is preferably formed between the amorphous silicon and the aluminum-made surface electrodes 721a and 721b. Specifically, the electrodes may be formed with alternative configurations such as forming an electrode doped with impurity dopants such as silicon (Si), with aluminum, or forming a barrier layer made of tantalum (Ta) or titanium (Ti) on the top or bottom of the electrode. This barrier layer may comprise two or more layers.

Specifically, stiction generated by the contact between the mirror 718 and electrodes 722a or 722b on the left or right side can also be prevented by forming a stopper on the substrate 701 so that the mirror 718 does not come in contact with either electrodes 722a or 722b on the left and right sides.

For the mirror element 700 are formed with electrodes 704, 722a, and 722b electrically connected to the second Vias 720a, 720b, and 720c, respectively.

The electrodes 704, 722a, and 722b may preferably use a material such as aluminum or similar materials with high electrical conductivity.

The center electrode (i.e., the hinge electrode) 704 is the electrode formed for an elastic hinge and is configured to have the same height as the left and right electrodes 722a and 722b. A configuration with the individual electrodes 704, 722a, and 722b have the same height on the center, left and right sides, these three electrodes 704, 722a, and 722b may be simultaneously formed in a single processing step.

Furthermore, the center part for placing the elastic hinge 711 may be determined by later manufacturing steps by adjusting the height of the center electrode 704.

Figure 9A:
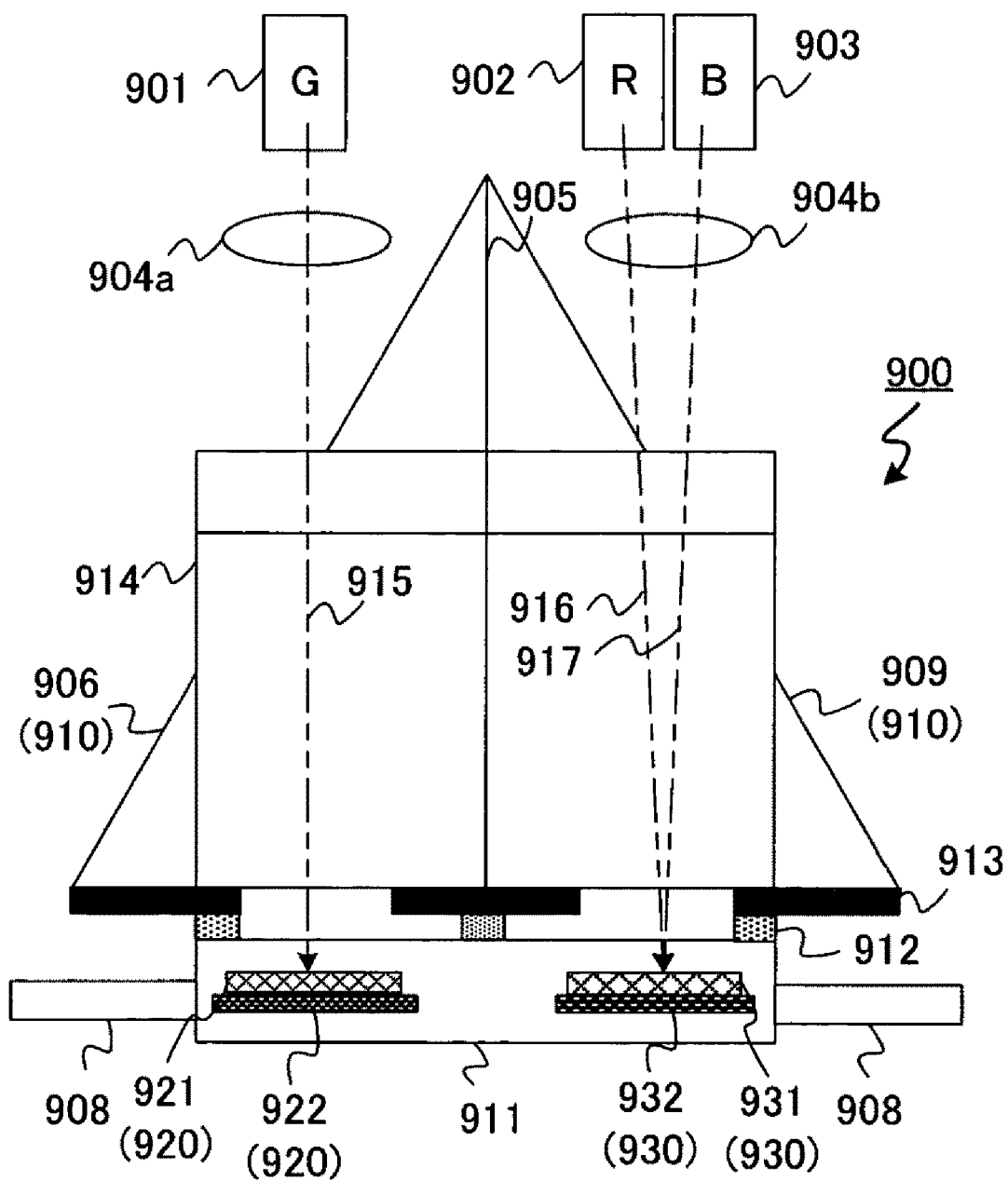
FIG. 9A is a front view diagram showing a two-plate projection apparatus comprising two mirror devices.

The elastic hinge 711 may be formed by using amorphous silicon. The thickness (i.e., the left to right direction of FIG. 9A) of the elastic hinge 711 may preferably be between about 150- and 400 angstroms.

Specifically, a plurality of elastic hinge with a smaller width may be placed for one mirror 718. For example, two elastic hinges with a smaller width than an elastic hinge in the configuration of providing one mirror 718 with one elastic hinge may be formed on both ends of the mirror.

In an exemplary embodiment, the elastic hinge 711 is formed by depositing amorphous silicon, poly-silicon, or single crystal silicon by applying a chemical vapor deposition (CVD) process. It is further preferable to form the elastic hinge 711 with electric conductive material by forming the elastic hinges with a silicon material doped with a group-III atom such as boron, arsenic, and phosphor or with a group-V atom. Furthermore, the conductivity of the hinge may be improved by doping the elastic hinges with two kind of material such as boron and phosphor. The elastic hinge may also be formed by diffusion a metallic silicide such as nickel silicide (NiSi), titanium silicide (TiSi), et cetera. Additionally, if the mirror 718 and electrode 704 are made of aluminum, it is desirable to make the elastic hinge electrically conductive during the production process, which, if conducted at a high temperature, the aluminum material will migrate to the silicon material. In this case, the electrical resistivity of the elastic hinge 711 is reduced to allow a secure connection of the mirror 718 to the ground (GND). A high resistivity increases the time to generate an electric potential between the mirror 718 and the electrode 722a or 722b thus slowing down the response speed of the mirror. Furthermore, if the elastic hinge 711 is made of a semiconductor material, a photoelectric effect is generated by the effect of the irradiated incident light, reducing the electric potential between the mirror 718 and the electrode 722a or 722b with time and making it very difficult to retain the mirror 718 on the electrode (722a or 722b).

Due to the above-described technical concerns, the resistivity of the elastic hinge 711 is should be no higher than 1 giga-ohms. The elastic hinge may have a preferable resistivity not higher than 0.5 giga-ohms, depending on the usage environment. A further reduction of resistivity to 0.2 giga-ohms makes it possible to provide a video image with a high grade of gradation as a result of enabling the mirrors to operate at a high speed. Furthermore, if the elastic hinge 711 is made of silicon and the like, more benefit can be realized because the electrical resistance is reduced with temperature.

Furthermore, if the elastic hinge 711 is made of a silicon material, the mechanical property of the elastic hinge 711 would have insignificant changes with an increase of the environmental temperature to a point where the withstanding temperature of the deflective mirror device is as high as the thermal property of a transistor. Therefore, if the conventional environmental temperature is around 40° C. to 45° C., it can be raised to around 50° C. to 85° C. A display apparatus may be implemented with a brighter illumination without requiring a cooling device and without requiring an apparatus to have greater size due to a heat dissipation requirement. The configuration enables the manufacturer to keep the overall system compact.

If the material of the elastic hinge 711 is amorphous silicon without impurity dopant, the resistance of the elastic hinge is two three orders higher compared with the doped hinges. With such high resistance, the mirror 718 is electrically floating. Therefore, even a high voltage applied to the electrode 116 may not generate different electrical potentials immediately between the mirror and electrode 116. Even though a high voltage continuously applied to the electrodes may generate certain level of potential difference, the operation requires a long period of time. The mirror device thus prevents a high speed modulating operation. Moreover, when the illumination light is irradiated on the elastic hinge 711, the influence of a photoelectric effect causes a current to flow to the mirror 718 by way of the elastic hinge 711. This in turn causes a gradual reduction in the difference in potentials in the state of the mirror 718 being deflected to the direction of either electrode 722 (i.e., 722a or 722b), making it impossible to retain the mirror 718 to either electrode. If the elastic hinge 711 is made of aluminum or a similar material, the electric resistance is very small. There is, however, deterioration due to metallic fatigue, et cetera, making for inferior durability. Therefore, the use of a material that is superior in mechanical strength, such as silicon, with a lower electric resistance, has an advantage as a display device durable in high speed operation for an extended length of time.

Specifically, when the elastic hinge 711 is made of a silicon material with an electric resistance of 2 about giga-ohms, the irradiation with light for an extended length of time gradually decreases the potential between mirrors retained onto the electrode and eventually releases the retention of the mirror to return to a horizontal state. Setting up the quantity of illumination light and the resistance value of the elastic hinge at respective predetermined values makes it possible to set the time period of retaining the mirror using the light. Alternatively, the Coulomb force generated between the mirror and electrode can be reduced with time. This also makes it possible to alleviate the effect of stiction, a phenomenon in which a mirror retained onto an electrode is stuck to the electrode. Furthermore, the desired operation of the mirror can be controlled with the light. Additionally, for the mirror element 700, a second insulation layer (i.e., a protective film) 723 is formed on the surface of the structure part of the substrate 701. Specifically, the second insulation layer 723 and center electrode 704 are connected to a GND potential.

The second insulation layer 723 may preferably be a layer containing silicon (Si), such as silicon carbide (SiC) and amorphous silicon for preventing corrosion caused by hydrogen fluoride (HF). Particularly, when the electrodes 704, 722a, and 722b and surface electrodes 721a and 721b are formed as aluminum electrodes.

Furthermore, the top surface of the elastic hinge 711 may further include a joinder layer. A layer made of the same material to form the elastic hinge may be used as the joinder layer by configuring it to have the same area size and form as the mirror 718. The configuration of the joinder layer may be formed to have the smallest possible area to prevent the mirror 718 from deforming and/or warping due to the difference in linear expansion coefficient between the mirror 718 and the joinder layer.

Furthermore, a joinder layer (i.e., mirror connection part) 716 is formed on the joinder layer of the elastic hinge 711 for providing an electric conduction between the elastic hinge 711 and mirror 718 while eliminating a variation in the height among the individual mirror elements.

The joinder layer 716 may preferably be made of, for example, single crystal silicon (Si), amorphous silicon, or poly-silicon, all of which is applied with an In-Situ doping with boron, arsenic, or phosphorous, or an ion-implanted material or an annealed semiconductor material. Alternatively, the joinder layer 716 may preferably have electrical conductivity by using a diffusing a metallic silicide such as nickel silicide (NiSi) and titanium silicide (TiSi). If the joinder layer 716 is made of silicon (Si), as an element in the IV group among semiconductor materials, an additive may be appropriately selected from among the materials belonging to the III group or V group.

The resistance of the joinder layer 716 may be approximately the same as that of the elastic hinge 711 or mirror 718, and is lower than the resistance of the first and second protective layers 703 and 706.

If the mirror 718 is made of aluminum and if the elastic hinge 711 is formed by using a silicon material, a barrier layer (not shown in a drawing herein) may be deposited on the top and bottom surfaces of the joinder layer 716 to prevent the mirror 718 to contact with the elastic hinge 711. Such a barrier layer may be formed to have two or more layers.

Then, the mirror 718 is formed on the joinder layer 716 of the elastic hinge 711 to complete the manufacturing processes of the mirror element 700.

The mirror 718 may be made of a member possessing a high reflectance of light, e.g., aluminum. Furthermore, the aluminum used may be an alloy containing titanium (Ti) and/or silicon (Si). Meanwhile, the top surface of the mirror 718 may be provided with an aluminum oxide layer.

Additionally, the mirror 718 may preferably be a square or a diamond shape, with each side having a length about 4- to 11 μm. Furthermore, the gap between individual mirrors 718 may preferably be about 0.15- to 0.55 μm. In addition, an opening ratio of an individual mirror element (i.e., the ratio of the area size occupied by the mirror 718 (i.e., a reflection region) to the area size consisting of the mirror 718 may preferably be designed and arranged in an array and the gap between mirrors 718) is no less than 85%, or more preferably, no less than 90%. Even in the case of the elastic hinge 711 that is made of a semiconductor material and having a relatively high resistance value, an influence such as the movement of photoelectrons inside the elastic hinge 711 due to the illumination light can be reduced. Specifically, the reflection region may preferably occupy about 85% of the region in this configuration for placing the mirrors 718, even when a torsion hinge is used.

Figure 7B:
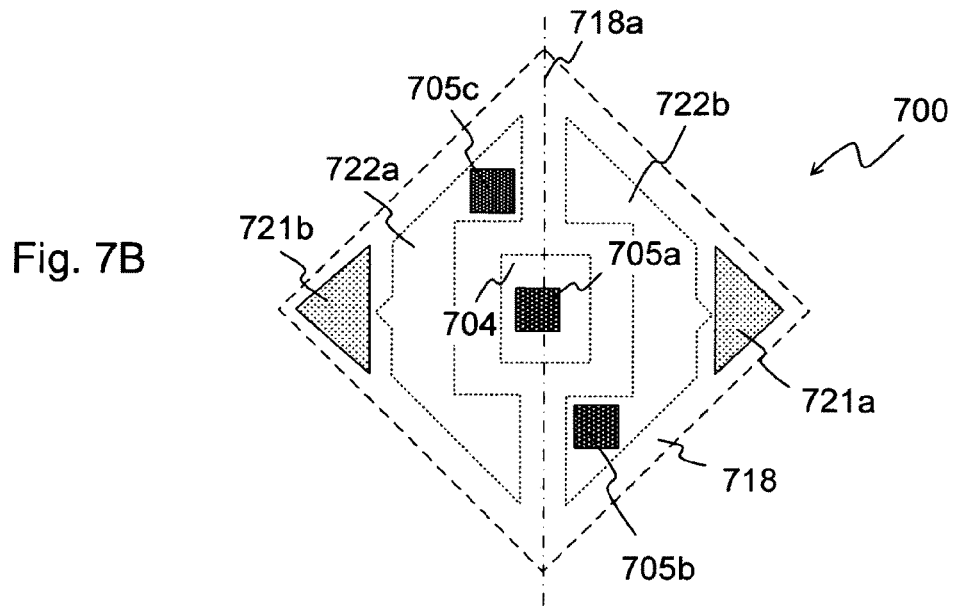
FIG. 7B is a top view diagram showing the surface of the semiconductor wafer substrate of a mirror element.
Figure 7C:
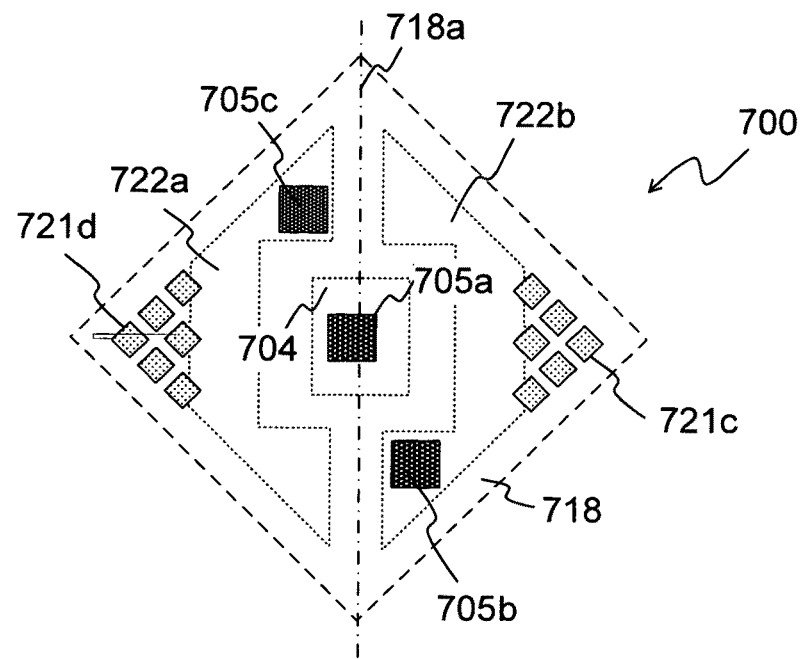
FIG. 7C is a partial plain view diagram showing a modified example in which the surface electrode shown in FIG. 7B is changed to a plurality of surface electrodes.

FIG. 7B shows the surface part of the substrate 701 that includes the mirror 718, the left and right electrodes 722a and 722b, and the center electrode 704 enclosed by the dotted lines. The deflection axis 718a of the mirror 718 is indicated by a single-dot chain line.

As shown in FIG. 7B, the surface electrodes 721a and 721b have the appearance of a rectangle in the plain view, and are placed under the opposite corners of the mirror 718. Furthermore, the surface electrodes 721a and 721b are symmetrically placed about the center of the mirror 718. Specifically, the surface electrode 721 may be provided by arraying a plurality of miniature electrodes as indicated by the component signs 721c and 721d shown in FIG. 7C. The individual miniature electrodes are connected to Vias 705 and maintained at the same potential. The individual miniature electrodes can be simultaneously manufactured by the same production process as that for forming a Via connecting between metallic layers in the semiconductor production process, and thus production is easily carried out.

The electrodes 722a and 722b positioned on the left and right sides of the elastic hinge 711 are placed at positions except for the surface electrodes 721a and 721b, and hinge electrode 704 under the mirror 718. Alternatively, the electrodes 722a and 722b may also be placed by overlapping in entirety, or in part, with the surface electrodes 721d and 721e as delineated in FIG. 7C. If the voltages applied to the surface electrodes 721 and electrodes 722 are applied at the same time or with the same potential, the surface electrodes 721 and electrodes 722 may be electrically conductive to each other. In contrast, if the voltages are applied to the surface electrodes 721 and electrodes 722 in different timings or with different voltages, then different drive circuits may be connected to the respective electrodes 721 and electrodes 722 by forming these electrodes without electric connections.

Then, the electrodes 722a and 722b are also symmetrically placed relative to the center of the mirror 718, likewise the case of the surface electrodes 721a and 721b.

Figure 7D:
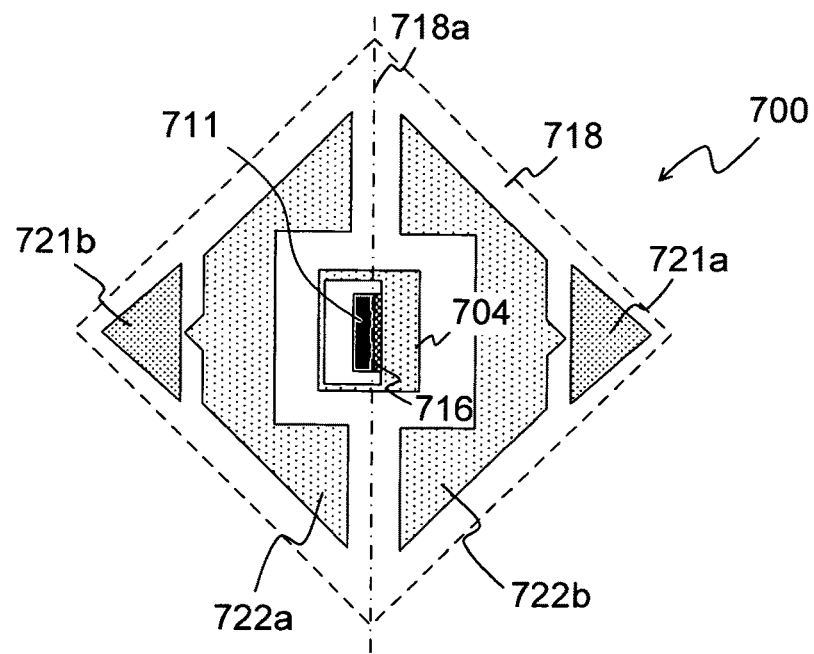
FIG. 7D is a plain view diagram showing a mirror element excluding a mirror.

FIG. 7D is a top view diagram of the mirror element 700 excluding the mirror 718 with the mirror 718 is delineated by a dotted line box.

As shown in FIGS. 7A and 7D, the electrodes 722a and 722b are formed to project from the substrate 701. Then, the electrodes 722a and 722b are formed to contact the mirror 718 when the mirror 718 deflects to a maximum deflection angle.

The electrodes 722a and 722b may be formed to define the deflection angle of the mirror 718 between 12- and 14 degrees. The deflection angle of the mirror 718 may preferably be designed in compliance with the designs of the light source and optical system of a projection apparatus. A preferable design may also include predefined height of the elastic hinge 711 of each mirror element 700 to be no larger than 2 μm and the mirror 718 of each mirror element 700 to be a square with each side being no larger than 10 μm.

Figure 7E:
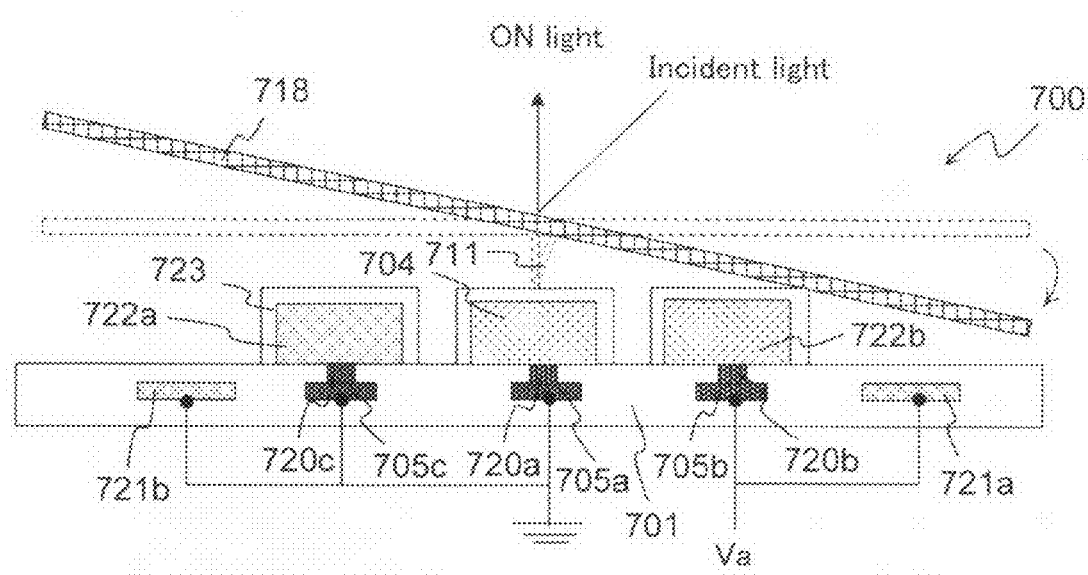
FIG. 7E is a cross-sectional diagram illustrating the ON state of a mirror element.

The ON state of a mirror element 700 is illustrated in FIG. 7E, where the mirror 718 reflects the incident light emitted from a light source along a direction to function as the ON light when the mirror 718 deflects to the right side.

Figure 7F:
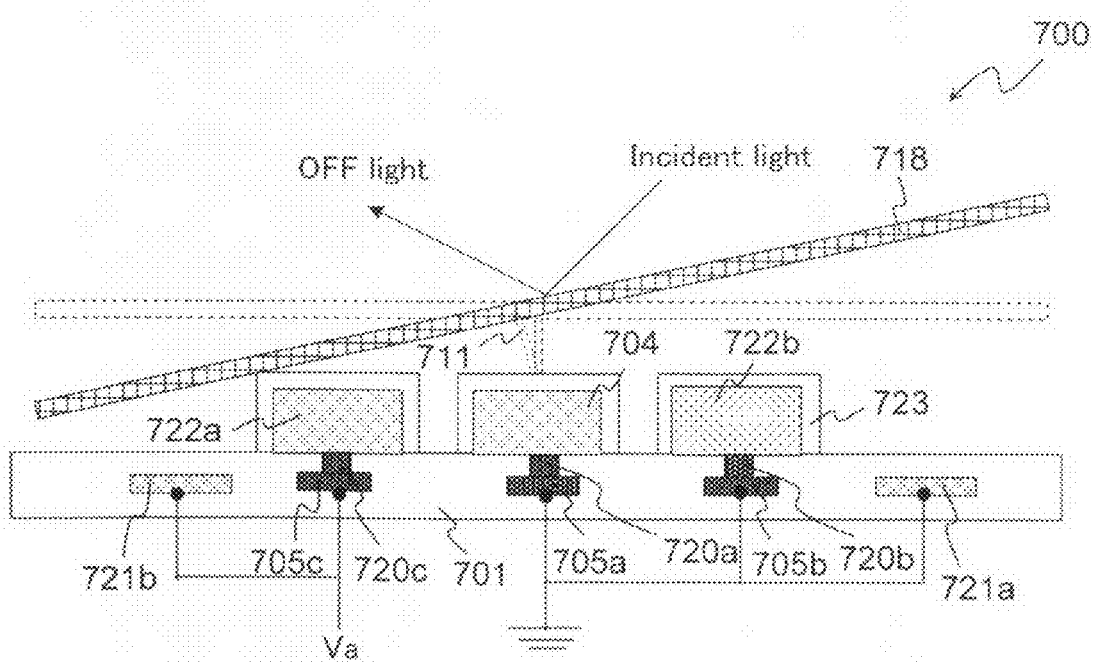
FIG. 7F is a cross-sectional diagram illustrating the OFF state of a mirror element.

In contrast, the OFF state of a mirror element 700 is illustrated in FIG. 7F, where the mirror 718 reflects the incident light emitted from a light source along a direction to function as the OFF light when the mirror 718 deflects to the left side.

When no voltage is applied to surface electrodes 721a and 721b on the left and right sides of the mirror element 700 and electrodes 722a and 722b, the elastic hinge 711 is released to a natural state, and the mirror 718 accordingly is controlled to maintain in a horizontal direction.

Specifically, when a voltage is applied to the electrode 722b and surface electrode 721a, both on the right side, a Coulomb force is generated between the mirror 718 and the electrode 722b on the right side (and the surface electrode 721a on the right side) as that determined by the following expression:

(the upper surface area of an electrode)×(the applied voltage to an electrode)/(the second power of the distance between the electrode and mirror)

Then, the mirror 718 is drawn by the Coulomb forces and deflected to the right side.

Specifically, the distance between the mirror 718 and the right-side surface electrode 721a is larger than the distance between the mirror 718 and the right-side electrode 722b and so is the surface area. Therefore the Coulomb force generated between the mirror 718 and the right-side surface electrode 721a is smaller than that generated between the mirror 718 and the right-side surface electrode 721a.

Furthermore, when the mirror 718 is deflected to approach the right-side surface electrode 721a, the reaction force is now strong due to the restoring force of the elastic hinge 711 as a result of the mirror 718 is deflected to 12- to 14 degrees. The right-side surface electrode 721a placed on the surface of the substrate, however, is capable of drawing the mirror 718 with a smaller Coulomb force by taking advantage of the principle of the lever (i.e., the principle of movements of a rigid body), that is, by directing the Coulomb force to attract the right end part, that is, a long distance from the elastic hinge 711, of the mirror 718. As a result, the right-side surface electrode 721a is capable of retaining the deflection of the mirror 718 in the state in which a low voltage is applied.

When the mirror 718 is deflected to the right side as described above, the reverse-side (i.e., the left side) surface electrode 721a and the left-side electrode 722a are maintained at the same potential and grounded by being connected to the GND.

Specifically, the elastic hinge 711 has the largest elastic stress at the bottom part on the side of the electrode 704 in a deflected state.

When the mirror 718 is deflected to the reverse side as the mirror element 700 is in the OFF light state as shown in FIG. 7F, a voltage is applied to the electrode 722a and surface electrode 721b on the opposite side to change and control the mirror 718 to operate in the ON light state.

Specifically, when the shapes of the mirror 718 and elastic hinge 711 are changed, or when the elastic hinge 711 is made with materials that has a different restoring force, or when the deflection control for the mirror 718 is changed, between the left and right sides of the mirror element 700, a voltage may be applied. Adjustments of mirror control for operating the mirror 718 may be achieved by changing the area size, height and/or placement (i.e., the layout) of the respective surface electrodes 721a and 721b or electrodes, 722a, 722b, and 704 between the right and left sides of the mirror element 700.

Moreover, application of multi-step voltages to the surface electrodes 721a and 721b and respective electrodes 722a and 722b on the right and left sides of the mirror element 700 may also be performed to control the mirror operations.

Furthermore, the circuit configurations and different level of voltages for driving the surface electrode or electrode of either one of the right-side surface electrodes 721a and electrode 722b and the left-side surface electrodes 721b and electrode 722a of the mirror element 700 may be appropriately adjusted.

Furthermore, at least one surface electrode of the right-side surface electrode 721a and left-side surface electrode 721b of the mirror element 700 may be formed with protrusions from the substrate.

Figure 7G:
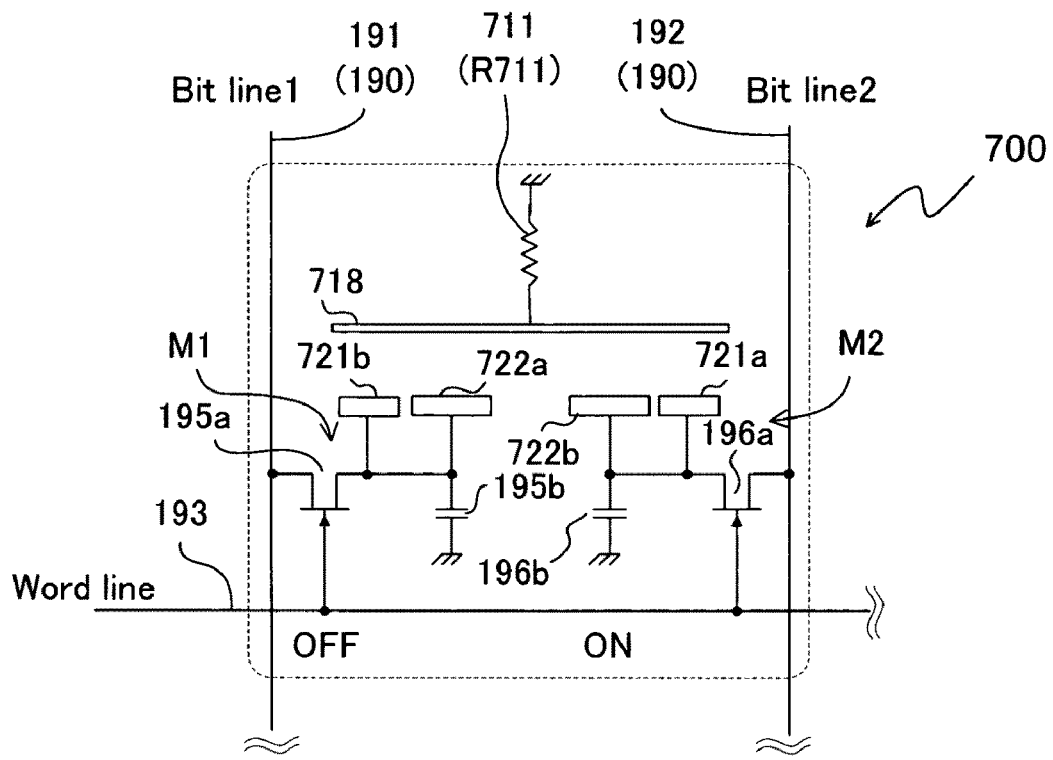
FIG. 7G is a functional diagram showing an exemplary configuration of a circuit for the mirror element shown in FIG. 7A.

Next is a description of the circuit configuration of the mirror element 700 with reference to FIG. 7G.

FIG. 7G is a functional block diagram showing an exemplary configuration of a circuit for the mirror element 700 shown in the above described FIG. 7A. The mirror element array of the mirror device 200 used for the individual embodiment arranges, in grid-like fashion, a plurality of mirror elements 700 at the respective position. The bit lines 190 (i.e., a first bit line 191 and a second bit line 192) vertically extend from a bit line driver (not shown in the drawing) and cross a word line 193 horizontally extend from a word line driver (not shown in the drawing).

An OFF capacitor 195b is connected to the electrodes 722a and 721b on the OFF side, and the OFF capacitor 195b is connected to the first bit line 191 interconnected by a gate transistor 195a that includes a field effect transistor (FET) or similar circuits.

An ON capacitor 196b is connected to the electrodes 722b and 721a on the left side designate as an ON direction, and the ON capacitor 196b is connected to the second bit line 192 by way of a gate transistor 196a that further includes a field effect transistor (FET) or similar circuits.

The OFF capacitor 195b and gate transistor 195a of the electrodes 722a and 721b on the OFF side comprises a memory cell M1 commonly known as the DRAM structure. Likewise, the ON capacitor 196b and gate transistor 196a of the electrodes 722b and 721a on the left side along an ON direction comprises a memory cell M2 in a commonly known DRAM structure.

The elastic hinge 711 supporting the mirror 718 is drawn as a circuit element having a hinge resistance R711. Furthermore, if the floating capacitance of the elastic hinge 711 is large, the circuit may include a capacitor (not shown in a drawing). One end of the elastic hinge 711 is connected to a grounding unit illustrated as a GND electrode.

In this circuit configuration, both the mirror 718 coupled to the electrodes (i.e., the electrodes 722b and 721a) on the ON side, and the mirror 718 coupled to the electrodes (i.e., the electrodes 722a and 721b) constitute as a variable-capacitance capacitor. Therefore, the deflecting operation of the mirror 718 is controlled by the difference in potentials of the variable-capacitance capacitor. The application of a voltage to the electrodes 722a and 721b on the OFF side, and to the electrodes 722b and 721a, are controlled by the existence or absence of data written to the respective memory cells M2 and M1. Furthermore, the operations of charging or discharging a charge to or from the corresponding capacitors control the writing of the data to respective memory cells.

More specifically, a discretionary word line 193 is selected by a word line driver, and the switching ON/OFF of the gate transistors 195a and 196a of the mirror elements 700 on the horizontal one row lining up on the selected word line 193 is controlled. In association with this operation, the bit line driver controls charging and discharging to and from the OFF capacitor 195b and ON capacitor 196b by way of the first and second bit lines 191 and 192.

Accordingly, a voltage is then applied to the electrodes 722a and 721b on the OFF side and to the electrodes 722b and 721a on the ON side, and thereby controlling the deflecting operation of the mirror 718.

Specifically, when a voltage is applied to the electrodes (i.e., the electrodes 721b and 722a, or the electrodes 721a and 722b), the charge of the opposite mirror 718 instantly flows to the ground (GND) if the resistance of the elastic hinge 711 (i.e., the hinge resistance 711R) is small. If the resistance of the elastic hinge 711 is large, the change generated in the opposite mirror 718 takes time to flow to the ground (GND). This causes the mirror 718 to tilt and generate a transient property, thus generating a delay in the deflecting control of the mirror 718.

Furthermore, if the resistance of the elastic hinge 711 is high, and if there is an influence of a photoelectric effect due to the illumination light by mirror 718 being retained onto the electrodes 722a and 721b on the OFF side or onto the electrodes 722b and 721a on the ON side, the potential of the mirror 718 is not retained at a constant. Instead, the potential is decreased with the passage of a certain period of time. Therefore, the mirror 718 can no longer be retained by the electrode to maintain on the OFF side or ON side, as described above.

Furthermore, if the resistance of the elastic hinge 711 is high and if the voltage applied to the electrode on the OFF side or ON side is steep, the alternate current (AC) component is actually applied to the mirror 718 through the variable-capacity capacitor interconnected between the mirror 718 and each respective electrode (either on the OFF side or ON side). If the potential of the electrode is turned from 5 to 0 volts when the mirror 718 is in contact with the electrode on the OFF or ON side, a voltage anywhere between −4 volts and -5 volts is applied to the mirror 718. Under such circumstance, the mirror 718 remains at a position retained onto the electrode for a while because of the voltage applied to the mirror 718, even if the mirror 718 is resists retention on the electrode. In order to prevent such a condition from occurring, a stopper specifically for defining a maximum deflection angle of the mirror 718 is connected to the ground (GND). Therefore, the mirror element 700 can be controlled to operate at a high speeds with high reliability.

FIG. 7H is a circuit diagram showing an exemplary modification of the above described FIG. 7G. FIG. 7H illustrates the elastic hinge 711 connected to a hinge line 181 in instead of the fixed potential (GND).

FIG. 7I is a circuit diagram showing the equivalent circuit of the configuration of the mirror element 700 as that illustrated in the above-described FIG. 7G.

In the configuration of FIG. 7I, the hinge potential V711 of the hinge line 181 is applied to the ground side disposed on the other side of a hinge resistance R711, e.g., a resistance of approximately 1 giga-ohm, which is equivalent to the resistance of the hinge from the mirror 718.

Furthermore, the electrode 721b and mirror 718 form a parasitic capacitor Q721b, e.g., a capacitor having a capacitance of 1.5 femto farads (fF), while the electrode 722a and mirror 718 form a parasitic capacitor Q722a, e.g., a capacitor having a capacitance of about 3 fF), with an OFF-side electrode potential VM1 applied to these capacitors.

Likewise, the electrode 722b and mirror 718 form a parasitic capacitor Q722b, e.g., a capacitor with a capacitance of about 0.15 fF, while the surface electrode 721a and mirror 718 form a parasitic capacitor Q721a, e.g., a capacitor having a capacitance of about 0.075 fF, with an ON-side electrode potential VM2 applied to these capacitors.

Specifically, the capacitance of each capacitor illustrated in FIG. 7I indicates the capacitance when the mirror 718 is deflected to the OFF side and, therefore, the capacitance is symmetrically changed over between the ON and OFF states when the mirror 718 is deflected to the ON side.

When the pixels of a high definition image (e.g., a full high definition (full-HD)) are expressed in 10 bits, the time constant of an RC circuit is functionally related to the hinge resistance R (i.e., the hinge resistance R711), mirror 718, and capacitor C (i.e., parasitic capacitors Q721b, Q722a, Q722b and Q721a). The electrodes may be applied with voltages to modulate with a period equal to or smaller than 40 microseconds (μsec) for driving all the ROW lines. Since the capacitance of the capacitor is inherently determined by the size of a pixel and the size of the electrode driving the pixel, the hinge resistance R711 of the elastic hinge 711 is basically limited to a range of about one giga ohms or lower when the elastic hinge 711 is made of poly-silicon.

An elastic hinge 711, e.g., a hinge that is 0.6 μm long, 1.2 μm wide and 250 angstroms thick, manufactured by using amorphous silicon (Si) with an n-type or p-type atomic doping may have a resistance approximately 0.1 giga-ohms or higher.

The mirror 718 is in contact with the electrode (i.e., the electrode 722b or 722a) through the insulation film. Depending on the kind of insulation film, the resistance of the electric path through the mirror 718 and electrode with the insulation film intervening in between, may have a resistance having a range less than 1 giga-ohms.

Figure 7:
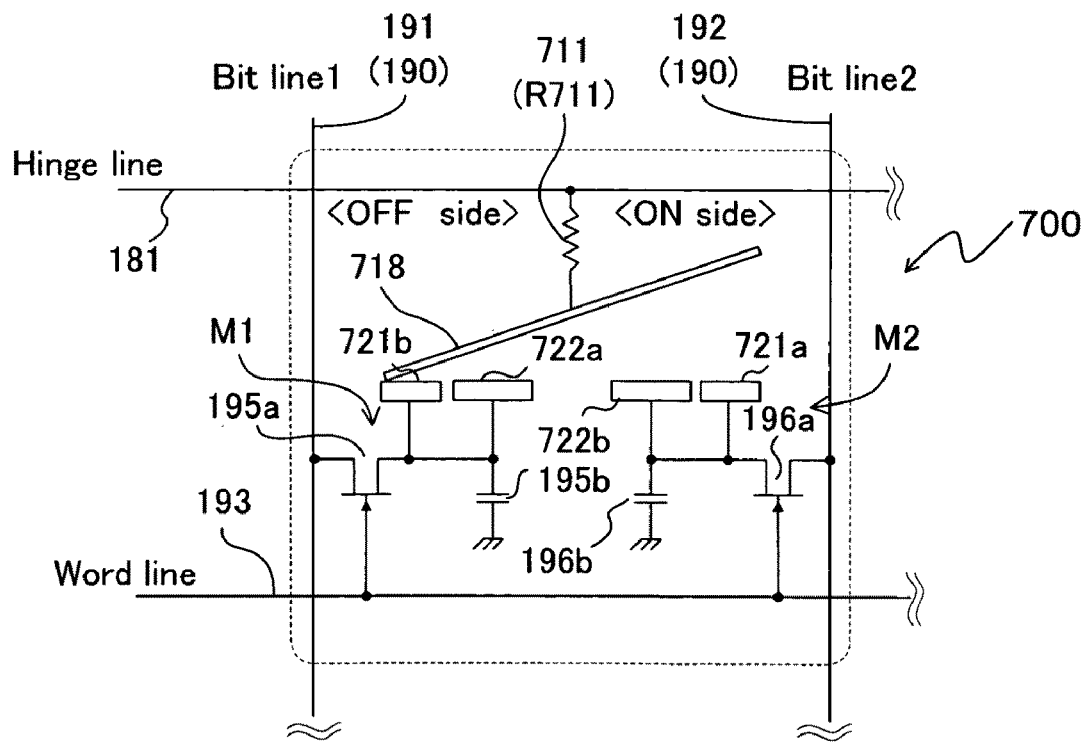
FIG. 7H is a circuit diagram showing an example of a modification of FIG. 7G.
FIG. 7I is a circuit diagram showing the equivalent circuit of the configuration of the mirror element illustrated in FIG. 7G.
FIG. 7J is a timing diagram illustrating a relationship between the application timing of a hinge potential from a hinge line and the deflecting operation of a mirror according to a preferred embodiment of the present invention.
FIG. 7K is a timing diagram showing a case in which the polarity of the drive voltage for a mirror is reverse to that of FIG. 7J.
FIG. 7L is a timing diagram showing an example of a modification of the deflection control for the mirror illustrated in FIG. 7J.
FIG. 7M is a circuit diagram showing an example of a modification of the circuit configuration illustrated in FIG. 7G
FIG. 7N is a circuit diagram showing an equivalent circuit in a case in which a mirror is on an OFF side in the circuit configuration illustrated in FIG. 7M.
FIG. 7O is a timing diagram showing an example of a function of the circuit configuration illustrated in FIGS. 7M and 7N.
FIG. 7P is a diagram showing the temperature characteristic of the electrical resistance of a material constituting an elastic hinge according to a preferred embodiment of the present invention.
FIG. 7Q is a diagram showing an example of a method for expressing gray scales utilizing a horizontal stationary state of a mirror in addition to an operation for deflecting it to ON/OFF states.
FIG. 7R is a perspective diagram showing the relationship between incident light/reflection and aperture stop when a mirror is shifted between the ON, intermediate, and OFF states.
FIG. 7S is a timing diagram showing a mirror displacement profile in the case of applying, to a color display, a gray scale control by means of a deflection control, including the horizontal stationary state of a mirror illustrating in FIG. 7Q.
Figure 7:
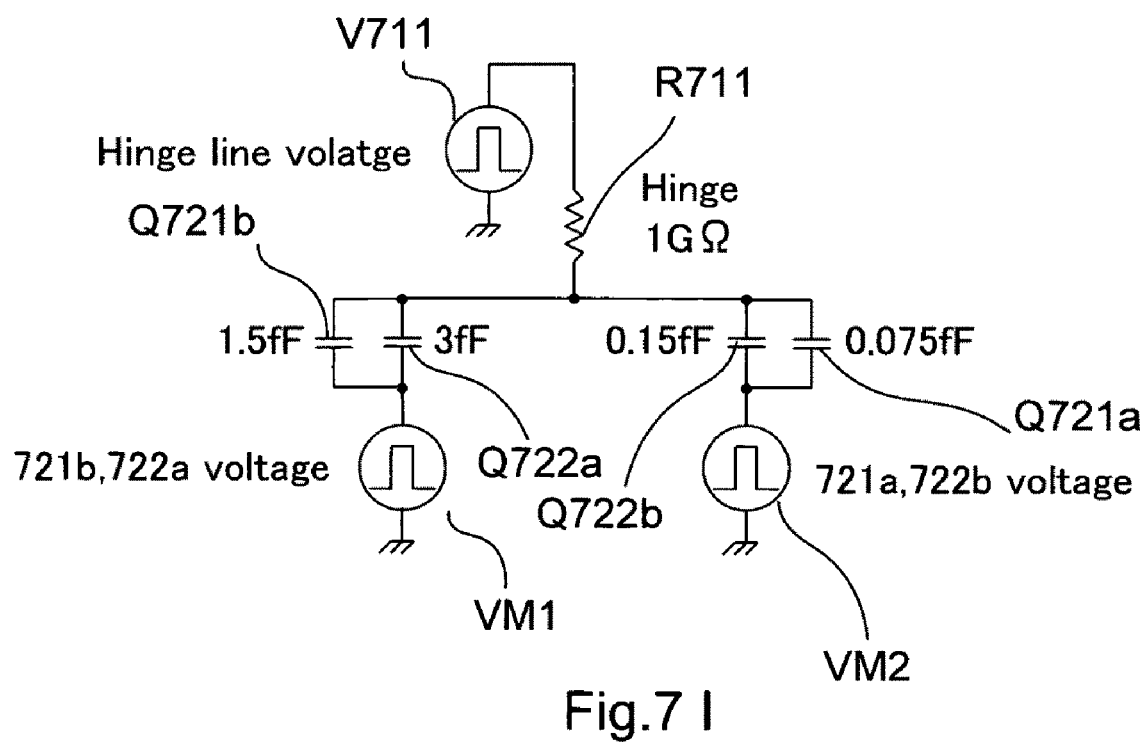
Figure 7J:
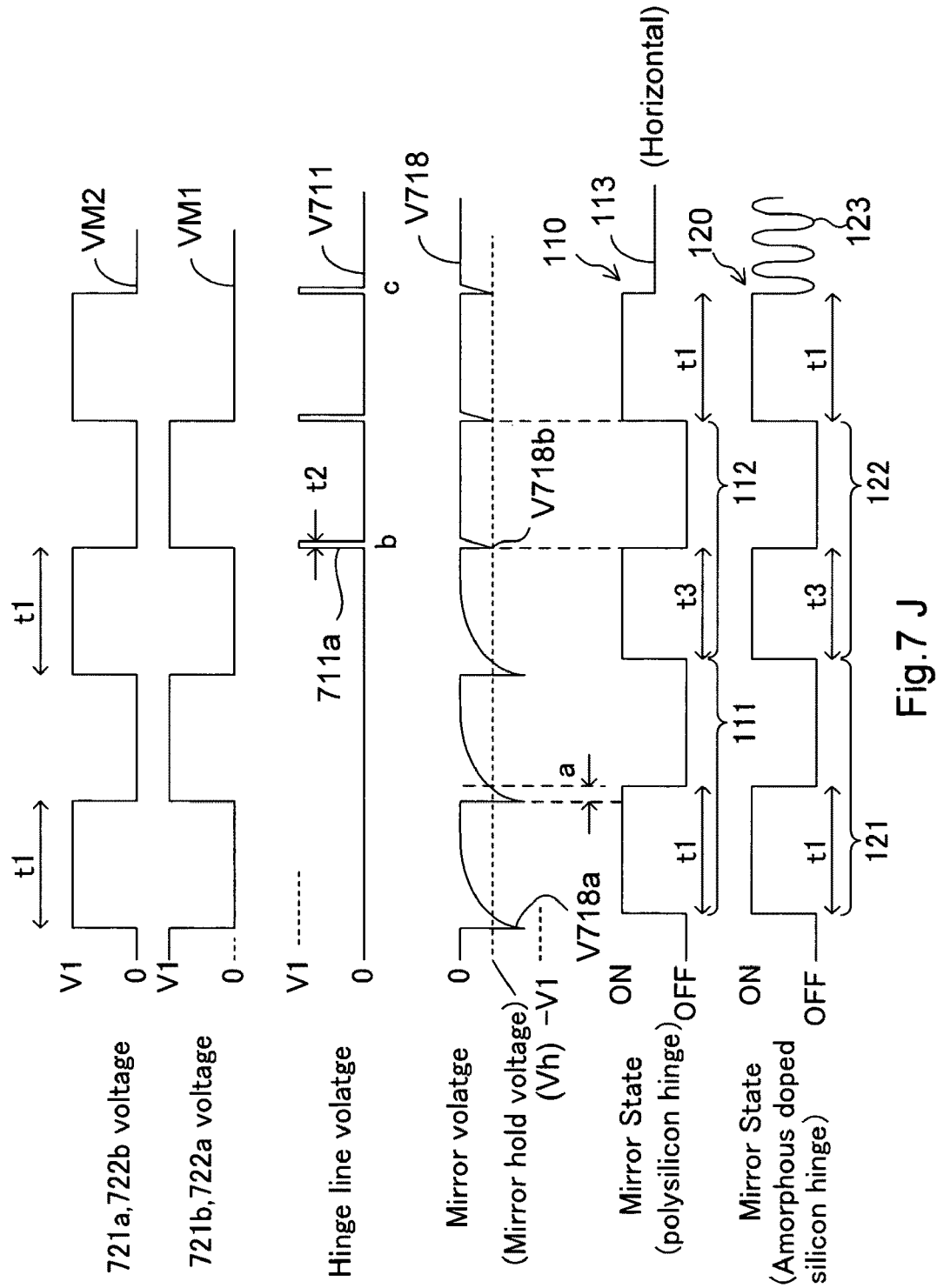
Figure 7:
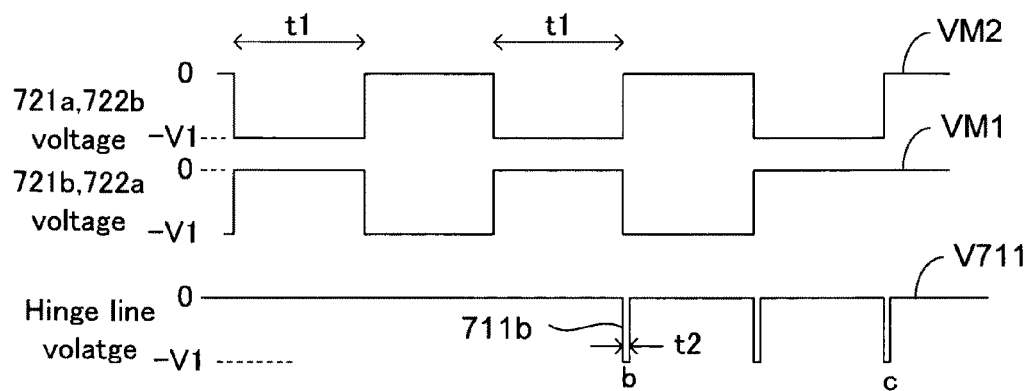
Figure 7:
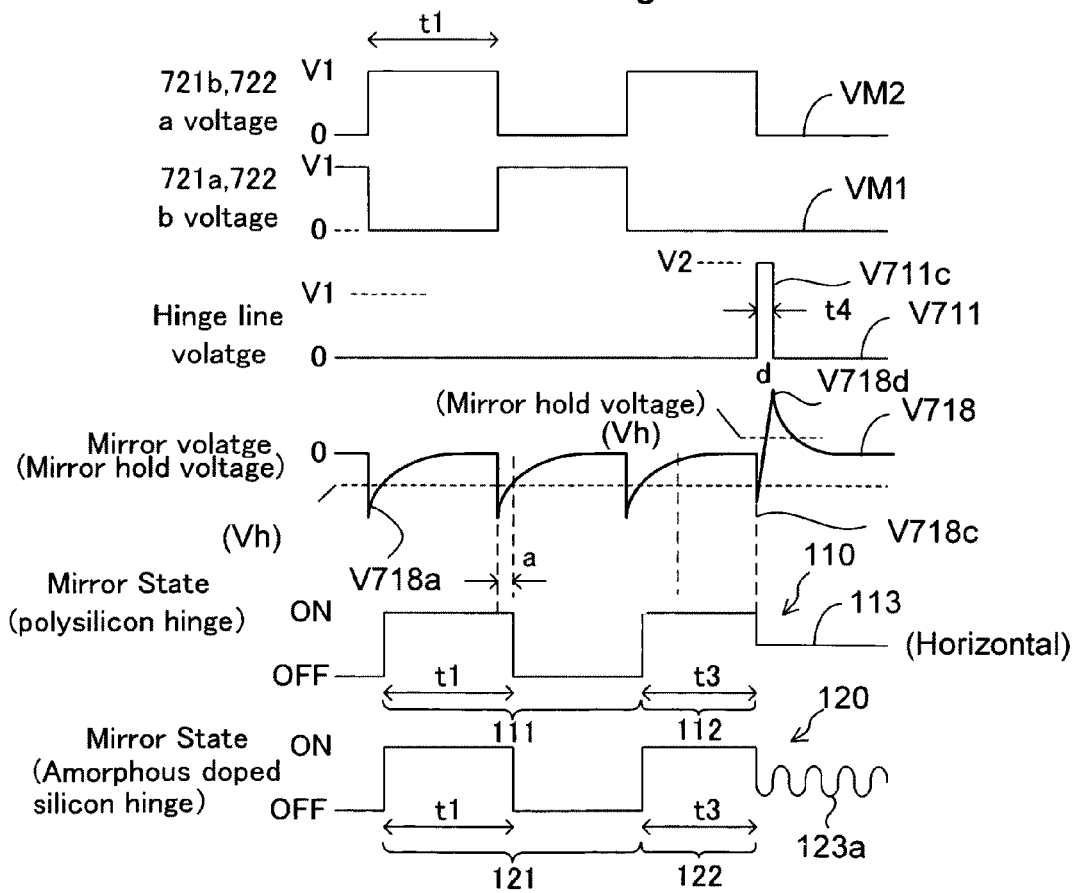

FIG. 7J is a timing diagram illustrating the relationship between the timing of applying a hinge potential from a hinge line and the deflecting operation of a mirror according to the preferred embodiment.

Specifically the mirror displacement profile 110 indicates the deflection state of the mirror 718 if elastic hinge 711 consists of poly-silicon, while the mirror displacement profile 120 indicates the deflection state of the mirror 718 if elastic hinge 711 is formed by using of amorphous silicon (Si) doped with an n-type or p-type dopant ions.

When the ON-side electrode potential VM2 applied to the electrodes (i.e., 721a and 722b) on the ON side when the mirror 718 is tilted to the ON side and changed from V1 (e.g., 10 volts) to 0 volts, the potential of the mirror 718 (i.e., a mirror potential V718) first increases to a potential close to a −V1 (i.e., a peak potential V718a), followed by gradually decreasing to 0 volts, because the hinge resistance R711 of the elastic hinge 711 is high.

More specifically, as illustrated in the mirror displacement profile 111 on the left side of the mirror displacement profile 110, even when the ON-side electrode potential VM2 of the electrodes (i.e., 721a and 722b) on the ON side are decreased to L (i.e., 0 volts), a large Coulomb force is generated between the mirror 718 and electrode on the ON side. The mirror 718 continues to stay at the ON side (for a period a) even if the OFF-side electrode potential VM1 is turned to V1 (volts). This is similar to the case of mirror displacement profile 120.

Thereafter, when the potential of the mirror 718 decreases, it is deflected to deflect to the OFF side.

Then, when the electrodes (i.e., 721a and 722b) on the ON side are decreased from V1 to 0 volts, and also the electrodes (i.e., 721b and 722a) of the OFF side are increased from 0 volts to V1, the mirror 718 tilts to the ON side. The hinge potential V711 of the hinge line 181 connected to the elastic hinge 711 is set at V1, i.e., the hinge potential pulse V711a, for a pulse width t2, e.g., 1 μsec which is the timing b shown in FIG. 7J. The voltage then decreases from the peak potential V718b in the mirror 718, causing the mirror 718 to shift immediately (i.e., without a delay of the period a) toward the electrodes on the OFF side as indicated by the mirror displacement profile 112.

With this operation, the time period for the mirror is controlled to stationary stay at the ON side is reduced to a mirror ON period t3 (e.g., 35 μsec) that is shorter than the mirror ON period t1 (e.g., 40 μsec) on the ON-side electrode.

As described above, the controlling of the hinge potential V711 applied to the elastic hinge 711 from the hinge line 181 can speed up the operation of the mirror element 700 by controlling the hinge potential V711 at a discretionary timing, thereby attaining a high level of gradation.

With the configuration and control process, the hinge potential pulse V711a of the hinge potential V711 may be controlled to have a stepwise waveform or ramp waveform instead of the pulse waveform shown in FIG. 7J.

The following is a description of different mirror behavior depending on the material of the elastic hinge 711, in the present embodiment. The hinge potential pulse V711a is turned to H (high) at the timing c applied to the hinge line 181. The hinge line 181 is connected to the elastic hinge 711. Then, the ON-side electrode potential VM2 of the electrodes 721a and 722b on the ON side is turned from V1 to zero volts when the mirror 718 is deflected to the ON side. Meanwhile, the OFF-side electrode potential VM1 of the electrodes 721b and 722a on the OFF side is maintained at 0 volts.

With elastic hinge 711 made of poly-silicon, the mirror 718 shifts to and stays at the horizontal position without oscillating, as indicated by the mirror displacement profile 113.

In contrast, with the elastic hinge 711 is made of amorphous silicon with an n-type or p-type or p- and n-type impurity dopant ions, the mirror 718 oscillates between the ON and OFF positions as indicated by the mirror displacement profile 123 of the mirror displacement profile 120.

Specifically the mirror displacement profiles 121 and 122 of the mirror displacement profile 120 are similar to the mirror displacement profiles 111 and 112 of the mirror displacement profile 110.

FIG. 7K is a timing diagram showing the polarity of the drive voltage for a mirror that is reverse from that shown in FIG. 7J.

Specifically, if the change in potentials of the electrode close to the mirror 718 is positive, as shown in the above described FIG. 7J, the change in potentials of the hinge potential V711 applied to the elastic hinge 711 from the hinge line 181 is also positive. If the change in potentials of the electrode close to the mirror 718 is negative, a change in potentials (i.e., the hinge potential pulse V711b) of the hinge potential V711 is applied to the elastic hinge 711. The deflection of the mirror 718 is controlled to operate as that shown in FIG. 7K.

When the pixels of the full HD are displayed in 10 bits, it is necessary to drive all ROM lines within 40 μsec, and perform the respective transitions in a sufficiently short amount of time (i.e., within 10 μsec) between the above described stationary states in the ON, horizontal, and OFF states.

FIG. 7L is a timing diagram for showing an exemplary modification of the deflection control for the mirror illustrated in the above described FIG. 7J.

Specifically FIG. 7L illustrates a voltage as a hinge potential pulse V711c applied to the hinge line 181 is increased to V2 (e.g., 15 volts) and pulse width t4 (e.g., 3 μsec), which are V1 (e.g., 10 volts) and pulse width t2 (e.g., 1 μsec) in the configuration of the above described FIG. 7J.

FIG. 7L shows the control process with the potential of the mirror 718 fluctuates between both positive and negative. Specifically, if a hinge potential pulse V711c, with a relatively large V2, is adjusted to the hinge potential V711, the mirror 718 comes apart from the electrode when the peak potential 718c of the mirror 718 is lower than the mirror holding voltage Vh for retaining the mirror 718 that is close to timing d of the hinge potential pulse V711c. Then a "brake" is applied to the oscillation of the mirror 718 when a peak potential V718d exceeds the mirror hold potential Vh once again on the opposite side.

Under this circumstance, if the elastic hinge 711 is made of relatively low resistance doped silicon and the peak potential V718a of the mirror 718 is relatively low, the mirror 718 performs an intermediate oscillation, as indicated by the mirror displacement profile 123a, at a smaller rather than a full amplitude oscillation in accordance with the mirror displacement profile 123 (refer to FIG. 7J).

In contrast, if the elastic hinge 711 is made of relatively high resistance silicon without doping and the peak potential V718a of the mirror 718 is relatively high, the mirror 718 becomes stationary in the horizontal state as indicated by the mirror displacement profile 113.

Figure 7M:
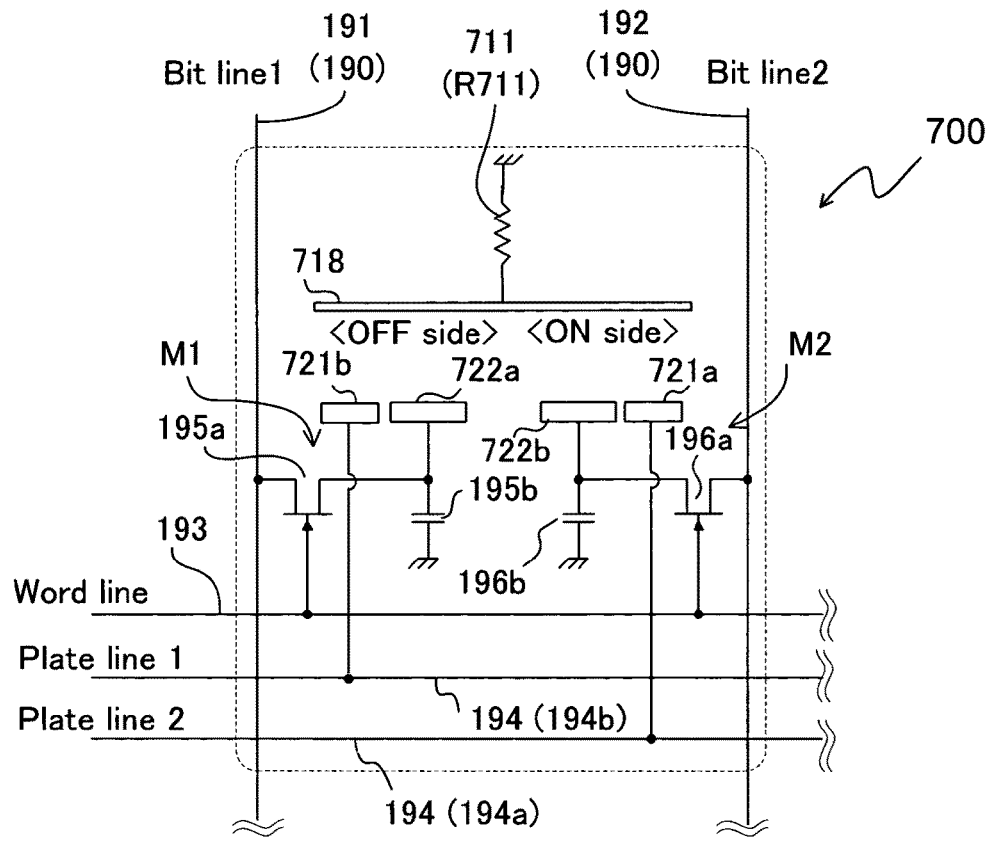
Figure 7:
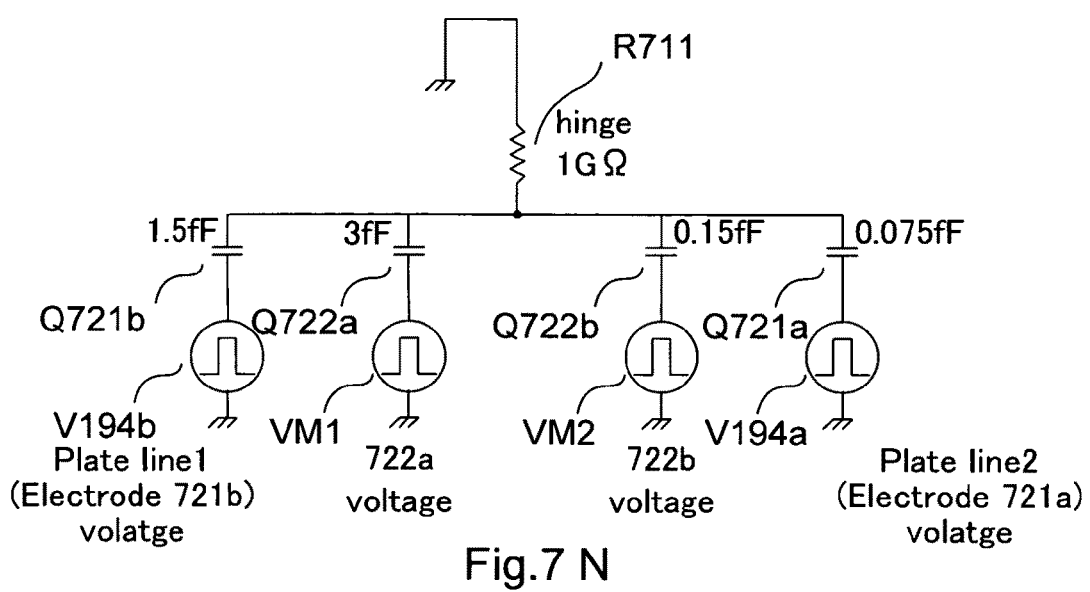
Figure 7:
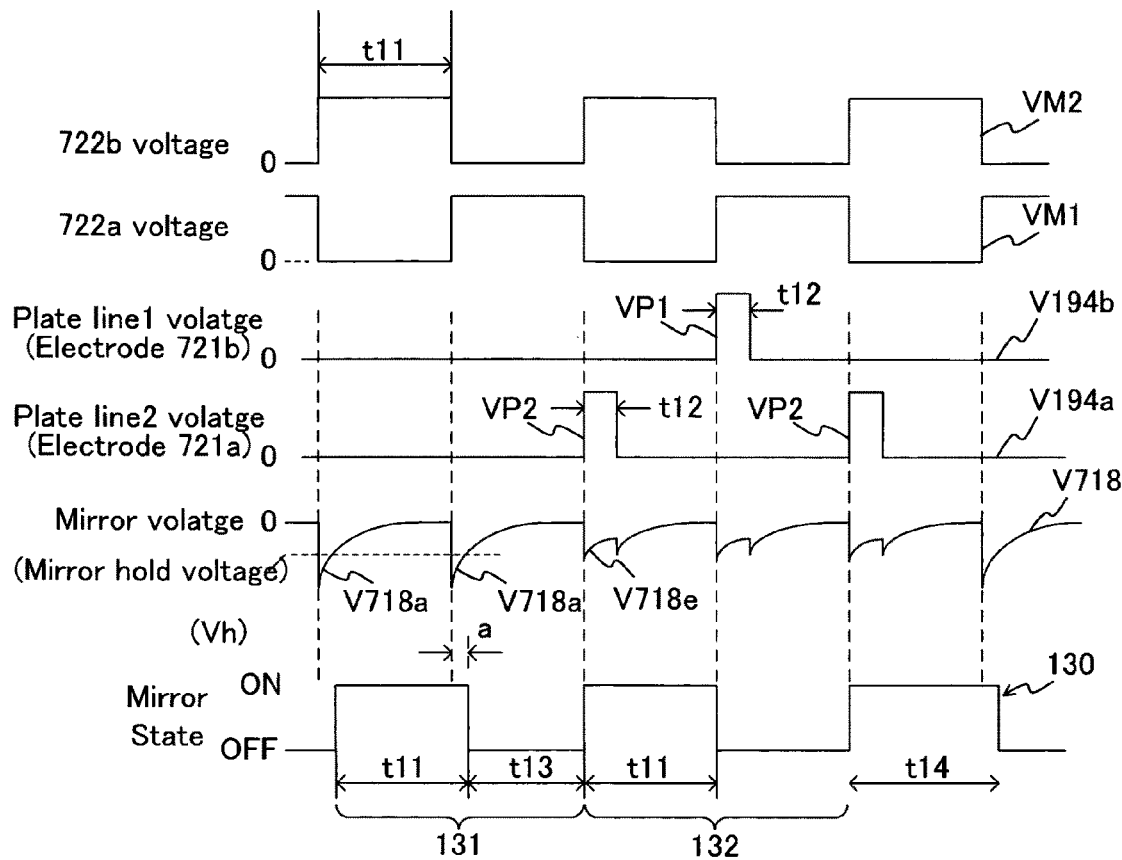
Figure 7:
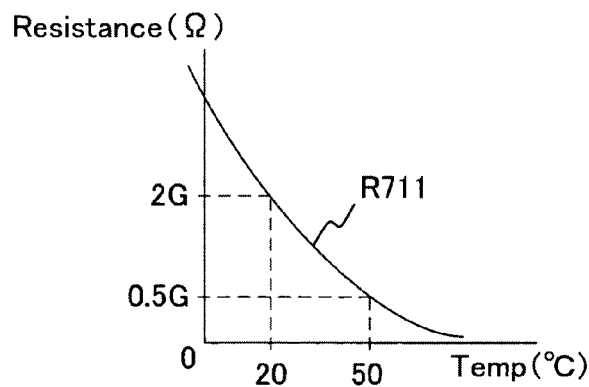
Figure 7:
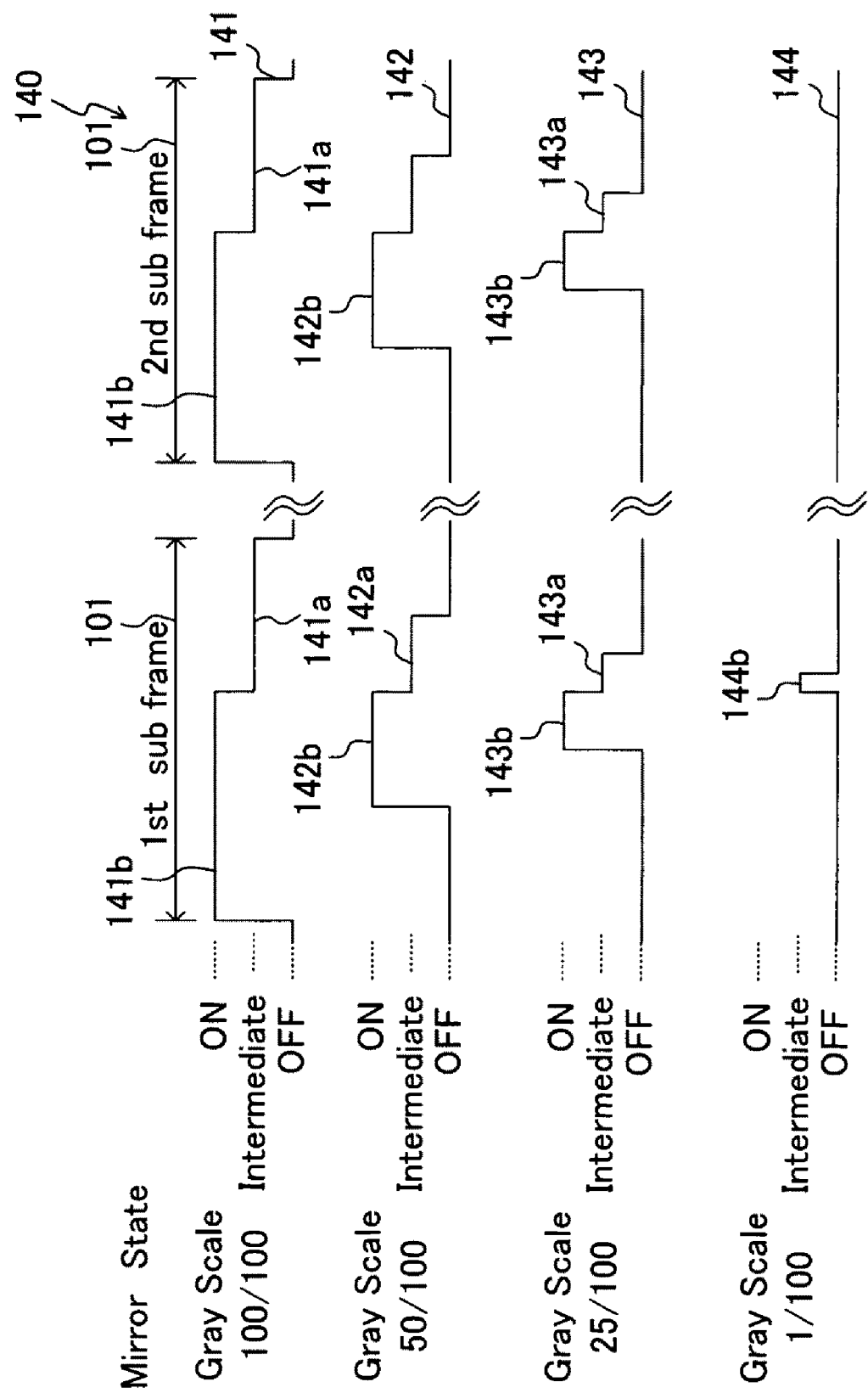
Figure 7:
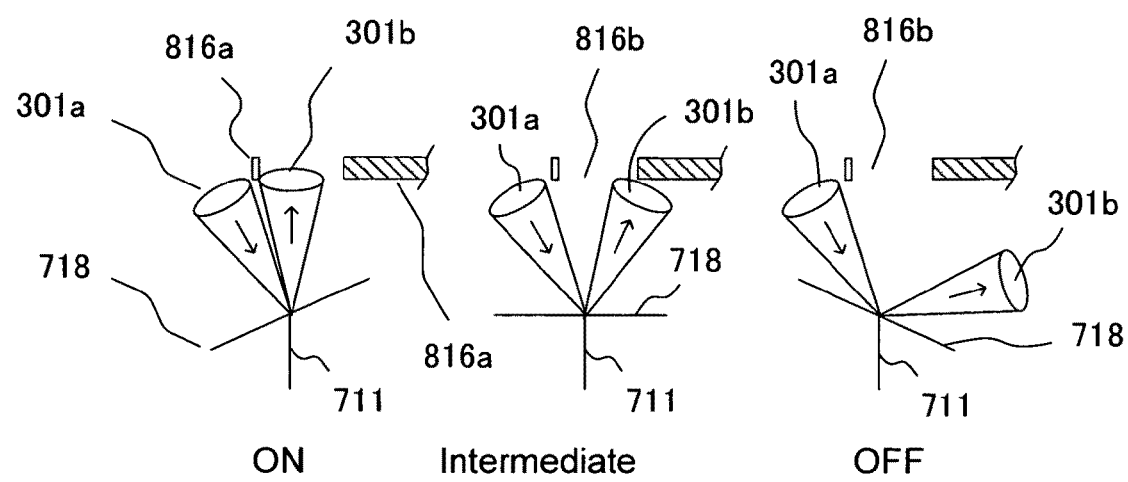
Figure 7:
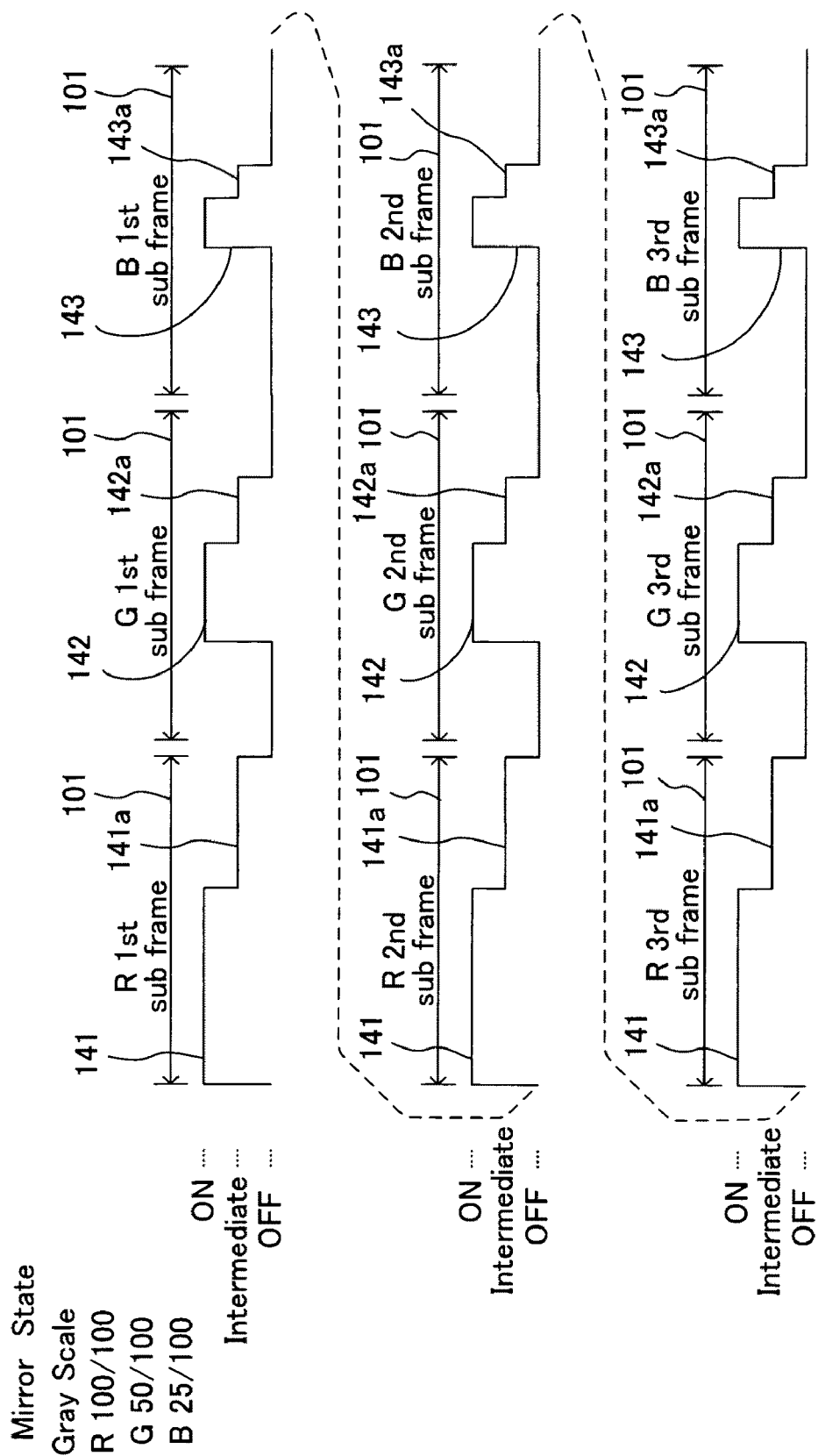

FIG. 7M is a circuit diagram showing an exemplary modification of the circuit configuration as that illustrated in FIG. 7G FIG. 7M shows a circuit comprises a plurality of first plate lines 194b and second plate lines 194a. Specifically, the electrodes 721a and 721b are separated from the memory cells M2 and M1, respectively, and the memory cells M2 and M1 are independently connected to the plurality of first and second plate lines 194b and 194a. The circuit configuration is different from the above described FIG. 7G.

FIG. 7N is a circuit diagram showing an equivalent circuit with a mirror controlled to operate in an OFF side with the circuit configuration illustrated in FIG. 7M.

FIG. 7N illustrates a circuit with the hinge resistance R711 (e.g., 1 giga-ohms) grounded, and the parasitic capacitor Q721b (e.g., 1.5 fF), parasitic capacitor Q722a (e.g., 3 fF), parasitic capacitor Q722b (e.g., 0.15 fF), and parasitic capacitor Q721a (e.g., 0.075 fF) driven by the first plate line potential V194b, OFF-side electrode potential VM1, ON-side electrode potential VM2, and second plate line potential V194a, respectively.

FIG. 7O is a timing diagram for showing an exemplary functional control process with the circuit configuration illustrated in FIGS. 7M and 7N.

Specifically, FIG. 7O shows the control processes of the mirror 718 when a first plate line potential V194b and second plate line potential V194a are controlled to operate with pluralities of the first plate lines 194b and of the second plate lines 194a, respectively.

In a state in which no voltages are applied to the first plate line 194b and second plate line 194a, the peak potential V718a of the mirror potential V718 induced in the mirror 718 by the electrode 722a (or 722b) gradually decreases from the state of exceeding the mirror hold potential Vh. Therefore, a delay is generated in the transition from the ON state to OFF state by a time period a (e.g., 5 μsec) as indicated by the mirror displacement profile 131 of the mirror displacement profile 130. Consequently, a mirror ON period t11 (e.g., 40 μsec) shifts backwards. Because of this, a mirror OFF period t13 (e.g., 35 μsec) between an ON state and the next ON state becomes shorter than the mirror ON period t11.

In contrast, by applying a pulse potential VP1 and a pulse potential VP2 to the first plate line 194b (i.e., the electrode 721b) and second plate line 194a (i.e., the electrode 721a) with a pulse width t12 (e.g., 10 μsec) at the time starting the transition between the ON state and OFF state of the mirror 718, causes the peak potential V718e of the mirror potential V718 is lower than the mirror hold potential Vh. As a result, the deflecting operation of the mirror 718 can be controlled to respond to the change of the ON-side electrode potentials VM2 and OFF-side electrode potentials VM1 without delay as indicated by the mirror displacement profile 132. The width of the ON period is the same as the mirror ON period t11 by synchronizing with the change of potentials of the electrode 722a Meanwhile, if a pulse potential VP2 is applied only to the second plate line 194a at the time of changing from the OFF state to ON state, the mirror is controlled to operate according a waveform (i.e., the mirror ON period t14 (e.g., 45 μsec)) with the ON period widened by the period "a", as indicated by the mirror displacement profile 131.

As described above, the mirror 718 responds quickly to the change in voltage of the address electrode (i.e., the electrode 722a or 722b) by applying the first plate line potential V194b and second plate line potential V194a to the electrode 721b and electrode 721a. Furthermore, the ON periods of the mirror 718 may be changed by generating a voltage only on one side of the first plate line 194b and second plate line 194a.

Specifically, in the exemplary modification shown in FIG. 7M, change the ON/OFF operations of the mirror 718 may be achieved by controlling of the potentials of the first plate line 194b and second plate line 194a, thereby attaining a higher level of gradation for image display.

As described above, if the electric resistance of the elastic hinge 711 (i.e., the hinge resistance R711) is high, and if a steep potential is applied to an electrode on the OFF side or ON side (i.e., an OFF-side electrode potential VM1 or ON-side electrode potential VM2), an AC component is actually applied to the mirror 718 through a variable capacitance capacitor (i.e., the parasitic capacitors Q721b, Q722a, Q722b and Q721a) between the mirror 718 and individual electrodes.

In order to prevent such a situation from occurring, a voltage is applied to the first plate line 194b and second plate line 194a in a direction to cancel the difference in potentials between the mirror 718 and electrode as illustrated in FIG. 7O. The mirror 718 can therefore be controlled to operate at a high speed or at a discretionary timing. A high level of gradation may be attained by applying such a control process to a single-side electrode. Such a voltage applied in a direction of the cancellation may use a pulse waveform, a stepwise waveform, or a ramp waveform.

FIG. 7P is a diagram for showing the temperature characteristic of the electrical resistance of a material constituting an elastic hinge according to the present embodiment.

Specifically, FIG. 7P shows that the elastic hinge 711 according to the present embodiment has a negative resistance-temperature characteristic. The resistance (i.e., a hinge resistance R711) decreases with an increase of the temperature of the elastic hinge 711.

In an exemplary embodiment according to FIG. 7P, the hinge may have a resistance of 2 giga-ohms at the ambient temperature (20° C.), whereas it is reduced to 0.5 giga-ohms at 50° C., which is the operating temperature of the mirror element 700.

With such hinge, the hinge resistance R711 of the elastic hinge 711 has a negative temperature characteristic shortens the time (i.e., the period a) for the peak potential 718c of the mirror potential V718 of the mirror 718 that is supported by the elastic hinge 711 decreasing to the mirror hold potential Vh or lower, thereby making it possible to improve the responsiveness (i.e., the follow-up capability) to the deflecting operation of the mirror 718 against the ON-side electrode potential VM2 and OFF-side electrode potential VM1.

FIG. 7Q is a diagram for showing an exemplary method for displaying an image with gray scales utilizing a horizontal stationary state of a mirror in addition to an operation for deflecting it to ON/OFF states.

FIG. 7Q illustrates a mirror displacement profile 141, a mirror displacement profile 142, a mirror displacement profile 143, and a mirror displacement profile 144, as mirror displacement profile 140.

The mirror displacement profile 141 is an example of attaining a 100/100 gray scale, i.e., a gray scale with 100% of the maximum brightness, by including a horizontal stationary period 141a in a latter part of the ON deflection period 141b.

The mirror displacement profile 142 is an example of attaining a 50/100 gray scale, i.e., a gray scale with 50% of the maximum brightness, by including a horizontal stationary period 142a in a latter part of the ON deflection period 142b.

The mirror displacement profile 143 is an example of attaining a 25/100 gray scale, i.e., a gray scale with 25% of the maximum brightness, by including a horizontal stationary period 143a in a latter part of the ON deflection period 143b.

The mirror displacement profile 144 is an example in which no ON period exists in the periods of individual sub-frames 101 and a 1/100 gray scale, i.e., a gray scale with 1% of the maximum brightness, is attained by including a horizontal stationary period 144a only in the initial sub-frame 101.

Gradation is changed by changing the length for ON and intermediate periods of the mirror 718, as indicated by the above described mirror displacement profile 140. Specifically, the OFF, ON, intermediate, and OFF states of the mirror 718 are repeated in the aforementioned order in the example of FIG. 7Q. The minimum gray scale change is controlled by changing the length of the horizontal stationary period 144a of the mirror displacement profile 144.

According to such control process, various gray scales can be achieved by combining the above described mirror displacement profiles 141 through 144.

Specifically the horizontal stationary periods 141a, 142a, 143a, and 144a can be controlled by the hinge line 181 controlling the hinge potential V711, i.e., by controlling the mirror potential V718, as indicated by the mirror displacement profile 113 illustrated in the above described FIG. 7J and FIG. 7L.

FIG. 7R is a diagram for illustrate the relationship between incident light/reflection and aperture stop when a mirror is shifted between the ON, intermediate and OFF states. Specifically the mirror 718 is operated in the ON and OFF states depicted in reverse direction for convenience in illustration.

Specifically, FIG. 7R shows the circuit configuration of FIG. 7 as viewed from the back side.

When the mirror 718 is in the ON state, the major portion of an incident light 301a is projected to the aperture stop 816a, as reflection light 301b, to be projected.

When the mirror 718 is in a horizontal stationary state, a portion of the reflection light 301b is blocked by the aperture stop 816a. The amount of light is reduced from the quantity of the ON state.

When the mirror 718 is in the OFF state, the reflection light 31b is completely projected away from the aperture stop 816a, and therefore a reflection light 301b is projected out of the aperture stop 816a does not exist.

Therefore, the combination of the mirror displacement profiles 140, including the horizontal stationary state as illustrated in the above described FIG. 7Q, makes it possible to attain the control of the quantity of light of the reflection light 301b that is determined by controlling the mirror 718 and aperture stop 816a, to control of gray scales.

FIG. 7S is a diagram for illustrating a mirror displacement profile in the case of applying, to a color display, a gray scale control by means of a deflection control, including the horizontal stationary state of a mirror illustrated in the above described FIG. 7Q.

FIG. 7S illustrates the case of attaining the display of a color video image by repeating, for three times, the respective sub-frames 101 of the red (R) light, green (G) light, and blue (B) light.

Specifically, the sub-frame corresponding to R applies the above described mirror displacement profile 141 to set a 100% gray scale. The sub-frame corresponding to G applies the above described mirror displacement profile 142 to set a 50% gray scale. The sub-frame corresponding to B applies the above described mirror displacement profile 143 to set a 25% gray scale, thereby attaining a color display having an advantage, for example, in the brightness of R resulting from mixing R, G and B of the aforementioned respective gray scales.

Each of the circuit configurations illustrated in the above described FIGS. 7G, 7H, and 7M comprise the memory cells M1 and M2 for controlling the mirror 718 each has a simple DRAM structure requiring one transistor at most, and therefore the structure of the individual memory cell can be manufactured with reduced size.

This in turn makes it easy to obtain a high level of resolution by arraying a larger number of mirror elements 700 within a certain sized mirror element implemented as array of the mirror device 200.

Furthermore, the exemplary configuration of FIG. 7M the electrode 721a and the electrode 721b may be controlled by way of the plate lines 194 (i.e., the second plate line 194a and the first plate line 194b). Specifically, significant increase of gray scales in displaying the image may be achieved independently from the bit line 190 and word line 193. Therefore, a large extension of a gray scale expression is enabled. In other words, both a high level of resolution of a projection image and a high grade of gradation thereof can be attained.

Specifically the characteristics of the mirror element of the mirror device produced by the production method described by methods illustrated according to FIGS. 5A through 5F, and the mirror element 600 shown in FIGS. 6A and 6B, and the mirror element 700 shown in FIGS. 7A through 7S may be applied to other mirror elements.

<Single-Plate Projection Apparatus>

The following is a description of an example of the single-plate projection apparatus that comprises one mirror device according to the present embodiment.

Figure 8:
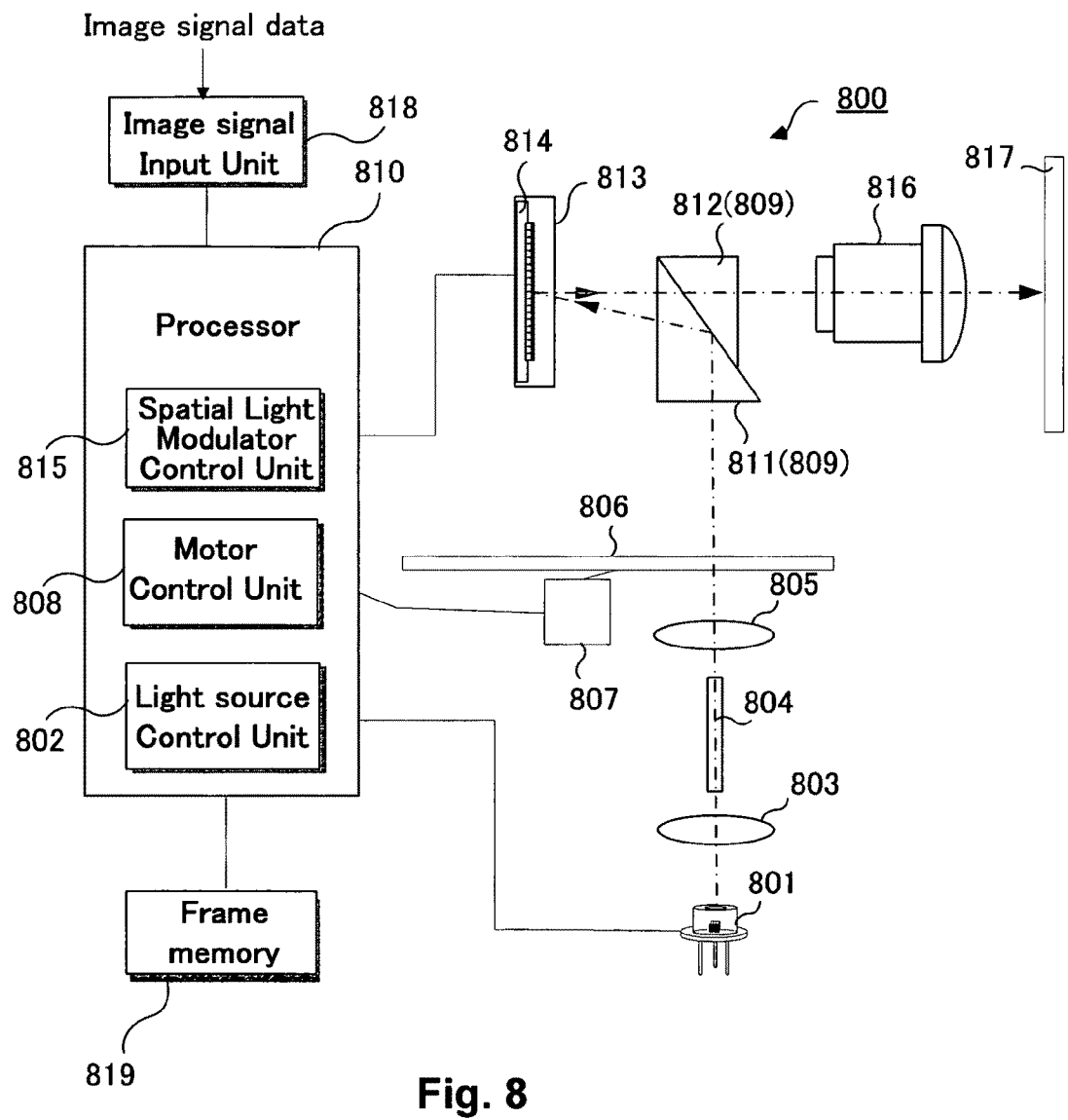
FIG. 8 is a functional block diagram showing a single-plate projection apparatus comprising one mirror device.

FIG. 8 is a functional block diagram for showing the configuration of a single-plate projection apparatus that includes a mirror device according to the present embodiment.

A light source 801 emits an illumination light for projecting an image. The light source 801 is controlled by a light source control unit 802 includes a processor 810. The light source 801 may comprise an arc lamp light source, a laser light source, or a light emitting diode (LED). The light source 801 may also implement a plurality of sub-light sources. The number and period of time for turning on each of the sub-light sources are controlled by a light source control unit 802 to adjust the light intensity.

Also, the light source control unit 802 controls and turns on the sub-light sources according to the integrated light intensity based on the positions of the sub-light sources to bring forth light intensity adjustment according to the locality of the light distributions.

With the light source 801 comprises a plurality of laser light sources with different wavelengths, the light source control unit 802 changing over the individual laser light sources enables a selection of a color of incident light. Therefore, this configuration does not require the color wheel 806 described below. Also is the light source may be controlled to emit a pulse emission of light of a laser light source or light emitting diode (LED) light source.

When a laser light source emits substantially-parallel flux of light with a small light dispersion angle an illumination light flux of the flux reflecting on the mirror device 814 has a reduced numerical aperture NA depending on the functional relationship with the etendue. The substantially-parallel fluxes can be moved closer to each other in this configuration because an interference of the illumination light flux prior to reflection from the mirror device can be avoided. As a result, the mirror can have a smaller size and the deflection angle of the mirror can be reduced. Furthermore, the reduction of the deflection angle of the mirror by moving the illumination light flux and projection light flux closer to each other makes it possible to make a projection system even more compact. A first condenser lens 803 converges the light from the light source 801. A rod integrator 804 uniforms an intensity of light. A second condenser lens 805 converges the light emitted from the rod integrator 804.

A color wheel 806 comprises a filter member, which includes a plurality of filters. Each of the individual filters extracts a light of specific wavelength. For example, a filter member may include three filters, i.e., a filter for transmitting the light of the wavelength of red, one for transmitting the light of the wavelength of green, and one for transmitting the light of the wavelength of blue.

Furthermore, the light-passing path for each filter is controlled and switched with a color wheel drive unit 807 rotating or sliding the filter member. The filter may be formed to process light of a specific polarization. The motor control unit 808 of a processor 810 controls the color wheel drive unit 807. The rotation or slide speed of the filter is controlled by the color wheel drive unit 807.

A total internal reflection (TIR) prism 809 includes an air gap between two triangle prisms, i.e., a first prism 811 and a second prism 812. Additionally, the first prism 811 serves a function of totally reflecting the incident light. For example, the first prism 811 totally reflects the incident light to the light path entering the mirror device. The totally reflected light is modulated by the mirror device and reflected toward the second prism 812. The second prism 812 transmits the reflection light projected thereto at a critical angle or smaller and is modulated by the mirror device 814.

The mirror device 814 is enclosed in package 813. The mirror device 814 is controlled by the spatial light modulator control unit 815 of the processor 810.

A projection lens 816 enlarges the light reflected and modulated by the mirror device 814 to project the light onto a screen 817.

The processor 810 comprises a light source control unit 802, a motor control unit 808, and an SLM control unit 815, for synchronously controlling each of the aforementioned control units by combining them. Furthermore, the processor 810 is connected to an image signal input unit 818 to receive and process image signal data input therefrom. The processor 810 is also connected to the frame memory 819 for sending the processed image signal data. The image signal input unit 818 inputs the incoming image signal data to the processor 810.

Furthermore, the frame memory 819 stores the image signal data processed by the processor 810 for displaying image for a single screen.

The following is a description of the principle of projecting a color image at the single-plate projection apparatus 800 as shown in FIG. 8.

In the single-plate projection apparatus 800, the light emitted from the light source 801 enters a filter of the color wheel 806 after transmitting through the first condenser lens 803, rod integrator 804, and second condenser lens 805.

The light of a specific wavelength is transmitted through a filter of the color wheel 806 and enters the first prism 811 of the total internal reflection (TIR) prism 809. Furthermore, the light reflected by the first prism 811 of the TIR prism 809 enters the mirror device 814 enclosed in the package 813.

The light reflected on, and modulated by, the mirror element of the mirror device 814 re-enters the TIR prism 809 and transmits through the second prism 812 of the TIR prism 809. Then, the light transmits from the prism is projected onto the screen 817 after transmitting through the projection lens 816.

In this image projection apparatus, the light source control unit 802 of the processor 810 controls the intensity of light, of the light source by applying the image signal data received from the image signal input unit 818. In addition, the motor control unit 808 is controlled based on the image signal data, and the color wheel drive unit 807 is controlled by the motor control unit 808. A control for changing over filters of the color wheel 806 is performed by the color wheel drive unit 807. Furthermore, the SLM control unit 815 applies the image signal data to control a plurality of light modulation elements of the mirror device 814.

The single-plate projection apparatus 800 configured as described above divides a period for displaying one image (i.e., one frame) into sub-frames corresponding to the individual wavelengths of light in relation to the respective wavelengths of light, e.g., the wavelength corresponding to red, that corresponding to green, and that corresponding to blue. Furthermore, the light of each wavelength is illuminated onto the mirror device 814 in accordance with the period of each sub-frame. Therefore, the period of each sub-frame, the period of modulating the light of each wavelength at the mirror device 814 and the period of stopping a filter of the color wheel 806 are mutually dependent. A selective reflection of the incident light at the mirror device 814 is therefore controlled for only the light of the individual wavelength reflected onto the projection light for projection onto the screen. Additionally, a sequential projection of lights of the individual wavelengths in accordance with the respective sub-frame periods generates a projection of a color image.

The following is a description of an example of a multi-plate projection apparatus implemented with a plurality of mirror devices. The multi-plate projection apparatus comprises a plurality of light sources, a plurality of mirror devices, and a projection lens.

The light source may preferably be a laser light source or a light emitting diode (LED). A plurality of laser light sources may be implemented with independently controlled light sources. The independent control of each light source eliminates the requirement for employing a color filter by turning off a laser light source having a prescribed wavelength. The laser light source may also be controlled to emit light as a pulse emission, which is difficult to achieve with a mercury lamp.

The following provides descriptions of the configurations and principles of a two-plate projection apparatus and three-plate projection apparatus, as examples of multi-plate projection apparatuses comprising mirror devices according to the present embodiment.

<Two-plate Projection Apparatus>

The two-plate projection apparatus is configured to make two mirror devices respond respectively to two groups of light sources. Furthermore, one mirror device modulates the light from one group of light sources and another mirror device modulates the light from another group of light sources. Then, each of the mirror devices synthesizes the reflected and modulated light for projecting an image.

For example, when projecting an image with the lights of wavelengths corresponding to three colors, i.e., red, green, and blue light, the high visibility green light is modulated by one mirror device. The red and blue lights are modulated by another mirror device in sequence or simultaneously. Then, the lights modulated by the respective mirror devices are synthesized to project an image onto a screen.

FIGS. 9A through 9D are configuration diagrams of a two-plate projection apparatus comprising two mirror devices enclosed in one package.

The projection apparatus 900 shown in FIGS. 9A through 9D comprises a green laser light source 901, a red laser light source 902, a blue laser light source 903, illumination optical systems 904a and 904b, two triangle prisms 906 and 909, two mirror devices 920 and 930, which are contained and enclosed in one package 911, a circuit board 908, a joint member 912, a light shield member 913, a light guide prism 914, and a projection optical system 923.

The individual light sources 901, 902, and 903 are laser light sources as described for the single-plate system and controllable to emit lights as pulsed emissions. The light sources may alternatively include a plurality of sub-laser light sources. The light source may use two mercury lamps corresponding to the respective mirror devices. In the case of using the mercury lamps, a filter 905 is used for allowing only the light of a specific wavelength to transmit through while reflecting other light of wavelengths on the surface of synthesizing the reflection light in a prism 910 described later provides a similar effect as a color filter. Alternatively, a dichroic prism or dichroic mirror may be used to separate lights of different wavelengths, and thereby the mirror device may be applied to modulate light of a specific wavelength separated by the dichroic prism or mirror. The illumination optical systems 904a and 904b are optical elements such as collector lenses and rod integrators, same as that described for the single-plate projection apparatus, convex lenses, or concave lenses.

The prism 910 is formed by combining two triangle prisms 906 and 909, performs the function of synthesizing the reflection lights from the two mirror devices 920 and 930. When the prism 910 synthesizes the reflection lights from the individual mirror devices, a filter 905 such as a dichroic filter, may also be used for transmitting only the light of a specific wavelength while reflecting the other light of wavelengths on the surface of synthesizing the reflection light in a prism 910.

The filter 905 performs the same function as a color filter because of a capability of allowing a passage of only the light of a specific wavelength while reflecting the other light of wavelengths. Meanwhile, for a system uses a laser light source that emits light which has a specific polarization direction, a polarization light beam splitter film, or a polarization light beam splitter coating, that performs a separation of light or a synthesis of light by using the difference in polarization direction of light, may be used for the synthesis surface of a reflection light of the prism 910.

The package 911 is similar to the package which has been described for the single-plate projection apparatus. The package 911 as shown in FIGS. 9A through 9D is configured to contain two mirror devices 920 and 930 within one package 911. Alternatively, however, the mirror devices 920 and 930 may be contained in separate packages.

Specifically FIGS. 9A through 9D show the mirror arrays 921 and 931, and device substrates 922 and 932, of the respective mirror devices 920 and 930.

The circuit board 908 is connected to a processor similar to the processor described for the single-plate projection apparatus described above. The processor comprises a SLM control unit and a light source control unit. Furthermore, the processor processes the input image signal data and sends data of the processed information to the SLM control unit and light source control unit. The SLM control unit and light source control unit control the mirror device and light source by way of the circuit board 908 applying the data of the processed information.

The mirror device and the light source are controlled to operate synchronously. The input of the image signal data to the processor and other activities have been described for the single-plate projection apparatus, and therefore the description is not repeated here.

The joint member 912 serves the function of joining the prism 910 to the package 911. The material used for the joint member 912 may, for example, be fritted glass.

The light shield member 913 serves the function of shielding unnecessary light. The material used for the light shield member 913 may, for example, be graphite or may be composed of similar materials. The projection apparatus 900 shown in FIGS. 9A through 9D further includes light shield member 913 on a part of the bottom of the prism 910 and also on the rear surface of the prism 910.

The light guide prism 914 is a right-angle triangle cone prism. The prism 914 has a sloped face adhesively attached to the front face of the prism 910 with the bottom of the light guide prism 914 facing upward. Furthermore, the light guide prism 914 is formed with an optical axis of the individual light sources 901, 902, and 903, the optical axis of the illumination optical systems 904a and 904b corresponding to the respective light sources and the optical axis of the light emitted from the individual light sources 901, 902, and 903 are respectively perpendicular to the bottom of the light guide prism 914. The lights emitted from the individual light sources 901, 902, and 903 are projected configuration orthogonally incident to the light guide prism 914 and prism 910. As a result, the transmissivity of light can be increased on the incidence surfaces of the light guide prism 914 and prism 910 when the respective lights emitted from the individual light sources 901, 902, and 903 enters the light guide prism 914 and prism 910.

The projection optical system 923 is an optical element for projecting lights for displaying images onto the screen. For example, the optical element may be a projection lens for enlarging the light for projecting an image onto the screen and the like.

Specifically, when using both a light source emitting polarized light and a polarization beam splitter film, a two-plate projection apparatus can be configured by implementing a ½ wavelength plate or ¼ wavelength plate on the bottom surface of the prism 910.

The following is a description of the principle of projection of the two-plate projection apparatus 900 by referring to FIGS. 9A through 9D.

The projection apparatus 900 transmits the green laser light 915 incident from the front direction of the prism 910, followed by transmitting the red laser light 916 or blue laser light 917 sequentially in a time division. The green laser light 915 and red laser light 916 or blue laser light 917 is reflected to the inclined surface direction of the prism 910 by two mirror devices 920 and 930 of the present embodiment. Then, the green laser light 915 and the red laser light 916 or blue laser light 917, which are reflected on the inclined surface side of the prism 910, are synthesized and the image is projected on the screen by way of the projection optical system 923.

The following is a description of the operations of projection of images starting from the incidence of the individual laser lights 915, 916, and 917 from the front direction of the prism 910 until the reflection of the respective laser lights 915, 916, and 917 to an direction of inclined surface of the prism 910 through two mirror devices 920 and 930. The details of operation are described by referring to the front view diagram of the two-plate projection apparatus 900 shown in FIG. 9A.

The green laser light 915 and the red laser light 916 or blue laser light 917 are emitted respectively from the green laser light source 901 and the red laser light source 902 or blue laser light source 903 and transmitting through the illumination optical systems 904a and 904b corresponding to the green laser light 915 and the red laser light 916 or blue laser light 917. The light then enters into the prism 910 after transmitting through the light guide prism 914. Then, the green laser light 915 and the red or blue laser light 916 or 917 transmit in the prism 910, and enters the package 911 which is joined to the bottom of the prism 910.

After passing through the package 911, the green laser light 915 and the red or blue laser lights 916 or 917 enter into two mirror devices 920 and 930, which are contained in a single package 911 and which correspond to the individual laser lights 915, 916, and 917. The lights are modulated at the respective mirror devices 920 and 930, then the individual laser lights 915, 916, and 917 are reflected to the inclined surface direction of the prism 910.

Figure 9B:
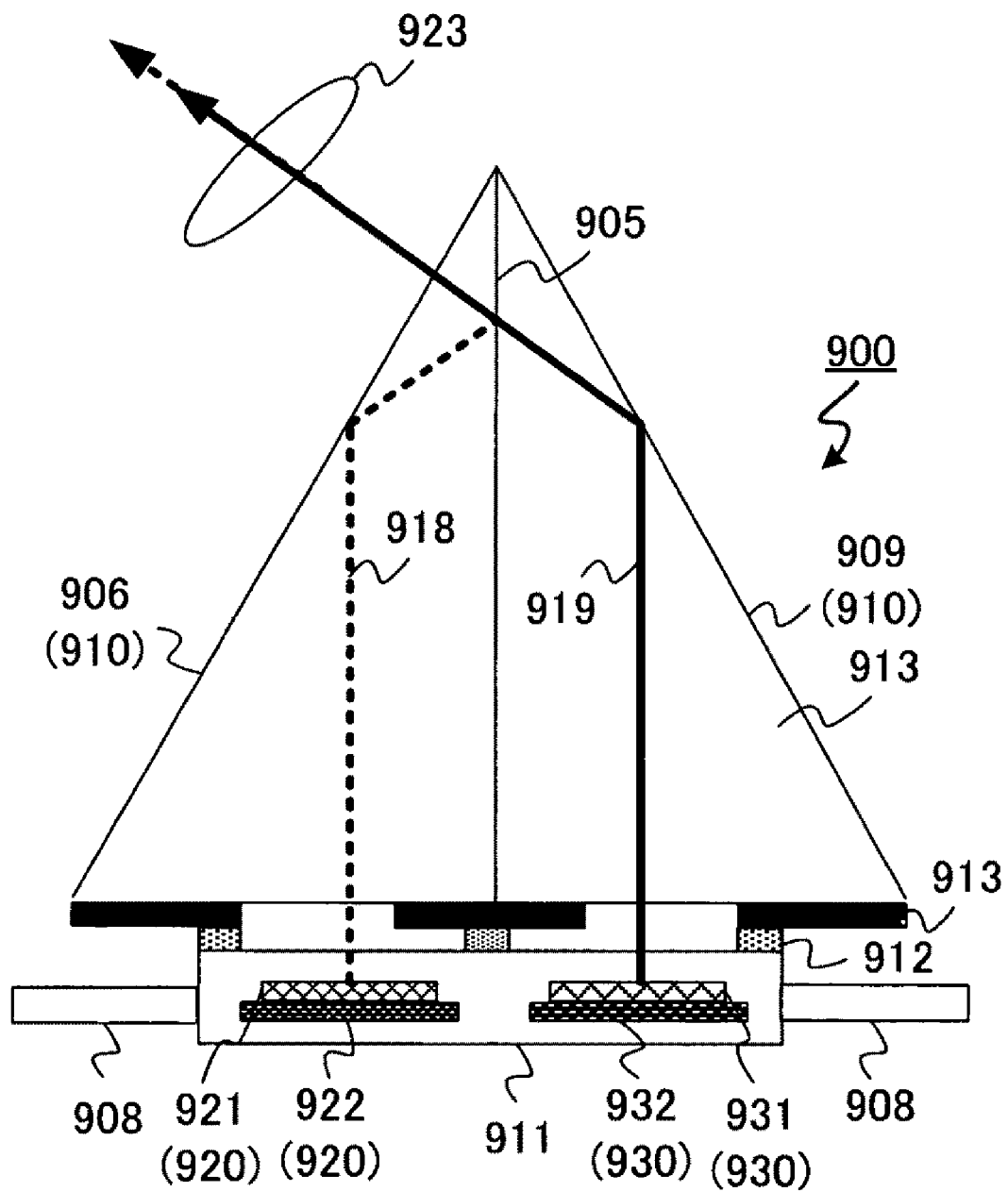
FIG. 9B is a rear view diagram showing a two-plate projection apparatus.

The following is a description of the operation and processes of image projection starting from the reflection of the individual laser lights 915, 916, and 917 at the respective mirror devices 920 and 930 until the projection of an image, by referring to the rear view diagram of the two-plate projection apparatus 900 shown in FIG. 9B.

A green laser ON light 918 and a red or blue laser ON light 919 reflected toward the rear surface direction of the prism 910 by respective mirror devices 920 and 930 in the ON state are re-transmitted through the package 911 to enter into the prism 910.

Then, the green laser ON light 918 and the red or blue laser ON light 919 are reflected on the inclined surface of the prism 910. Then, the green laser ON light 918 is re-reflected on the film 905 for transmitting a light only of a specific wavelength while reflecting the light of other wavelengths. Meanwhile, the red or blue laser ON light 919 is transmitted through the film 905.

Then, the green laser ON light 918 and the red or blue laser ON light 919 are synthesized on the same optical path and is incident together to the projection optical system 923 for projecting a color image. Specifically the optical axes of the respective ON lights 918 and 919 emitted to the projection optical system 923 from the prism 910 are preferably align a direction perpendicular to the emission surface of the prism 910.

Figure 9C:
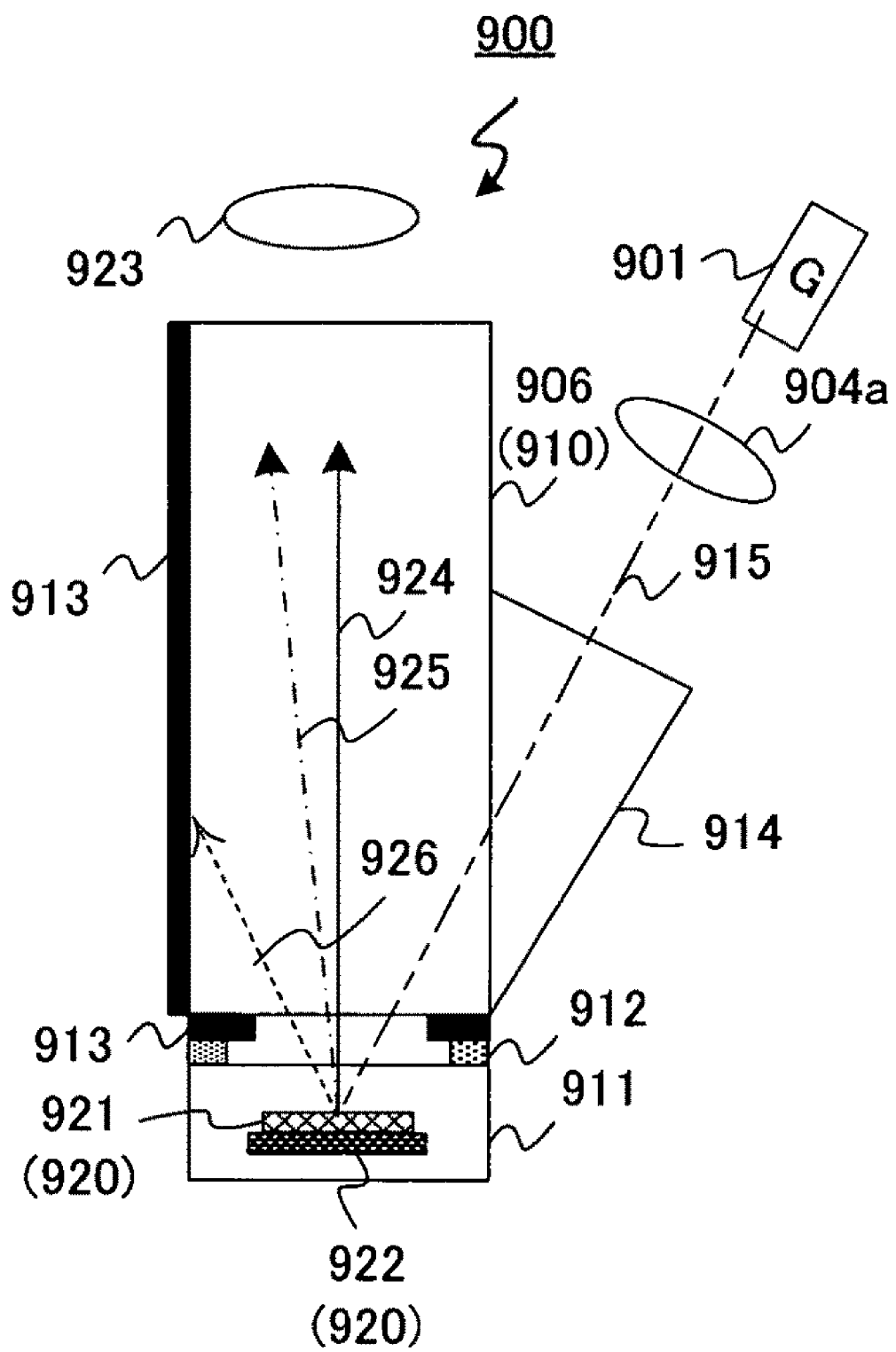
FIG. 9C is a side view diagram showing a two-plate projection apparatus.

FIG. 9C is a side view diagram showing a two-plate projection apparatus comprising two mirror devices as described above.

The green laser light 915 emitted from the green laser light source 901 enters the light guide prism 914 perpendicularly after transmitting through the illumination optical system 904a. After transmitting through the light guide prism 914, the green laser light 915 further transmits through the prism 910 joined with the light guide prism 914 and enters the mirror array 921 of the mirror device 920 contained in the package 911.

The mirror array 921 reflects the incident green laser light 915 according to the deflection angles of the mirror that may be controlled in one of the states. A mirror in an ON state reflects an entire reflection light to enter into the projection optical system 923 the intermediate light state in which a portion of the reflection light enters the projection optical system 923 and the OFF light state in which none of the reflection light enters the projection optical system 923.

A green laser light 924 when transmitting in a period of the ON light state is reflected from the mirror array 921 to have the entire light enters into the projection optical system 923.

Meanwhile, a laser light 925 when transmitting in a period of the intermediate state is reflected from the mirror array 921 to have a portion of the light enters into the projection optical system 923.

Furthermore, a laser light 926 when transmitting in a period of the OFF light is reflected from the mirror array 921 toward the light shield layer 913 as part of the apparatus on the rear surface of the prism 910. In addition, the reflected laser light 926 is absorbed in a light shield layer 913.

With this configuration, the green laser lights are projected with a maximum light intensity in the ON light. The green lights are projected with the intermediate light intensity between the ON light and OFF light in the intermediate light, or at the zero light intensity in the OFF light form is incident to the projection optical system 923.

Specifically the retention of the deflection angle of the mirror between the ON light state and OFF light state create an intermediate light state. Furthermore, the mirror is designed and manufactured to perform a free oscillation as described above with an operation repeats the deflection angles of the mirror at a deflection angle constituting the ON state, at the angle constituting the intermediate state and at the angle constituting the OFF state. Adjustment of intensity of light incident to the projection optical system 923 may be controlled by controlling the number of free oscillations.

Therefore, an image with a high grade of gray scale may be displayed by controlling a light intensity in the intermediate state.

A similar process on the reverse surface that is, on the side having the red laser light source 902 and blue laser light source 903 may also be carried out.

Figure 9D:
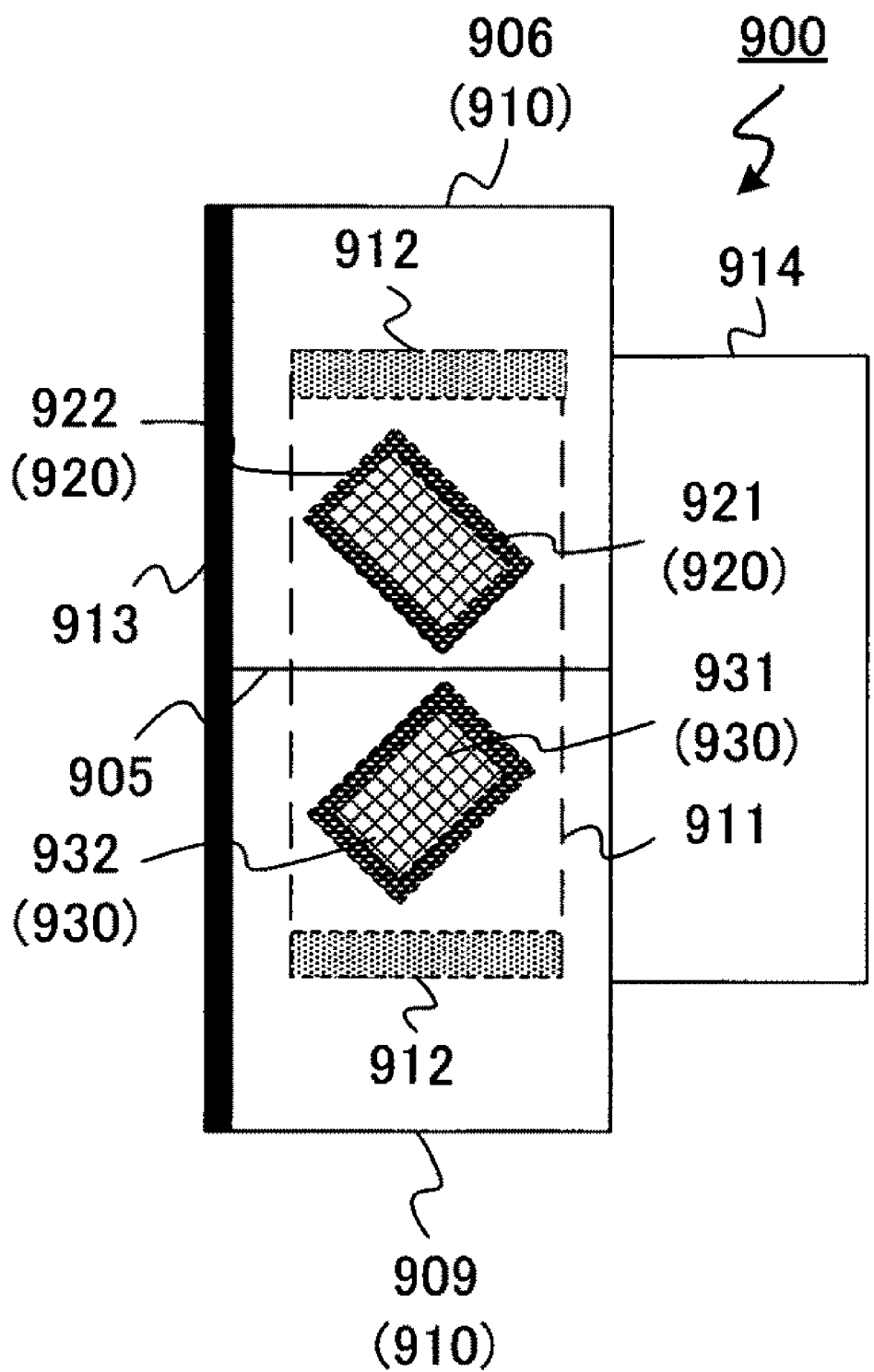
FIG. 9D is a top view diagram showing a two-plate projection apparatus.

FIG. 9D is a top view diagram of a two-plate projection apparatus comprising two mirror devices according to the present embodiment.

The light reflected from the mirror operated in an OFF light state may be absorbed by the light shield layer 913 on the rear without being reflected on the inclined surface of the prism 910. This may be achieved by placing the individual mirror devices 920 and 930 to form a 45-degree angle relative to the four sides of the outer circumference of the package 911 on the same horizontal plane as shown in FIG. 9D.

<Three-Plate Projection Apparatus>

The following is a description of a three-plate projection apparatus.

The three-plate projection apparatus includes three mirror devices to process respective lights projected from three groups of light sources. The mirror devices modulate the individual lights emitted from the respective light sources. Then, the apparatus synthesizes the individual lights modulated by the respective mirror devices to project an image.

For example, when projecting an image by the lights of three colors, i.e., red light, green light, and blue light, the individual lights are continuously modulated by three respective mirror devices, and the modulated individual lights are synthesized for projecting a color image.

Figure 10:
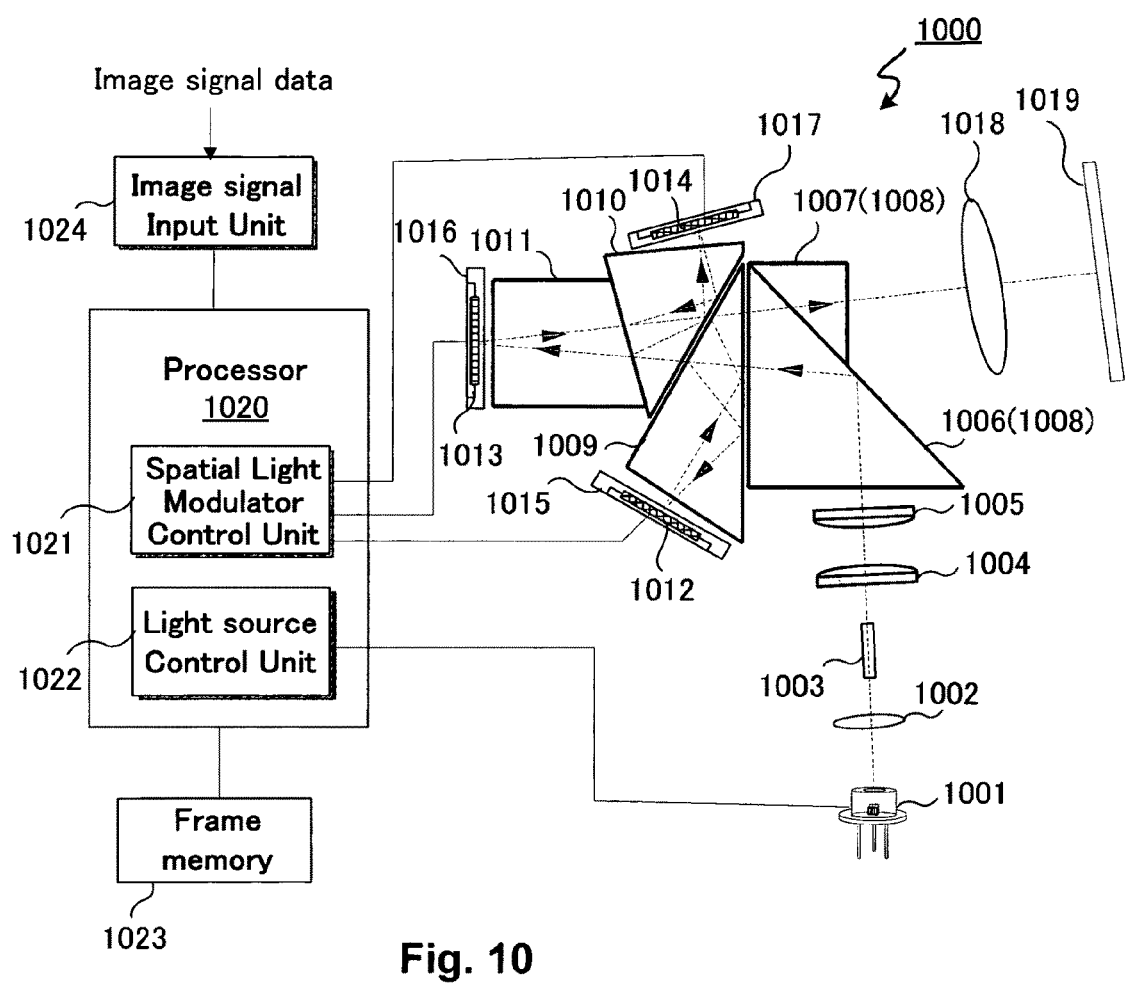
FIG. 10 is a functional block diagram showing a three-plate projection apparatus comprising three mirror devices.

FIG. 10 is a functional block diagram for showing the configuration of a three-plate projection apparatus comprising three mirror devices, according to the present embodiment, which are contained in the respective packages.

The projection apparatus 1000 shown in FIG. 10 comprises a light source 1001, a first condenser lens 1002, a rod integrator 1003, a second condenser lens 1004, a third condenser lens 1005, a TIR prism 1008, a first dichroic prism 1009, a second dichroic prism 1010, a third prism 1011, individual mirror devices 1012, 1013, and 1014, and individual packages 1015, 1016, and 1017 contain the respective mirror devices 1012, 1013, and 1014, and a projection lens 1018.

The light source 1001 may be implemented with a mercury lamp source, a laser light source, an LED, or similar light sources, as in the case of the light source described for the single-plate projection apparatus and two-plate projection apparatus as describe above. The configuration and operation of the light source, such as the sub-light source and light sources for pulsed emission, are similar to the light source for the projection apparatuses described above and therefore the description is not provided here.

Similar to those described for the single-plate projection apparatus, the first condenser lens 1002, rod integrator 1003, second condenser lens 1004, and third condenser lens 1005 sere the function of condensing the light. Meanwhile, the rod integrator 1003 carries out a function of evening out a light intensity.

The TIR prism 1008 is similar to the above-described prism for the single-plate projection apparatus and therefore the description is not provided here. Specifically the TIR prism 1008 used for the three-plate projection apparatus shown in FIG. 10 includes a first prism 1006 and a second prism 1007.

The first dichroic prism 1009 and second dichroic prism 1010 are prisms transmitting only the light of a specific wavelength through the prism while reflecting the light of other wavelengths. Furthermore, the third prism 1011 is a common prism. Specifically the first dichroic prism 1009 and second dichroic prism 1010 may be configured by respective dichroic mirrors.

For example, FIG. 10 shows the first dichroic prism 1009 as a prism reflecting only the light of the wavelength equivalent to red while transmitting through the light of other wavelengths and the second dichroic prism 1010 as a prism reflecting only the light of the wavelength equivalent to blue while transmitting through the light of other wavelengths. In addition, the drawing shows the case of configuring the third prism 1011 as a prism making the light of the wavelength equivalent to green travel straight.

The individual packages 1015, 1016, and 1017 enclose and contain the respective mirror devices 1012, 1013, and 1014.

The projection lens 1018 serves the function of enlarging individual lights synthesized after the individual lights are reflected and modulated at the respective mirror devices 1012, 1013, and 1014.

A processor 1020 is basically similar to the one described for the single plate projection apparatus, and comprises a spatial light modulator control unit 1021 and a light source control unit 1022. Furthermore, the processor 1020 processes the input image signal data as that described above for the single plate projection apparatus.

The spatial light modulator control unit 1021 as shown here is basically similar to the one described for the single plate projection apparatus. The processor 1021 is connected to the individual mirror devices 1012, 1013, and 1014. Furthermore, the spatial light modulator control unit 1021 is capable of controlling the individual mirror devices 1012, 1013, and 1014 independently or synchronously on the basis of the image signal data processed by the processor. The processor also controls the individual mirror devices 1012, 1013, and 1014 synchronously with other constituent members.

The light source control unit 1022 shown here is similar to the one described for the single plate projection apparatus, is connected to the light source 1001 for controlling the light intensity of the light source, for controlling and turning on selected sub-light sources, and to carry out similar functions, on the basis of the image signal processed by the processor.

Frame memory 1023 and an image signal input unit 1024 are similar to the ones described for the single plate projection apparatus and therefore the description is not repeated here.

The following is a description of the operation and processes of projection of a color image at the three-plate projection apparatus 1000 shown in FIG. 10.

In the three-plate projection apparatus 1000, the light emitted from the light source 1001 is transmitted sequentially through the first condenser lens 1002, rod integrator 1003, second condenser lens 1004, and third condenser lens 1005. Then the light is incident to the first prism 1006 of the TIR prism 1008 at an angle equal to or greater than a critical angle. Then, the incident light is totally reflected by the first prism 1006 of the TIR prism 1008.

The totally reflected light enters the first dichroic prism 1009. Furthermore, while the light of other wavelengths are passed, only the light of the wavelength equivalent to red, among the totally reflected light, is reflected from the light emission surface of the first dichroic prism 1009 and/or on the light incident surface of the second dichroic prism 1010.

Then, as for the light incident to the second dichroic prism 1010, only the light of the light with a blue wavelength among the incident lights, is reflected, while the light of other wavelength, that is, the green light, is transmitted through the light emission surface of the second dichroic prism 1010 and/or the light incident surface of the third prism 1011.

The light which enters the third prism 1011, and from which the blue light and red light wavelengths are removed and the green light transmits through the third prism 1011.

Then, the lights spectrally divided to individual wavelengths are incident, respectively to the packages 1015, 1016, and 1017, which contain the respective mirror devices 1012, 1013, and 1014 and which are placed on the respective side faces of the first dichroic prism 1009, second dichroic prism 1010, and third prism 1011.

The individual lights transmitted through the packages 1015, 1016, and 1017 enter the respective mirror devices 1012, 1013, and 1014 of the present embodiment. Here, the individual mirror devices 1012, 1013, and 1014 are independently controlled by the spatial light modulator control unit 1021 to respond to the respective lights according to the image signal processed by the processor 1020. The individual mirror devices 1012, 1013, and 1014 modulate, and reflect, the incident respective lights.

Then, the red light reflected by the mirror device 1012, re-enters the first dichroic prism 1009. Also, the blue light reflected by the mirror device 1014, re-enters the second dichroic prism 1010. Furthermore, the green light reflected by the mirror device 1013, re-enters the third prism 1011.

The red light re-enters into the first dichroic prism 1009, and the blue light re-entered the second dichroic prism 1010, repeating a number of times of reflections in the respective prisms 1009 and 1010.

Then, the blue light overlaps its optical path with that of the green light re-entered the second dichroic prism 1010 from the third prism 1011, and the blue light and green light are thereby synthesized.

Then, the light synthesized light of the green and blue lights enters the first dichroic prism 1009 from the second dichroic prism 1010.

Then, the red light overlaps the optical path with that of the synthesized light of green and blue lights entered the first dichroic prism 1009 from the second dichroic prism 1010, and these lights are thereby synthesized.

The synthesized light of the three individual lights modulated by the respective mirror devices 1012, 1013, and 1014 enters the second prism 1007 of the TIR prism 1008 at an angle equal to or smaller than the critical angle.

Then, the synthesized light is transmitted through the second prism 1007 of the TIR prism 1008 and is projected to the screen 1019 after transmitting through the projection lens 1018.

According to above-described optical processes, a color image can be projected at the three-plate projection apparatus.

In such a configuration, as compared to the single-plate image display system described above, there will be no visual problem caused by a "color breakup," phenomenon since each light of the primary colors is displayed at all times. Furthermore, more effective and continuous projection of emitted light from the light source provides would in principle display a brighter image compared with the single-panel projection apparatus.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A mirror device, comprising:
   a mirror comprises an elastic hinge for supporting the mirror and the hinge having a specific electric resistance; and
   an electrode disposed near the mirror for controlling the mirror, wherein a voltage is applied to the elastic hinge for a predetermined period in synchronous with a change of an electric voltage applied to the electrode.

2. The mirror device according to claim 1, further comprising:
   a controller to control a voltage applied to the electrode to retain the mirror at a fixed position and another voltage applied to the hinge ; and
   the controller applies a positive voltage change to the elastic hinge when the controller applies a negative potential change to the electrode and the controller applies a negative voltage change to the elastic hinge when the controller applies a positive potential change to the electrode.

3. The mirror device according to claim 1, further comprising:
   a controller for controlling the mirror to have a smaller absolute value of an electric potential than the absolute value of the electric potential of the electrode before a voltage is applied to the elastic hinge for a predetermined time period causing a potential change in the elastic hinge.

4. The mirror device according to claim 1, further comprising:
   a controller for controlling a time sequence for applying a voltage to the elastic hinge for generating a plurality of peaks of electric potentials of the mirror.

5. The mirror device according to claim 1, further comprising:
- a controller for controlling a time sequence for applying a voltage to the mirror for a predetermined period for generating a smaller electric potential in the mirror than a retained electric potential of the mirror.

6. The mirror device according to claim 1, further comprising:
- a controller for controlling a voltage applying to the elastic hinge to generate a smaller Coulomb force between the mirror and the electrode.

7. The mirror device according to claim 1, further comprising:
- a controller for applying a voltage to the elastic hinge for a predetermined period for stopping a free oscillation of the mirror within a time period equal to or smaller than a time period of one mirror oscillation cycle.

8. The mirror device according to claim 1, further comprising:
- a controller for applying a voltage to the elastic hinge for a predetermined period for generating a Coulomb force between the mirror and the electrode for moving the mirror in a direction away from the electrode when the Coulomb force is decreasing and for obstructing the mirror from shifting when the Coulomb force is increasing.

9. The mirror device according to claim 1 further comprising:
- a controller for terminating a voltage applied to said electrode for withdrawing the Coulomb force to operate the mirror with a free oscillation.

10. The mirror device according to claim 1 further comprising:
- a controller for terminating a voltage applied to said electrode for withdrawing the Coulomb force to position the mirror at an angular position away from the electrode.

* * * * *